United States Patent
Igawa et al.

(10) Patent No.: US 12,545,743 B2
(45) Date of Patent: Feb. 10, 2026

(54) BISPECIFIC ANTIBODY EXHIBITING INCREASED ALTERNATIVE FVIII-COFACTOR-FUNCTION ACTIVITY

(71) Applicant: Chugai Seiyaku Kabushiki Kaisha, Tokyo (JP)

(72) Inventors: Tomoyuki Igawa, Shizuoka (JP); Yuri Teranishi, Shizuoka (JP); Kazuki Kato, Shizuoka (JP); Hikaru Koga, Shizuoka (JP)

(73) Assignee: Chugai Seiyaku Kabushiki Kaisha, Tokyo (JP)

( * ) Notice: Subject to any disclaimer, the term of this patent is extended or adjusted under 35 U.S.C. 154(b) by 607 days.

(21) Appl. No.: 17/528,371

(22) Filed: Nov. 17, 2021

(65) Prior Publication Data

US 2022/0073644 A1    Mar. 10, 2022

Related U.S. Application Data

(63) Continuation of application No. 16/318,883, filed as application No. PCT/JP2017/027152 on Jul. 27, 2017, now abandoned.

(30) Foreign Application Priority Data

Jul. 29, 2016  (JP) .................................. 2016-150769

(51) Int. Cl.
  *C07K 16/36* (2006.01)
  *C07K 16/46* (2006.01)
  *C12N 15/09* (2006.01)

(52) U.S. Cl.
  CPC .............. *C07K 16/36* (2013.01); *C07K 16/46* (2013.01); *C07K 16/468* (2013.01); *C07K 2317/10* (2013.01); *C07K 2317/24* (2013.01); *C07K 2317/31* (2013.01); *C07K 2317/40* (2013.01); *C07K 2317/565* (2013.01); *C12N 15/09* (2013.01)

(58) Field of Classification Search
  None
  See application file for complete search history.

(56) References Cited

U.S. PATENT DOCUMENTS

| | | | |
|---|---|---|---|
| 4,208,479 A | 6/1980 | Maggio et al. | |
| 4,444,878 A | 4/1984 | Paulus | |
| 4,474,893 A | 10/1984 | Reading | |
| 5,496,549 A | 3/1996 | Yamazaki et al. | |
| 5,591,828 A | 1/1997 | Bosslet et al. | |
| 5,693,762 A * | 12/1997 | Queen .................... | C07K 16/00 424/143.1 |
| 5,744,446 A | 4/1998 | Lollar et al. | |
| 6,005,091 A | 12/1999 | Blackburn et al. | |
| 6,010,902 A | 1/2000 | Ledbetter et al. | |
| 7,018,632 B2 | 3/2006 | Lindhofer et al. | |
| 7,033,590 B1 | 4/2006 | Scheiflinger et al. | |
| 7,538,196 B2 | 5/2009 | Jung | |
| 7,691,380 B2 | 4/2010 | Thorpe et al. | |
| 7,732,149 B2 | 6/2010 | Kojima et al. | |
| 8,030,461 B2 | 10/2011 | Kojima | |
| 8,062,635 B2 | 11/2011 | Hattori et al. | |
| 8,337,841 B2 | 12/2012 | Kojima et al. | |
| 8,765,124 B2 | 7/2014 | Saito et al. | |
| 9,334,331 B2 * | 5/2016 | Igawa ................... | C07K 16/36 |
| 10,022,319 B2 | 7/2018 | Igawa et al. | |
| 10,450,381 B2 * | 10/2019 | Igawa ................... | C07K 16/40 |
| 10,759,870 B2 | 9/2020 | Teranishi et al. | |
| 11,612,562 B2 | 3/2023 | Igawa et al. | |
| 2002/0062010 A1 | 5/2002 | Arathoon et al. | |
| 2003/0207346 A1 | 11/2003 | Arathoon et al. | |
| 2005/0266425 A1 | 12/2005 | Zauderer et al. | |
| 2007/0041978 A1 | 2/2007 | Hattori et al. | |
| 2007/0244301 A1 | 10/2007 | Siekmann et al. | |
| 2008/0075712 A1 | 3/2008 | Hattori et al. | |
| 2009/0324589 A1 | 12/2009 | Igawa et al. | |
| 2010/0003254 A1 | 1/2010 | Hattori et al. | |
| 2010/0285011 A1 | 11/2010 | Morichika et al. | |
| 2012/0237517 A1 | 9/2012 | Hattori et al. | |
| 2013/0018174 A1 | 1/2013 | Igawa et al. | |
| 2013/0330345 A1 * | 12/2013 | Igawa ...................... | A61P 7/00 435/69.6 |
| 2014/0037632 A1 | 2/2014 | Igawa et al. | |
| 2014/0370018 A1 | 12/2014 | Igawa et al. | |
| 2014/0370020 A1 | 12/2014 | Kuramochi et al. | |
| 2015/0315296 A1 | 11/2015 | Schaefer et al. | |

(Continued)

FOREIGN PATENT DOCUMENTS

| | | |
|---|---|---|
| CA | 2019559 | 1/2002 |
| CA | 2603264 | 10/2006 |

(Continued)

OTHER PUBLICATIONS

Janeway et al., Immunobiology, 3rd edition, Garland Publishing Inc., 1997, pp. 3:1-3:11.*
Rudikoff et al., Proc Natl Acad Sci USA. Mar. 1982;79(6):1979-83.*
Edwards et al.,J Mol Biol. Nov. 14, 2003;334(1): 103-18.*
Goel et al., J Immunol. Dec. 15, 2004; 173(12):7358-67.*
Llyod et al., Protein Eng Des Sel. Mar. 2009;22(3):159-68. doi: 10.1093/protein/gzn058. Epub Oct. 29, 2008.*
Kanyavuz et al., Nat Rev Immunol. Jun. 2019;19(6):355-368. doi: 10.1038/S41577-019-0126-7.*
Lescar, et al. Journal of Biological Chemistry 270.30 (1995): 18067-18076.*

(Continued)

*Primary Examiner* — Michael Szperka
(74) *Attorney, Agent, or Firm* — Fish & Richardson P.C.

(57) ABSTRACT

The present invention provides light chain amino acid substitutions that improve the FVIII cofactor function-substituting activity of ACE910 (Emicizumab), novel light chains showing FVIII cofactor function-substituting activity, and heavy chain amino acid substitutions that improve the FVIII cofactor function-substituting activity of novel light chain-containing bispecific antibodies.

7 Claims, 2 Drawing Sheets

Specification includes a Sequence Listing.

(56) References Cited

U.S. PATENT DOCUMENTS

| | | |
|---|---|---|
| 2016/0222129 A1 | 8/2016 | Igawa et al. |
| 2017/0022293 A1 | 1/2017 | Igawa et al. |
| 2017/0145111 A1 | 5/2017 | Hattori et al. |
| 2017/0253663 A1 | 9/2017 | Yoneyama |
| 2018/0002443 A1 | 1/2018 | Hattori et al. |
| 2018/0244800 A1 | 8/2018 | Hattori et al. |
| 2019/0112390 A1 | 4/2019 | Hattori et al. |
| 2019/0185578 A1 | 6/2019 | Igawa et al. |
| 2019/0315884 A1 | 10/2019 | Igawa et al. |
| 2019/0359728 A1 | 11/2019 | Hattori et al. |
| 2020/0087380 A1 | 3/2020 | Kuramochi et al. |
| 2020/0223940 A1 | 7/2020 | Teranishi et al. |
| 2020/0270363 A1 | 8/2020 | Igawa et al. |
| 2020/0277402 A1 | 9/2020 | Hattori et al. |
| 2020/0283544 A1 | 9/2020 | Hosoguchi et al. |
| 2020/0354473 A1 | 11/2020 | Teranishi et al. |
| 2021/0107994 A1 | 4/2021 | Shima et al. |
| 2021/0107995 A1 | 4/2021 | Hattori et al. |
| 2021/0189006 A1 | 6/2021 | Saeki et al. |
| 2021/0380717 A1 | 12/2021 | Hattori et al. |
| 2022/0119551 A1 | 4/2022 | Igawa et al. |
| 2022/0213217 A1 | 7/2022 | Hattori et al. |
| 2022/0267470 A1 | 8/2022 | Igawa et al. |
| 2023/0152280 A1 | 5/2023 | Sato et al. |
| 2023/0212315 A1 | 7/2023 | Igawa et al. |
| 2023/0348621 A1 | 11/2023 | Hattori et al. |
| 2024/0052059 A1 | 2/2024 | Shima et al. |
| 2024/0059795 A1 | 2/2024 | Igawa et al. |
| 2024/0183826 A9 | 6/2024 | Sato et al. |
| 2024/0190997 A1 | 6/2024 | Hattori et al. |

FOREIGN PATENT DOCUMENTS

| | | |
|---|---|---|
| CA | 2603408 C | 10/2006 |
| CA | 2812739 A | 10/2012 |
| CA | 2859667 A | 6/2013 |
| CA | 2888496 A | 5/2014 |
| CA | 3027018 A | 1/2018 |
| CA | 3031082 | 1/2018 |
| CN | 101883588 | 11/2010 |
| CN | 102858366 | 1/2013 |
| CN | 103298937 | 9/2013 |
| EP | 0 369 566 | 5/1990 |
| EP | 0 404 097 | 9/1996 |
| EP | 0 979 281 | 2/2000 |
| EP | 1 327 681 | 7/2003 |
| EP | 1 693 448 | 8/2006 |
| EP | 1 220 923 | 6/2007 |
| EP | 1 876 236 | 1/2008 |
| EP | 1 505 148 | 4/2009 |
| EP | 1 605 058 | 5/2009 |
| EP | 1 688 488 | 8/2011 |
| EP | 1 688 488 B9 | 3/2012 |
| EP | 2 238 985 | 8/2012 |
| EP | 2 526 963 | 11/2012 |
| EP | 2 644 698 | 10/2013 |
| EP | 3 395 835 B | 2/2021 |
| JP | H02-145187 | 6/1990 |
| JP | H05-184383 | 7/1993 |
| JP | H05-199894 | 8/1993 |
| JP | H05-203652 | 8/1993 |
| JP | H05-213775 | 8/1993 |
| JP | H05-304992 | 11/1993 |
| JP | H06-104071 | 12/1994 |
| JP | H08-510555 | 11/1996 |
| JP | H10-165184 | 6/1998 |
| JP | H10-511085 | 10/1998 |
| JP | H11-71288 | 3/1999 |
| JP | H11-504007 | 4/1999 |
| JP | H11-506310 | 6/1999 |
| JP | 3032287 | 4/2000 |
| JP | 2001-523971 | 11/2001 |
| JP | 2002-518041 | 6/2002 |
| JP | 2003-055398 | 2/2003 |
| JP | 2003-509049 | 3/2003 |
| JP | 2008-510466 | 4/2008 |
| JP | 2011-502126 | 1/2011 |
| JP | 2011-137000 | 7/2011 |
| JP | 2014-511836 | 5/2014 |
| JP | 2014-524748 | 9/2014 |
| JP | 2015-502409 | 1/2015 |
| JP | 2015-504434 | 2/2015 |
| JP | 2015-514684 | 5/2015 |
| JP | 2015-536349 | 12/2015 |
| JP | 2016-508117 | 3/2016 |
| JP | 2017-511139 | 4/2017 |
| KR | 2013/0102113 | 9/2013 |
| KR | 2013/0102640 | 9/2013 |
| NO | 20062087 | 7/2006 |
| RU | 2339696 | 11/2008 |
| TW | 2007/14313 | 4/2007 |
| TW | I452135 | 9/2014 |
| TW | I452136 | 9/2014 |
| TW | 2016/00112 | 1/2016 |
| WO | WO 91/08770 | 6/1991 |
| WO | WO 93/11161 | 6/1993 |
| WO | WO 94/13804 | 6/1994 |
| WO | WO 95/01571 | 1/1995 |
| WO | WO 96/01653 | 1/1996 |
| WO | WO 96/07754 | 3/1996 |
| WO | WO 96/16673 | 6/1996 |
| WO | WO 96/26964 | 9/1996 |
| WO | WO 96/27011 | 9/1996 |
| WO | WO 96/33208 | 10/1996 |
| WO | WO 98/50431 | 11/1998 |
| WO | WO 99/10494 | 4/1999 |
| WO | WO 99/67359 | 12/1999 |
| WO | WO 01/19992 | 3/2001 |
| WO | WO 01/90192 | 11/2001 |
| WO | WO 02/06838 | 1/2002 |
| WO | WO 02/30463 | 4/2002 |
| WO | WO 02/33073 | 4/2002 |
| WO | WO 03/35835 | 1/2003 |
| WO | WO 03/42231 | 5/2003 |
| WO | WO 03/87163 | 10/2003 |
| WO | WO 03/91424 | 11/2003 |
| WO | WO 2004/009618 | 1/2004 |
| WO | WO 2004/060919 | 7/2004 |
| WO | WO 2004/065611 | 8/2004 |
| WO | WO 2004/097041 | 11/2004 |
| WO | WO 2004/111233 | 12/2004 |
| WO | WO 2005/025615 | 3/2005 |
| WO | WO 2005/035753 | 4/2005 |
| WO | WO 2005/035754 | 4/2005 |
| WO | WO 2005/035756 | 4/2005 |
| WO | WO 2006/031370 | 3/2006 |
| WO | WO 2006/106905 | 10/2006 |
| WO | WO 2006/109592 | 10/2006 |
| WO | WO 2007/114319 | 10/2007 |
| WO | WO 2007/114325 | 10/2007 |
| WO | WO 2007/147901 | 12/2007 |
| WO | WO 2009/041643 | 4/2009 |
| WO | WO 2009/058492 | 5/2009 |
| WO | WO 2009/084659 | 7/2009 |
| WO | WO 2009/089004 | 7/2009 |
| WO | WO 2010/129304 | 11/2010 |
| WO | WO 2011/090088 | 2/2011 |
| WO | WO 2011/078332 | 6/2011 |
| WO | WO 2012/067176 | 5/2012 |
| WO | WO-2012067176 A1 * | 5/2012 ............ A61P 43/00 |
| WO | WO 2012/131555 | 10/2012 |
| WO | WO 2013/011076 | 1/2013 |
| WO | WO 2013/065708 | 5/2013 |
| WO | WO 2013/076186 | 5/2013 |
| WO | WO 2013/096291 | 6/2013 |
| WO | WO 2013/124451 | 8/2013 |
| WO | WO 2013/131866 | 9/2013 |
| WO | WO 2014/081955 | 5/2014 |
| WO | WO 2014/082179 | 6/2014 |
| WO | WO 2015/134894 | 9/2015 |
| WO | WO 2015/150447 | 10/2015 |
| WO | WO 2015/175874 | 11/2015 |
| WO | WO 2015/181805 | 12/2015 |
| WO | WO 2015/194233 | 12/2015 |

(56) References Cited

FOREIGN PATENT DOCUMENTS

| WO | WO 2016/001810 | 1/2016 |
|---|---|---|
| WO | WO 2016/164708 | 10/2016 |
| WO | WO 2016/166014 | 10/2016 |
| WO | WO 2016/171202 | 10/2016 |
| WO | WO 2017/110980 | 6/2017 |
| WO | WO 2017/129585 | 8/2017 |
| WO | WO 2017/188356 | 11/2017 |
| WO | WO 2017/205014 | 11/2017 |
| WO | WO 2018/016881 | 1/2018 |
| WO | WO 2018/021450 | 2/2018 |
| WO | WO 2018/181870 | 10/2018 |
| WO | WO 2019/065795 | 4/2019 |
| WO | WO 2019/088143 | 5/2019 |
| WO | WO 2021/201202 | 10/2021 |

OTHER PUBLICATIONS

U.S. Appl. No. 17/534,566, Yoneyama, filed Nov. 24, 2021.
Wang et al., "Antibody Structure, Instability, and Formulation," Journal of Pharmaceutical Sciences, Jan. 2007, 96(1):1-26.
USPTO Non-Final Office Action in U.S. Appl. No. 16/093,495, dated May 14, 2021, 27 pages.
USPTO Non-Final Office Action in U.S. Appl. No. 16/093,495, dated Apr. 11, 2022, 40 pages.
USPTO Final Office Action in U.S. Appl. No. 16/093,495, dated Dec. 14, 2022, 45 pages.
USPTO Non-Final Office Action in U.S. Appl. No. 16/093,495, dated Aug. 25, 2023, 43 pages.
U.S. Appl. No. 13/885,421, Igawa et al., filed Aug. 30, 2013.
U.S. Appl. No. 14/019,117, Igawa et al., filed Sep. 5, 2013.
U.S. Appl. No. 15/132,996, Igawa et al., filed Apr. 19, 2016.
U.S. Appl. No. 15/402,580, Hattori et al., filed Jan. 10, 2017.
U.S. Appl. No. 16/318,883, Igawa et al., filed Jan. 18, 2019.
U.S. Appl. No. 18/586,698, Hattori et al., filed Feb. 26, 2024.
Daugherty et al., "Formulation and delivery issues for monoclonal antibody therapeutics," Adv Drug Deliv Rev, Aug. 7, 2006, 58(5-6):686-706. Epub May 22, 2006.
Hu et al., "Humanization and characterization of an anti-ricin neutralization monoclonal antibody," PLoS One, Sep. 2012, 7(9):e45595, 9 pages.
USPTO Restriction Requirement in U.S. Appl. No. 16/099,341, dated Apr. 17, 2020, 8 pages.
USPTO Restriction Requirement in U.S. Appl. No. 13/885,421, dated Jul. 28, 2015, 9 pages.
Yarilin, Fundamentals of Immunology, Moscow, Medicina, 1999, pp. 171-173 (with English translation).
USPTO Final Office Action in U.S. Appl. No. 16/093,495, dated Nov. 16, 2021, 31 pages.
U.S. Appl. No. 18/495,861, Igawa et al., filed Oct. 27, 2023.
U.S. Appl. No. 10/575,905, Hattori et al., filed Apr. 30, 2007 (abandoned).
U.S. Pat. No. 8,062,635, Hattori et al., issued Nov. 22, 2011.
U.S. Appl. No. 11/910,836, Hattori et al., filed Jan. 12, 2009 (abandoned).
U.S. Appl. No. 13/434,643, Hattori et al., filed Mar. 29, 2012 (abandoned).
U.S. Appl. No. 14/921,590, Hattori et al., filed Oct. 23, 2015 (abandoned).
U.S. Appl. No. 15/172,727, Hattori et al., filed Jun. 3, 2016 (abandoned).
U.S. Appl. No. 15/402,580, Hattori et al., filed Jan. 10, 2017 (abandoned).
U.S. Appl. No. 15/701,630, Hattori et al., filed Sep. 12, 2017 (abandoned).
U.S. Appl. No. 15/963,345, Hattori et al., filed Apr. 26, 2018 (abandoned).
U.S. Appl. No. 16/226,798, Hattori et al., filed Dec. 20, 2018 (abandoned).
U.S. Appl. No. 16/536,385, Hattori et al., filed Aug. 9, 2019 (abandoned).
U.S. Appl. No. 16/825,513, Hattori et al., filed Mar. 20, 2020 (abandoned).
U.S. Appl. No. 17/130,736, Hattori et al., filed Dec. 22, 2020 (abandoned).
U.S. Appl. No. 17/389,534, Hattori et al., filed Jul. 30, 2021 (abandoned).
U.S. Appl. No. 17/699,293, Hattori et al., filed Mar. 21, 2022.
U.S. Pat. No. 9,334,331, Igawa et al., issued May 10, 2016.
U.S. Appl. No. 14/019,117, Igawa et al., filed Sep. 5, 2013 (abandoned).
U.S. Appl. No. 14/019,712, Igawa et al., filed Sep. 6, 2013 (abandoned).
U.S. Pat. No. 10,450,381, Igawa et al., issued Oct. 22, 2019.
U.S. Appl. No. 15/288,965, Igawa et al., filed Oct. 7, 2016 (abandoned).
U.S. Appl. No. 16/459,791, Igawa et al., filed Jul. 2, 2019 (abandoned).
U.S. Appl. No. 17/485,818, Igawa et al., filed Sep. 27, 2021 (abandoned).
U.S. Appl. No. 17/729,471, Igawa et al., filed Apr. 26, 2022.
U.S. Appl. No. 16/093,495, Saeki et al., filed Oct. 12, 2018.
U.S. Pat. No. 10,759,870, Teranishi et al., issued Sep. 1, 2020.
U.S. Appl. No. 16/936,575, Teranishi et al., filed Jul. 23, 2020.
U.S. Appl. No. 16/061,429, Igawa et al., filed Jun. 12, 2018 (abandoned).
U.S. Appl. No. 17/563,149, Igawa et al., filed Dec. 28, 2021.
U.S. Appl. No. 16/318,883, Igawa et al., filed Jan. 18, 2019 (abandoned).
U.S. Appl. No. 16/496,089, Shima et al., filed Sep. 20, 2019.
U.S. Appl. No. 16/758,128, Hosoguchi et al., filed Apr. 22, 2020.
U.S. Appl. No. 16/330,269, Yoneyama et al., Mar. 4, 2019.
U.S. Appl. No. 17/389,534, Hattori et al., filed Jul. 30, 2021.
U.S. Appl. No. 17/485,818, Igawa et al., filed Sep. 27, 2021.
Glatter, "Evaluation of Small-Angle Scattering Data from Lamellar and Cylindrical Particles by the Indirect Transformation Method," J Appl Cryst, 1980, 13:577-584.
Grapentin et al., "Protein-Polydimethylsiloxane Particles in Liquid Vial Monoclonal Antibody Formulations Containing Poloxamer 188," J Pharm Sci, Aug. 2020, 109(8):2393-2404.
Janeway et al., "The interaction of the antibody molecule with specific antigen," Immunobiology: The Immune System in Health and Disease, 2001, section 3.6, 5 pages.
Joshi et al., "Avoiding antibody aggregation during processing: establishing hold times," Biotechnol J, Sep. 2014, 9(9):1195-1205. doi: 10.1002/biot.201400052. Epub May 12, 2014.
Morris, "Epitope Mapping of Protein Antigens by Competition ELISA," The Protein Protocols Handbook, Jan. 1, 1996, pp. 595-600.
Ogiwara et al., "Anti FIXa/FX Bispecific Antibody (Emicizumab) Enhances Plasma Procoagulant Activity in Hemophilia B in the Presence of Very Low Level of Factor IX," Res Pract Thromb Haemost, 2017, 1.suppl 1:749.
Rajagopal et al., "Trehalose Limits Fragment Antibody Aggregation and Influences Charge Variant Formation in Spray-Dried Formulations at Elevated Temperatures," Mol Pharm, Jan. 7, 2019, 16(1):349-358. doi: 10.1021/acs.molpharmaceut.8b01002. Epub Dec. 17, 2018.
Tian et al., "In-depth analysis of subclass-specific conformational preferences of IgG antibodies," IUCrJ, Jan. 1, 2015, 2(Pt 1):9-18. doi: 10.1107/S205225251402209X. eCollection Jan. 1, 2015.
Yada et al., "Spotlight on emicizumab in the management of hemophilia A: patient selection and special considerations," J Blood Med, Jul. 2, 2019, 10:171-181.
USPTO Restriction Requirement in U.S. Appl. No. 16/318,883, dated Oct. 9, 2020, 8 pages.
Fish & Richardson P.C., Reply to Restriction Requirement in U.S. Appl. No. 16/318,883, filed Apr. 1, 2021, 1 page.
USPTO Non-Final Office Action in U.S. Appl. No. 16/318,883, dated May 18, 2021, 19 pages.
Feng et al., "Factor VIII inhibitors and acquired hemophilia," The 11th National Conference on Thrombosis and Hemostasis, 2007 (with English translation).

(56) References Cited

OTHER PUBLICATIONS

U.S. Appl. No. 17/974,914, Hattori et al., filed Oct. 27, 2022.
Bendig, "Humanization of Rodent Monoclonal Antibodies by CDR Grafting," Methods: A Companion to Methods in Enzymology, 1995, 8:83-93.
Casset et al., "A peptide mimetic of an anti-CD4 monoclonal antibody by rational design," Biochemical and Biophysical Research Communications, Jul. 18, 2003, 307:198-205. doi: 10.1016/S0006-291X(03)01131-8.
Chen et al., "Enhancement and destruction of antibody function by somatic mutation: unequal occurrence is controlled by V gene combinatorial associations," EMBO J, Jun. 15, 1995, 14(12):2784-2794. doi: 10.1002/j.1460-2075.1995.tb07278.x.
Maccallum et al., "Antibody-antigen Interactions: Contact Analysis and Binding Site Topography," J Mol Biol, Oct. 11, 1996, 262(5):732-745. doi: 10.1006/jmbi.1996.0548.
Paul, Chapter 9 "Structure and Function of Immunoglobulins," Fundamental Immunology, 3rd ed., Raven Press, NY, 1993, pp. 292-295.
U.S. Appl. No. 18/472,949, Shima et al., filed Sep. 22, 2023.
U.S. Appl. No. 17/915,834, Sato et al., Sep. 29, 2022.
Colman, "Effects of amino acid sequence changes on antibody-antigen interactions," Res Immunol, Jan. 1994, 145(1):33-36.
Soldatov et al., "Main direction for the development and modification of preparations for the treatment of hemophilia," Hematology and Transfusiology, 2016, 61(4):208-215 (with English translation).
U.S. Appl. No. 14/921,590, Hattori et al., filed Oct. 23, 2015.
U.S. Appl. No. 15/172,727, Hattori et al., filed Jun. 3, 2016.
U.S. Appl. No. 15/963,345, Hattori et al., filed Apr. 26, 2018.
U.S. Appl. No. 16/061,429, Igawa et al., filed Jun. 12, 2018.
U.S. Appl. No. 16/099,341, Teranishi et al., filed Nov. 6, 2018.
U.S. Appl. No. 16/226,798, Hattori et al., filed Dec. 20, 2018.
U.S. Appl. No. 16/459,791, Igawa et al., filed Jul. 2, 2019.
U.S. Appl. No. 16/536,385, Hattori et al., filed Aug. 9, 2019.
U.S. Appl. No. 16/825,513, Hattori et al., filed Mar. 20, 2020.
U.S. Appl. No. 17/130,736, Hattori et al., filed Dec. 22, 2020.
"Hemophilia and von Willebrand's Disease: 2. Management," Can Med Assoc J, Jul. 15, 1995, 153(2):147-157.
"Hemostatic Therapy Guideline for Inhibitor-negative Hemophilia Patients," Japanese Journal of Thrombosis and Hemostasis, 2013, 24(6):619-639 (with English translation).
"Hemostatic Therapy Guideline for Inhibitor-positive Hemophilia Patients," Japanese Journal of Thrombosis and Hemostasis, 2013, 24(6):640-658 (with English translation).
ALPROLIX® Intravenous, 2019, 16 pages (with English translation).
Amersdorfer et al., GenPept Accession No. AAC26541, 2001, 8.1.
Asselta et al., "Factor V Deficiency," Semin Thromb Hemost, Jun. 2009, 35(4):382-389.
Astermark et al., "A randomized comparison of bypassing agents in hemophilia complicated by an inhibitor: the FEIBA NovoSeven Comparative (FENOC) Study," Blood, Jan. 15, 2007, 109(2):546-551. Epub Sep. 21, 2006.
Bajaj et al., "A Monoclonal Antibody to Factor IX That Inhibits the Factor VIII:Ca Potentiation of Factor X Activation," J Biol Chem, Sep. 25, 1985, 260(21):11574-11580.
Baker et al., "Immunogenicity of protein therapeutics: The key causes, consequences and challenges," Self/Nonself, Oct. 2010, 1(4):314-322.
Bebbington et al., "High-Level Expression of a Recombinant Antibody From Myeloma Cells Using a Glutamine Synthetase Gene as an Amplifiable Selectable Marker," Biotechnology (NY), Feb. 1992, 10(2):169-175.
Bessos et al., "The Characterization of a Panel of Monoclonal Antibodies to Human Coagulation Factor IX," Thromb Res, Dec. 15, 1985, 40(6):863-867.
Blazar et al., "Infusion of Anti-B7.1 (CD80) and Anti-B7.2 (CD86) Monoclonal Antibodies Inhibits Murine Graft-Versus-Host Disease Lethality In Part Via Direct Effects on CD4+ and CD8+ T Cells," J Immunol, Oct. 15, 1996, 157(8):3250-3259.
Bolton-Maggs et al., "Haemophilias A and B," Lancet, May 24, 2003, 361(9371):1801-1809.
Borrebaeck et al., "Antibody evolution beyond Nature," Nat Biotechnol, Dec. 2002, 20(12):1189-1190.
Bos et al., "Enhanced Transfection of a Bacterial Plasmid into Hybridoma Cells by Electroporation: Application for the Selection of Hybrid Hybridoma (Quadroma) Cell Lines," Hybridoma, Feb. 1992, 11(1):41-51.
Bowen, "Haemophilia A and haemophilia B: molecular insights," Mol Pathol, Feb. 2002, 55(1):1-18.
Brandstetter et al., "X-ray structure of clotting factor IXa: Active site and module structure related to Xase activity and hemophilia B," Proc Natl Acad Sci USA, Oct. 10, 1995, 92(21):9796-9800.
Brennan et al., "Preparation of Bispecific Antibodies by Chemical Recombination of Monoclonal Immunoglobulin G1 Fragments," Science, Jul. 5, 1985, 229(4708):81-83.
Brinkman et al., "Phospholipid-Binding Domain of Factor VIII Is Involved in Endothelial Cell-Mediated Activation of Factor X by Factor IXa," Arterioscler Thromb Vasc Biol, Mar. 1, 2002, 22(3):511-516.
Carter, "Bispecific human IgG by design," J Immunol Methods, Feb. 1, 2001, 248(1-2):7-15.
Cardoso et al., "Neutralizing Human Anti Crotoxin scFv Isolated from a Nonimmunized Phage Library," Scand J Immunol, Apr. 2000, 51(4):337-344.
Chugai Seiyaku Kabushiki Kaisha's letter dated Jun. 12, 2013, regarding oral proceedings scheduled on Jun. 26, 2013, in EP 06730769.4, including Annex A.
Collins et al., "Implications of coagulation factor VIII and IX pharmaco-kinetics in the prophylactic treatment of haemophilia," Haemophilia, Jan. 2011, 17(1):2-10. doi: 10.1111/j.1365-2516.2010.02370.x. Epub Aug. 22, 2010.
Coppola et al., "Acquired Inhibitors of Coagulation Factors: Part I—Acquired Hemophilia A," Semin Thromb Hemost, Jul. 2012, 38(5):433-446. doi: 10.1055/s-0032-1315757. Epub Jun. 27, 2012.
Dahlback B, "Blood coagulation," Lancet, May 6, 2000, 355(9215):1627-1632.
Davie, "A Brief Historical Review of the Waterfall/Cascade of Blood Coagulation," J Biol Chem, Dec. 19, 2003, 278(51):50819-50832. Epub Oct. 21, 2003.
Davie et al., "The Coagulation Cascade: Initiation, Maintenance, and Regulation," Biochemistry, Oct. 29, 1991, 30(43):10363-10370.
De Pascalis et al., "Grafting of 'Abbreviated' Complementarity-Determining Regions Containing Specificity-Determining Residues Essential for Ligand Contact to Engineer a Less Immunogenic Humanized Monoclonal Antibody," J Immunol, Sep. 15, 2002, 169(6):3076-3084.
Deng et al., "An Agonist Murine Monoclonal Antibody to the Human c-Mpl Receptor Stimulates Megakaryocytopoiesis," Blood, Sep. 15, 1998, 92(6):1981-1988.
Edelman et al., "The Covalent Structure of an Entire γG Immunoglobulin Molecule," Proc Natl Acad Sci USA, May 1969, 63(1):78-85.
Edwards et al., "The Remarkable Flexibility of the Human Antibody Repertoire; Isolation of Over One Thousand Different Antibodies to a Single Protein, BLyS," J Mol Biol, Nov. 14, 2003, 334(1):103-118.
Ewert et al., "Stability improvement of antibodies for extracellular and intracellular applications: CDR grafting to stable frameworks and structure-based framework engineering," Methods, Oct. 2004, 34(2):184-199.
Fay, "Activation of factor VIII and mechanisms of cofactor action," Blood Rev, Mar. 2004, 18(1):1-15.
Fay et al., "Nonenzymatic cofactors: factor VIII," Comprehensive Biochemistry, vol. 13, 1986, pp. 35-37.
Fay et al., "The size of human factor VIII heterodimers and the effects produced by thrombin," Biochim et Biophys Acta, Jun. 1986, 23:871(3):268-278.
"FDA Grants Roche Breakthrough Therapy Designation on Hemophilia Drug," BioPharm International, UBM, Apr. 19, 2018. from http://www.biopharminternational.conn/fda-grants-roche-breakthrough-therapy-designation-hemophilia-drug.

(56) References Cited

OTHER PUBLICATIONS

Figini et al., "In Vitro Assembly of Repertoires of Antibody Chains on the Surface of Phage by Renaturation," J Mol Biol, May 27, 1994, 239(1):68-78.
Franchini et al., "Acquired haemophilia A: A 2013 update," Thromb Haemost, Dec. 2013, 110(6):1114-1120. doi:10.1160/TH13-05-0363. Epub Sep. 5, 2013.
Francois et al., "Construction of a Bispecific Antibody Reacting with the α- and β-Chains of the Human IL-2 Receptor," J Immunol, May 15, 1993, 150(10):4610-4619.
Gelderman et al., "The Inhibitory Effect of CD46, CD55, and CD59 on Complement Activation After Immunotherapeutic Treatment of Cervical Carcinoma Cells with Monoclonal Antibodies or Bispecific Monoclonal Antibodies," Lab Invest, Apr. 2002, 82(4):483-493.
Goel et al., "Plasticity within the Antigen-Combining Site May Manifest as Molecular Mimicry in the Humoral Immune Response," J Immunol, Dec. 15, 2004, 173(12):7358-7367.
Gonzales et al., "Minimizing the Immunogenicity of Antibodies for Clinical Application," Tumour Biol, Jan.-Feb. 2005, 26(1):31-43.
Griffin et al., "Analysis of heavy and light chain sequences of conventional camelid antibodies from Camelus dromedarius and Camelus bactrianus species," J Immunol Methods, Mar. 2014, 405:35-46. doi: 10.1016/j.jim.2014.01.003. Epub Jan. 18, 2014.
Griffiths et al., "Human anti-self antibodies with high specificity from phage display libraries," EMBO J, Feb. 1993, 12(2):725-734.
Grosse-Hovest et al., "A recombinant bispecific single-chain antibody induces targeted, supra-agonistic CD28-stimulation and tumor cell killing," Eur J Immunol, May 2003, 33(5):1334-1340.
Guidelines for the management of hemophilia, World Federation of Hemophilia, 2005, 52 pages.
Hagiwara et al., "Effect of Emicizumab in improving coagulation ability in the presence of minor amount of Factor IX," Japanese Journal of Thrombosis and Hemostasis, 2017, 28(2):190 (0-012) (with English translation).
Hammerling et al., "Use of Hybrid Antibody With Anti-KG and Anti-Ferritin Specificities in Locating Cell Surface Antigens by Electron Microscopy," J Exp Med, Dec. 1, 1968, 128(6):1461-1473.
Helfrich et al., "A rapid and versatile method for harnessing scFv antibody fragments with various biological effector functions," J Immunol Methods, Apr. 3, 2000, 237(1-2):131-145.
Hoad et al., "Characterisation of monoclonal antibodies to human factor X/Xa Initial observations with a quantitative ELISA procedure," J Immunol Methods, Feb. 15, 1991, 136(2):269-278.
Holliger et al., "'Diabodies': Small bivalent and bispecific antibody fragments," Proc Natl Acad Sci USA, Jul. 15, 1993, 90(14):6444-6448.
Hoyer, "The factor VIII complex: structure and function," Blood, Jul. 1981, 58(1):1-13.
Hsia et al., "Treatment of acquired factor X inhibitor by plasma exchange with concomitant intravenous immunoglobulin and corticosteroids," Am J Hematol, Apr. 2008, 83(4):318-320.
Hu et al., "Development and Characterization of a Novel Fusion Protein Composed of a Human IgG1 Heavy Chain Constant Region and a Single-Chain Fragment Variable Antibody against Venezuelan Equine Encephalitis Virus," J Biochem, Jan. 2003, 133(1):59-66.
Huse et al., "Generation of a Large Combinatorial Library of the Immunoglobulin Repertoire in Phage Lambda," Science, Dec. 8, 1989, 246(4935):1275-1281.
Igawa, "Next Generation Antibody Therapeutics Using Bispecific Antibody Technology," The Pharmaceutical Society of Japan, Jul. 1, 2017, 137(7):831-836 (with English translation).
Igawa, "Technological Development of Bispecific Antibodies and Creation of Pharmaceuticals," Experimental Medicine, Jul. 1, 2018, 36:1823-1829, fig.3 (with English translation).
Igawa, Chapter 17 "Innovative Technology to develop Bispecific Antibody," CSJ Current Review 30, Part II, Aug. 3, 20180, pp. 157-163, fig. 17-3 (with English translation).

Iwahashi et al., "CDR substitutions of a humanized monoclonal antibody (CC49): contributions of individual CDRs to antigen binding and immunogenicity," Mol Immunol, Oct.-Nov. 1999, 36(15-16):1079-1091.
Janeway et al., Chapter 3 "Structure of the Antibody Molecule and Immunoglobulin Genes," Immunobiology, 3$^{rd}$ ed., Garland Press, 1997, pp. 3:1-3:11.
Jirholt et al., "Exploiting sequence space: shuffling in vivo formed complementarity determining regions into a master framework," Gene, Jul. 30, 1998, 215(2):471-476.
Kang et al., "Linkage of recognition and replication functions by assembling combinatorial antibody Fab libraries along phage surfaces," Proc Natl Acad Sci USA, May 15, 1991, 88(10):4363-4366.
Kanyavuz et al., "Breaking the law: unconventional strategies for antibody diversification," Nat Rev Immunol, Jun. 2019, 19(6):355-368. doi: 10.1038/S41577-019-0126-7.
Karpovsky et al., "Production of Target-Specific Effector Cells Using Hetero-Cross-Linked Aggregates Containing Anti-Target Cell and Anti-Fcγ Receptor Antibodies," J Exp Med, Dec. 1, 1984, 160(6):1686-1701.
Kerschbaumer et al., "An Antibody Specific for Coagulation Factor IX Enhances the Activity of the Intrinsic Factor X-activating Complex," J Biol Chem, Sep. 24, 2004, 279(39):40445-40450. Epub Jul. 20, 2004.
Kim et al., "Mammalian type I interferon receptors consists of two subunits: IFNaR1 and IFNaR2," Gene, Sep. 1, 1997, 196(1-2):279-286.
Kim et al., "Antibody light chain variable domains and their biophysically improved versions for human immunotherapy," mAbs, Jan.-Feb 2014, 6(1):219-235. doi: 10.4161/mabs.26844.
Kitazawa et al., "A bispecific antibody to factors IXa and X restores factor VIII hemostatic activity in a hemophilia A model," Nat Med, Sep. 2012, 18(10):1570-1574. doi: 10.1038/nm.2942. Epub Sep. 30, 2012.
Kroesen et al., "Phase I study of intravenously applied bispecific antibody in renal cell cancer patients receiving subcutaneous interleukin 2," Br J Cancer, Oct. 1994, 70(4):652-661.
Kruse-Jarres, "Inhibitors: our greatest challenge. Can we minimize the incidence?," Haemophilia, Jan. 2013, 19(Suppl 1):2-7. doi: 10.1111/hae.12049.
Kurokawa et al., "Enhanced Fibrinolysis by a Bispecific Monoclonal Antibody Reactive to Fibrin and Tissue Plasminogen Activator," Bio/Technology, Nov. 1989, 7:1163-1167.
Lacroix-Desmazes et al., "Dynamics of factor VIII interactions determine its immunologic fate in hemophilia A," Blood, Jul. 15, 2008, 112(2):240-249. doi: 10.1182/blood-2008-02-124941. Epub May 9, 2008.
Lapan et al., "Interaction of the A1 Subunit of Factor VIIIa and the Serine Protease Domain of Factor X Identified by Zero-length Cross-linking," Thromb Haemost, Sep. 1998, 80(3):418-422.
Le Doussal et al., "Bispecific Monoclonal Antibody-Mediated Targeting of an Indium-111-Labeled DTPA Dimer to Primary Colorectal Tumors: Pharmacokinetics, Biodistribution, Scintigraphy and Immune Response," J Nucl Med, Oct. 1993, 34(10):1662-1671.
Lescar et al., "Crystal Structure of a Cross-reaction Complex between Fab 59.13.7 and Guinea Fowl Lysozyme," Journal of Biological Chemistry, 1995, 270(30):18067-18076.
Lenting et al., "The Life Cycle of Coagulation Factor VIII in View of Its Structure and Function," Blood, Dec. 1, 1998, 92(11):3983-3996.
Lillicrap, "von Willebrand disease: advances in pathogenetic understanding, diagnosis, and therapy," Blood, Nov. 28, 2013, 122(23):3735-3740. doi: 10.1182/blood-2013-06-498303. Epub Sep. 24, 2013.
Lindsay, Chapter 4 "Determination of the Kinetics and Mechanism of tg-FIX Activation by Factor XIa," 2004, pp. 49-75.
Link et al., "Production and Characterization of a Bispecific IgG Capable of Inducing T-Cell-Mediated Lysis of Malignant B Cells," Blood, Jun. 15, 1993, 81(12):3343-3349.
Lloyd et al., "Modelling the human immune response: performance of a $10^{11}$ human antibody repertoire against a broad panel of therapeutically relevant antigens," Protein Eng Des Sel, Mar. 2009, 22(3):159-168. doi: 10.1093/protein/gzn058. Epub Oct. 29, 2008.

(56) References Cited

OTHER PUBLICATIONS

Lofqvist et al., "Haemophilia prophylaxis in young patients—a long-term follow-up," J Intern Med, May 1997, 241(5):395-400.

Lu et al., "Fab-scFv fusion protein: an efficient approach to production of bispecific antibody fragments," J Immunol Methods, Sep. 15, 2002, 267(2):213-226.

Lu et al., "Di-diabody: a novel tetravalent bispecific antibody molecule by design," J Immunol Methods, Aug. 2003, 279(1-2):219-232.

Maeda et al., "Novel Antibody Modification Techniques and their Application to Antibody Therapeutics," Farumashia, 2015, vol. 51, pp. 424-428, claim 5 (with English translation).

Massino et al., "Quantitative analysis of the products of IgG chain recombination in hybrid hybridomas based on affinity chromatography and radioimmunoassay," J Immunol Methods, Feb. 14, 1997, 201(1):57-66.

Mccafferty et al., "Phage antibodies: filamentous phage displaying antibody variable domains," Nature, Dec. 6, 1990, 348(6301):552-554.

Menegatti et al., "Factor X Deficiency," Semin Thromb Hemost, Jun. 2009, 35(4):407-415.

Merchant et al., "An efficient route to human bispecific IgG," Nat Biotechnol, Jul. 1998, 16(7):677-681.

Mertens et al., "Factor VIII-Factor IX Interactions: Molecular Sites Involved in Enzyme-Cofactor Complex Assembly," Thromb Haemost, Aug. 1999, 82(2):209-217.

Milstein et al., "Hybrid hybridomas and their use in immunohistochemistry," Nature, Oct. 6-12, 1983, 305(5934):537-540.

Minami et al., "Bispecific Antibody ACE910 Improves Coagulation Function in Plasma of Patients with Factor XI Deficiency," Japanese Journal of Thrombosis and Hemostasis, 2015, 26(2):188 (0-024) (with English translation).

Miyata, "Factor IX Abnormality—Molecular Defects of Factor IX," Japanese Journal of Thrombosis and Hemostasis, 1991, 2(1):1-11 (with English translation).

Miyazaki et al., "Generation of bispecific IgG, which mimics the cofactor function of blood coagulation factor VIII," 2006, 2P-B-161.

Morrison, "Two heads are better than one," Nat Biotechnol, Nov. 2007, 25(11):1233-1234.

Muto et al., "Anti-factor IXa/X bispecific antibody (ACE910): hemostatic potency against ongoing bleeds in a hemophilia A model and the possibility of routine supplementation," J Thromb Haemost, Feb. 2014, 12(2):206-213. doi: 10.1111/jth.12474.

Muto et al., "Anti-factor IXa/X bispecific antibody ACE910 prevents joint bleeds in a long-term primate model of acquired hemophilia A," Blood, Nov. 13, 2014, 124(20):3165-3171. doi: 10.1182/blood-2014-07-585737. Epub Oct. 1, 2014.

"National Haemophilia Foundation (NHF) Medical and Scientific Advisory Council (MASAC) Recommendations Concerning Prophylaxis," Medical Bulletin, 1994, No. 193, 1 page.

Nilsson et al., "Induction of split tolerance and clinical cure in high-responding hemophiliacs with factor IX antibodies," Proc Natl Acad Sci USA, Dec. 1986, 83(23):9169-9173.

Nilsson et al., "Twenty-five years' experience of prophylactic treatment in severe haemophilia A and B," J Intern Med, Jul. 1992, 232(1):25-32.

Nishimura et al., "Factor IX Fukuoka. Substitution of ASN92 by his in the second epidermal growth factor-like domain results in defective interaction with factors VIIIa/X," J Biol Chem, Nov. 15, 1993, 268(32):24041-24046.

Nitta et al., "Preliminary trial of specific targeting therapy against malignant glioma," Lancet, Feb. 17, 1990, 335(8686):368-371.

Nogami, "Bispecific Antibody that Substitutes for Factor VIII in the Treatment of Childhood Hemophilia A," The Japanese Journal of Pediatric Hematology/Oncology, 2016, 53(2):69-74 (with English translation).

Okubo et al., "The Production and Characterization of Four Monoclonal Antibodies to Human Factor X," J Nara Med Ass, 1987, 38(1):20-28.

Oldenburg et al., "Emicizumab Prophylaxis in Hemophilia A with Inhibitors," N Engl J Med, Aug. 31, 2017, 377(9):809-818. doi: 10.1056/NEJMoa1703068. Epub Jul. 10, 2017.

Panka et al., "Variable region framework differences result in decreased or increased affinity of variant anti-digoxin antibodies," Proc Natl Acad Sci USA, May 1988, 85(9):3080-3084.

Paul, Chapter 8 "Immunogenicity and Antigen Structure," Fundamental Immunology, $3^{rd}$ ed., Raven Press, NY, 1993, p. 242.

Piper et al., "Interferon Therapy in Primary Care," Prim Care Update Ob Gyns, Jul. 2001, 8(4):163-169.

Portolano et al., "Lack of Promiscuity in Autoantigen-Specific H and L Chain Combinations as Revealed by Human H and L Chain 'Roulette'," J Immunol, Feb. 1, 1993, 150(3):880-887.

Price et al., "Tissue factor and tissue factor pathway inhibitor," Anaesthesia, May 2004, 59(5):483-492.

Ridgway et al., "'Knobs-into-holes' engineering of antibody CH3 domains for heavy chain heterodimerization," Protein Eng, Jul. 1996, 9(7):617-621.

Rudikoff et al., "Single amino acid substitution altering antigen-binding specificity," Proc Natl Acad Sci USA, Mar. 1982, 79(6):1979-1983.

Ruef et al., "A Bispecific Antifibrin-antiplatelet Urokinase Conjugate (BAAUC) Induces Enhanced Clot Lysis and Inhibits Platelet Aggregation," Thromb Haemost, Jul. 1999, 82(1):109-114.

Ruggeri et al., "von Willebrand Factor and von Willebrand Disease," Blood, Oct. 1987, 70(4):895-904.

Saito et al., "Factor VIII Mimetic Antibody: (1) Establishment and Characterization of Anti-factor IX/anti-factor X Bispecific Antibodies," International Society of Thrombosis and Haemostasis, 2005, 3(Suppl s1):OR160.

Saito et al., "Establishment of Factor VIII Mimetic Antibodies and Their In Vitro Activities in Hemophilia A," National Hemophilia Foundation Symposia, 2006, 1 page.

Sampei et al., "Identification and multidimensional optimization of an asymmetric bispecific IgG antibody mimicking the function of factor VIII cofactor activity," PLoS ONE, Feb. 2013, 8(2):e57479. doi: 0.1371/journal.pone.0057479. Epub Feb. 28, 2013.

Sampei et al., "Non-antigen-contacting region of an asymmetric bispecific antibody to factors IXa/X significantly affects factor VIII-mimetic activity," mAbs, Jan./Feb. 2015, 7(1):120-128. doi: 10.4161/19420862. 2015. 989028.

Sato et al., "Properties of Two VEGF Receptors, Flt-1 and KDR, in Signal Transduction," Ann NY Acad Sci, May 2000, 902:201-205 and discussion 205-207.

Schmidt et al., Chapter 18 "Functions of the Blood," Human Physiology, Moscow, 1996, v. 2, pp. 431-436 (with what are believed to be the corresponding p. from an English version of Human Physiology).

Schmidt et al., Chapter 29 "Functions of the Alimentary Canal," Human Physiology, Moscow, 1996, v. 3, p. 764 (with what are believed to be the corresponding pages from an English version of Human Physiology).

Schmidt et al., Chapter 18 "Functions of the Blood," Human Physiology, $2^{nd}$ completely revised ed., Springer-Verlag, 1989, pp. 418-423.

Schmidt et al., Chapter 29, "Functions of the Alimentary Canal," Human Physiology, $2^{nd}$ completely revised ed., Springer-Verlag, 1989, p. 716.

Schmidt et al., "Structure-Function Relationships in Factor IX and Factor IXa," Trends Cardiovasc Med, Jan. 2003, 13(1):39-45.

Segal et al., "Introduction: bispecific antibodies," J Immunol Methods, Feb. 1, 2001, 248(1-2):1-6.

Shalaby et al., "Development of Humanized Bispecific Antibodies Reactive with Cytotoxic Lymphocytes and Tumor Cells Overexpressing the *HER2* Protooncogene," J Exp Med, Jan. 1, 1992, 175(1):217-225.

Shima, "Bispecific antibodies to coagulation factors IXa and X mimic the function of factor VIII," Haemophilia, 2006 World Federation of Haemophilia, 2006, 12 (Suppl. 2).

(56) References Cited

OTHER PUBLICATIONS

Shima et al., "Factor VIII Mimetic Antibody: (2) In Vitro Assessment of Cofactor Activity in Hemophilia A," Rinsho Ketsueki, Aug. 30, 2005, 46(8):777 (#WS-36-5) (with English translation).

Shima et al., "Factor VIII Mimetic Antibody: (2) In Vitro Assessment of Cofactor Activity in Hemophilia A," International Society of Thrombosis and Haemostasis, 2005, 3(Suppl s1):P0038.

Shima et al., "The Forefront and Prospects of Hemophilia Treatment," J Jpn Pediatr Soc, Mar. 1, 2017, 121(3):543-552 (with English translation).

Shima et al., "Factor VIII-Mimetic Function of Humanized Bispecific Antibody in Hemophilia A," N Engl J Med, May 26, 2016, 374(21):2044-2053. doi: 10.1056/NEJMoa1511769.

Shirahata, "5. Future Prospects, 1) Direction for Improvement of Coagulation Factor Preparations," Iyaku (Medicine and Drug) Journal Co., Ltd., Jan. 15, 2009, 280-289 (with English translation).

Singer et al., "Structure of Proteins," Genes & Genomes, Moscow, Mir, 1998, pp. 63-64 (with what are believed to be the corresponding p. from an English version of Genes & Genomes).

Soeda et al., "Factor VIII Mimetic Antibody: (1) Establishment of Anti-FIXa/FX Bispecific Antibodies," Rinsho Ketsueki, Aug. 30, 2005, 46(8):728 (#PL-2-4) (with English translation).

Soeda et al., "FVIII-Mimetic Action of Anti-FIXa/Anti-FX Bispecific Antibodies Produced by the Phage Library Method," Jpn J Thromb Hemost, Oct. 1, 2005, 16(5):526 (#O-24) (with English translation).

Stickney et al., "Bifunctional Antibody: A Binary Radiopharmaceutical Delivery System for Imaging Colorectal Carcinoma," Cancer Res, Dec. 15, 1991, 51(24):6650-6655.

Suresh et al., "Advantages of bispecific hybridomas in one-step immunocytochemistry and immunoassays," Methods Enzymol, 1986, 121:210-228.

Suresh et al., "Bispecific Monoclonal Antibodies from Hybrid Hybridomas," Proc Natl Acad Sci USA, Oct. 1986, 83(20):7989-7993.

Taki, The Journal of Japanese Society on Thrombosis and Hemostasis, Feb. 2, 2002, 13(1):109-113 (with English translation).

Tamura et al., "Structural Correlates of an Anticarcinoma Antibody: Identification of Specificity-Determining Residues (SDRs) and Development of a Minimally Immunogenic Antibody Variant by Retention of SDRs Only," J Immunol, Feb. 1, 2000, 164(3):1432-1441.

Tarantino et al., "Safety of human plasma-derived clotting factor products and their role in haemostasis in patients with haemophilia: meeting report," Haemophilia, Sep. 2007, 13(5):663-669.

Taylor et al., "A new era for hemophilia B treatment," Blood, Apr. 7, 2016, 127(14):1734-1736.

Uchida et al., "A first-in-human phase 1 study of ACE910, a novel factor VIII-mimetic bispecific antibody, in healthy subjects," Blood, Mar. 31, 2016, 127(13):1633-1641. doi: 10.1182/blood-2015-06-650226. Epub Dec. 1, 2015.

Vaughan et al., "Human Antibodies with Sub-nanomolar Affinities Isolated from a Large Non-immunized Phage Display Library," Nat Biotechnol, Mar. 1996, 14(3):309-314.

Vehar et al., "Structure of human factor VIII," Nature, Nov. 22-28, 1984, 312(5992):337-342.

Weiner et al., "A Human Tumor Xenograft Model of Therapy with a Bispecific Monoclonal Antibody Targeting c-erbB-2 and CD16," Cancer Res, Jan. 1, 1993, 53(1):94-100.

Weiner et al., "The Role of T Cell Activation in Anti-CD3 x Antitumor Bispecific Antibody Therapy," J Immunol, Mar. 1, 1994, 152(5):2385-2392.

Wood et al., "Expression of active human factor VIII from recombinant DNA clones," Nature, Nov. 22-28, 1984, 312(5992):330-337.

Xiang et al., "Production of Murine V-Human Crl Chimeric Anti-Tag72 Antibody Using V Region cDNA Amplified by PCR," Mol Immunol, Aug. 1990, 27(8):809-817.

Yarilin, Fundamentals of Immunology, Moscow, Medicina, 1999, p. 171 (with English translation).

Yoneyama et al., "A Pharmacometric Approach to Substitute for a Conventional Dose-Finding Study in Rare Diseases: Example of Phase III Dose Selection for Emicizumab in Hemophilia A," Clin Pharmacokinet, Sep. 2018, 57(9):1123-1134. doi: 10.1007/s40262-017-0616-3.

Zuo et al., "An efficient route to the production of an IgG-like bispecific antibody," Protein Eng, May 2000, 13(5):361-367.

International Search Report for App. Ser. No. PCT/JP2017/027152, mailed Oct. 17, 2017, 2 pages.

Igawa et al., "Generation of a Novel Bispecific Antibody (ACE910) Against Activated Factor IX and Factor X Mimicking the Function of Factor VIII Cofactor Activity," Blood, Nov. 16, 2012, 120(21):1126, 6 pages.

U.S. Appl. No. 18/346,920, Hattori et al., filed Jul. 5, 2023.

U.S. Appl. No. 18/081,874, Igawa et al., filed Dec. 15, 2022.

Brown et al., "Tolerance to Single, but Not Multiple, Amino Acid Replacements in Antibody $V_H$ CDR2," J Immunol, May 1, 1996, 156(9):3285-3291.

U.S. Appl. No. 18/737,387, Igawa et al., filed Jun. 7, 2024.

U.S. Appl. No. 18/905,228, Hattori et al., filed Oct. 3, 2024.

Badri et al., "Optimization of radiation dosing schedules for proneural glioblastoma," J Math Biol, Apr. 2016, 72(5):1301-1336.

Baylot et al., "Chapter 13 TCTP Has a Crucial Role in the Different Stages of Prostate Cancer Malignant Progression," Results Probl Cell Differ, 2017, 64:255-261.

Koga et al., "Efficient production of bispecific antibody by FAST-Ig™ and its application to NXT007 for the treatment of hemophilia A," mAbs, Jan.-Dec. 2023, 15(1):2222441 and Supplementary Material to KOGA et al., mAbs, Jan.-Dec. 2023, 15(1):2222441, 60 pages.

Muller et al., "Spliceosomal Peptide P140 for Immunotherapy of Systemic Lupus Erythematosus—Results of an Early Phase II Clinical Trial," Arthritis Rheum, Dec. 2008, 58(12):3873-3883.

USPTO Non-Final Office Action in U.S. Appl. No. 16/093,495, dated Oct. 22, 2024, 150 pages.

\* cited by examiner

BISPECIFIC ANTIBODY EXHIBITING INCREASED ALTERNATIVE FVIII-COFACTOR-FUNCTION ACTIVITY

CROSS-REFERENCE TO RELATED APPLICATIONS

This application is a continuation of U.S. application Ser. No. 16/318,883, filed Jan. 18, 2019, which is the National Stage of International Application No. PCT/JP2017/027152, filed Jul. 27, 2017, which claims the benefit of Japanese Application No. 2016-150769, filed on Jul. 29, 2016.

SEQUENCE LISTING

This application contains a Sequence Listing that has been submitted electronically as an ASCII text file named SequenceListing.txt. The ASCII text file, created on Nov. 16, 2021, is 48.5 kilobytes in size. The material in the ASCII text file is hereby incorporated by reference in its entirety.

TECHNICAL FIELD

The present invention relates to antibodies having enhanced FVIII cofactor function-substituting activity, pharmaceutical formulations comprising such antibodies as active ingredients, methods for producing such antibodies, and such. More specifically, the present invention relates to bispecific antibodies having FVIII cofactor function-substituting activity higher than that of ACE910 (Emicizumab).

BACKGROUND ART

Hemophilia A is a bleeding abnormality caused by a hereditary decrease or deficiency of blood coagulation factor VIII (FVIII) function. Hemophilia A patients are generally administered with an FVIII formulation for the bleeding (on-demand administration). In recent years, FVIII formulations are administered prophylactically to prevent bleeding events (NPLs 1 and 2) (preventive administration). The blood half-life of FVIII formulations is approximately 12 hours to 16 hours. Therefore, for continuous prevention, FVIII formulations are administered to patients three times a week (NPLs 3 and 4). In on-demand administrations, FVIII formulations are also additionally administered when necessary at regular intervals to prevent rebleeding. In addition, FVIII formulations are administered intravenously. Therefore, there has been a strong need for pharmaceutical agents with lesser burden of administration than FVIII formulations.

Antibodies against FVIII (inhibitors) occasionally develop in hemophilia patients. Such inhibitors counteract the effects of the FVIII formulations. For bleeding in patients who have developed inhibitors (inhibitor patients), bypassing formulations are administered. Their mechanisms of action are not dependent on FVIII function, that is, the function of catalyzing the activation of blood coagulation factor X (FX) by activated blood coagulation factor IX (FIXa). Therefore, in some cases, bypassing formulations cannot sufficiently stop the bleeding. Accordingly, there has been a strong need for pharmaceutical agents that are not affected by the presence of inhibitors and which can substitute for FVIII function.

As a means for solving these problems, bispecific antibodies that substitute for FVIII function and their uses have been reported (PTLs 1, 2, 3, and 4). The bispecific antibodies against FIXa and FX can substitute for FVIII function and exhibit FVIII cofactor function-substituting activity by positioning the two factors in proximity (NPL 5). The FVIII cofactor function-substituting activity of the bispecific antibodies against FIXa and FX refers to the activity calculated from examination of FX activation reaction by FIXa using colorimetric determination methods and a thrombin generation assay using hemophilia A plasma. It has been reported that the FVIII cofactor function-substituting activity of the antibodies can be enhanced by optimizing the affinity towards FIXa and FX (NPL 6). Furthermore, the FVIII cofactor function-substituting activity of the antibodies is known to be affected by the IgG isotype, disulfide bond pattern, amino acid sequence of the hinge region, and the presence or absence of sugar chains in the Fc region (NPL 7). ACE910 (Emicizumab), which is one of these antibodies and has high FVIII cofactor function-substituting activity, has been reported to exhibit hemostatic effects in monkey models of hemophilia (NPLs 8 and 9). Furthermore, in clinical trials of ACE910 (Emicizumab) on healthy subjects, excellent pharmacokinetics (long half-life) and tolerability have been confirmed (NPL 10), and in clinical trials on hemophilia A patients with or without inhibitors, the number of bleeding episodes was remarkably suppressed by ACE910 (Emicizumab) administration compared to before ACE910 (Emicizumab) administration (NPL 11).

As described, suppressive effects on the number of bleeding episodes have been observed for ACE910 (Emicizumab) in clinical trials. However, since improvement effects by ACE910 (Emicizumab) on the maximum amount of thrombin generation (peak height) in in vitro thrombin generation assays using FVIII-deficient plasma were lower than the normal level of FVIII activity which is 100 U/dL (NPL 8), further enhancement of drug efficacy has been desired. In addition, bispecific antibodies which can further reduce the administered dose through improvement of specific activity, and such, have been desired.

ACE910 (Emicizumab) is a bispecific antibody having high FVIII cofactor function-substituting activity, which was prepared as follows: anti-FIX antibody and/or anti-FIXa antibody and anti-FX antibody acquired by animal immunization were humanized to obtain hBS1 as a lead antibody; and many amino acid substitutions were introduced into the lead antibody to multilaterally optimize it (NPL 6 and PTL 4). For enhancement of drug efficacy and improvement of specific activity, there is a need for a bispecific antibody that substitutes for FVIII function, which has higher maximum activity (maximum FVIII cofactor function-substituting activity) than ACE910 (Emicizumab) and can also exhibit FVIII cofactor function-substituting activity at concentrations lower than that of ACE910 (Emicizumab). However, to date, there are no reports of bispecific antibodies having FVIII cofactor function-substituting activity higher than that of ACE910 (Emicizumab) from the viewpoint of concentration and maximum activity.

CITATION LIST

Patent Literature

[PTL 1] WO 2005/035754
[PTL 2] WO 2005/035756
[PTL 3] WO 2006/109592
[PTL 4] WO 2012/067176

Non-Patent Literature

[NPL 1] Blood 58, 1-13 (1981)
[NPL 2] Nature 312, 330-337 (1984)
[NPL 3] Nature 312, 337-342 (1984)
[NPL 4] Biochim. Biophys. Acta 871, 268-278 (1986)
[NPL 5] Nat Med. 2012 October; 18 (10): 1570-4.
[NPL 6] PLOS One. 2013; 8 (2): e57479.
[NPL 7] MAbs. 2015; 7 (1): 120-8.
[NPL 8] J Thromb Haemost. 2014 February; 12 (2): 206-213.
[NPL 9] Blood. 2014 Nov. 13; 124 (20): 3165-71.
[NPL 10] Blood. 2016 Mar. 31; 127 (13): 1633-1641
[NPL 11] New Eng J Med 2016 May 26; 374 (21): 2044-2053

SUMMARY OF INVENTION

Problems to be Solved by the Invention

The present invention was achieved in view of the above circumstances. An objective of the present invention is to provide antibodies having increased FVIII cofactor function-substituting activity, pharmaceutical formulations comprising such antibodies as active ingredients, and methods of producing them. More specifically, an objective of the present invention is to provide mutations in the heavy-chain and light-chain variable region sites or novel light chain CDR sequences that are different from those of ACE910 (Emicizumab) for preparing bispecific antibodies having FVIII cofactor function-substituting activity higher than that of ACE910 (Emicizumab), bispecific antibodies which have such mutations or such CDR sequences and recognize FIX and/or FIXa, and FX, methods of producing such antibodies, pharmaceutical formulations comprising such antibodies as active ingredients, and methods for treating hemophilia A using such pharmaceutical formulations.

Means for Solving the Problems

To solve the above-mentioned problems, the present inventors produced variants of ACE910 (Emicizumab) by introducing amino acid substitutions into various sites of its light-chain variable regions and succeeded in discovering amino acid substitutions that enhance the FVIII cofactor function-substituting activity. The inventors also succeeded in obtaining from human antibody libraries, novel light chains having sequences different from those of ACE910, which have FVIII cofactor function-substituting activity, and in identifying amino acid substitutions in the light chains, which enhance the FVIII cofactor function-substituting activity. Furthermore, when variants of bispecific antibodies prepared by using these light chains were produced by introducing amino acid substitutions into various sites in the heavy chain variable regions, the inventors succeeded in discovering amino acid substitutions that enhance the FVIII cofactor function-substituting activity. The present invention is based on such findings, and specifically provides the following:

[1] a polypeptide comprising an antibody light chain variable domain, wherein the polypeptide comprises an antibody light chain variable domain having the light chain CDR 1, 2, and 3 amino acid sequences of SEQ ID NOs: 7, 8, and 9, respectively, or an antibody light chain variable domain having the amino acid sequence of SEQ ID NO: 47, in which one or more amino acids selected from the group consisting of K24, A25, S26, R27, N28, I29, E30, R31, Q32, L33, A34, Q50, A51, S52, R53, K54, E55, S56, Q89, Q90, Y91, S92, D93, P94, P95, L96, and T97, numbered according to the Kabat numbering system, have been substituted with arbitrary amino acids other than cysteine;

[2] a bispecific antibody which recognizes FIX and/or FIXa, and FX, wherein the antibody comprises an antibody light chain variable domain having the light chain CDR 1, 2, and 3 amino acid sequences of SEQ ID NOs: 7, 8, and 9, respectively, or an antibody light chain variable domain having the amino acid sequence of SEQ ID NO: 47, in which one or more amino acids selected from the group consisting of K24, A25, S26, R27, N28, I29, E30, R31, Q32, L33, A34, Q50, A51, S52, R53, K54, E55, S56, Q89, Q90, Y91, S92, D93, P94, P95, L96, and T97, numbered according to the Kabat numbering system, have been substituted with arbitrary amino acids other than cysteine;

[3] a bispecific antibody which recognizes FIX and/or FIXa, and FX, wherein a first polypeptide and a third polypeptide form a pair and a second polypeptide and a fourth polypeptide form a pair, wherein the first polypeptide comprises the antibody heavy chain variable domain amino acid sequence of SEQ ID NO: 45 and the second polypeptide comprises the antibody heavy chain variable domain amino acid sequence of SEQ ID NO: 46, wherein either the third polypeptide or the fourth polypeptide comprises the antibody light chain variable domain amino acid sequence of SEQ ID NO: 47 and the other polypeptide comprises an antibody light chain variable domain having the light chain CDR 1, 2, and 3 amino acid sequences of SEQ ID NOs: 7, 8, and 9, respectively, or an antibody light chain variable domain having the amino acid sequence of SEQ ID NO: 47, and wherein in the other polypeptide one or more amino acids selected from the group consisting of K24, A25, S26, R27, N28, I29, E30, R31, Q32, L33, A34, Q50, A51, S52, R53, K54, E55, S56, Q89, Q90, Y91, S92, D93, P94, P95, L96, and T97, numbered according to the Kabat numbering system, have been substituted with arbitrary amino acids other than cysteine;

[4] a polypeptide comprising an antibody heavy chain variable domain, wherein the polypeptide comprises an antibody heavy chain variable domain having the heavy chain CDR 1, 2, and 3 amino acid sequences of SEQ ID NOs: 1, 2, and 3, respectively, or an antibody heavy chain variable domain having the amino acid sequence of SEQ ID NO: 45, in which one or more amino acids selected from the group consisting of Y31, Y32, D33, I34, Q35, S50, I51, S52, P52a, S53, G54, Q55, S56, T57, Y58, Y59, R60, R61, E62, V63, K64, G65, R95, T96, G97, R98, E99, Y100, G100a, G100b, G100c, W100d, Y100e, F100f, D101, and Y102, numbered according to the Kabat numbering system, have been substituted with arbitrary amino acids other than cysteine;

[5] a bispecific antibody which recognizes FIX and/or FIXa, and FX, wherein the antibody comprises an antibody heavy chain variable domain having the heavy chain CDR 1, 2, and 3 amino acid sequences of SEQ ID NOs: 1, 2, and 3, respectively, or comprises an antibody heavy chain variable domain having the amino acid sequence of SEQ ID NO: 45, in which one or more amino acids selected from the group consisting of Y31, Y32, D33, I34, Q35, S50, I51, S52, P52a, S53, G54, Q55, S56, T57, Y58, Y59, R60, R61, E62, V63, K64, G65, R95, T96, G97, R98, E99, Y100, G100a, G100b, G100c, W100d, Y100e, F100f, D101, and Y102, numbered according to the Kabat numbering system, have been substituted with arbitrary amino acids other than cysteine;

[6] a polypeptide comprising an antibody heavy chain variable domain, wherein the polypeptide comprises an antibody heavy chain variable domain having the heavy chain CDR 1, 2, and 3 amino acid sequences of SEQ ID NOs: 4, 5, and 6, respectively, or an antibody heavy chain variable domain having the amino acid sequence of SEQ ID NO: 46, in which one or more amino acids selected from the group consisting of D31, N32, N33, M34, D35, D50, I51, N52, T52a, R53, S54, G55, G56, S57, I58, Y59, N60, E61, E62, F63, Q64, D65, R95, K96, S97, Y98, G99, Y100, Y100a, L100b, D101, and E102, numbered according to the Kabat numbering system, have been substituted with arbitrary amino acids other than cysteine;

[7] a bispecific antibody which recognizes FIX and/or FIXa, and FX, wherein the antibody comprises an antibody heavy chain variable domain having the heavy chain CDR 1, 2, and 3 amino acid sequences of SEQ ID NOs: 4, 5, and 6, respectively, or comprises an antibody heavy chain variable domain having the amino acid sequence of SEQ ID NO: 46, in which one or more amino acids selected from the group consisting of D31, N32, N33, M34, D35, D50, I51, N52, T52a, R53, S54, G55, G56, S57, I58, Y59, N60, E61, E62, F63, Q64, D65, R95, K96, S97, Y98, G99, Y100, Y100a, L100b, D101, and E102, numbered according to the Kabat numbering system, have been substituted with an arbitrary amino acids other than cysteine;

[8] a bispecific antibody which recognizes FIX and/or FIXa, and FX, wherein a first polypeptide and a third polypeptide form a pair and a second polypeptide and a fourth polypeptide form a pair, wherein the second polypeptide comprises the antibody heavy chain variable domain amino acid sequence of SEQ ID NO: 46, the third polypeptide comprises the antibody light chain amino acid sequence of SEQ ID NO: 42, and the fourth polypeptide comprises the antibody light chain amino acid sequence of SEQ ID NO: 44, and the first polypeptide comprises an antibody heavy chain variable domain having the heavy chain CDR 1, 2, and 3 amino acid sequences of SEQ ID NOs: 1, 2, and 3, respectively, or an antibody heavy chain variable domain having the amino acid sequence of SEQ ID NO: 45, and wherein in the first polypeptide one or more amino acids selected from the group consisting of Y31, Y32, D33, I34, Q35, S50, I51, S52, P52a, S53, G54, Q55, S56, T57, Y58, Y59, R60, R61, E62, V63, K64, G65, R95, T96, G97, R98, E99, Y100, G100a, G100b, G100c, W100d, Y100e, F100f, D101, and Y102, numbered according to the Kabat numbering system, have been substituted with arbitrary amino acids other than cysteine;

[9] a bispecific antibody which recognizes FIX and/or FIXa, and FX, wherein a first polypeptide and a third polypeptide form a pair and a second polypeptide and a fourth polypeptide form a pair, wherein the first polypeptide comprises the antibody heavy chain amino acid sequence of SEQ ID NO: 45, the third polypeptide comprises the antibody light chain amino acid sequence of SEQ ID NO: 43, and the fourth polypeptide comprises the antibody light chain amino acid sequence of SEQ ID NO: 44, and the second polypeptide comprises an antibody heavy chain variable domain having the heavy chain CDR 1, 2, and 3 amino acid sequences of SEQ ID NOs: 4, 5, and 6, respectively, or an antibody heavy chain variable domain having the amino acid sequence of SEQ ID NO: 46, and wherein in the second polypeptide one or more amino acids selected from the group consisting of D31, N32, N33, M34, D35, D50, I51, T52a, N52, R53, S54, G55, G56, S57, I58, Y59, N60, E61, E62, F63, Q64, D65, R95, K96, S97, Y98, G99, Y100, Y100a, L100b, D101, and E102, numbered according to the Kabat numbering system, have been substituted with arbitrary amino acids other than cysteine;

[10] an antibody light chain, which comprises any one of the amino acid sequences selected from the following (a1) to (a6), (b1) to (b23), and (c1) to (c3):
(a1) an antibody light chain comprising the amino acid sequence of SEQ ID NO: 13 (QNK131);
(a2) an antibody light chain comprising the amino acid sequence of SEQ ID NO: 14 (QNK284);
(a3) an antibody light chain comprising the amino acid sequence of SEQ ID NO: 15 (QNK315);
(a4) an antibody light chain comprising the amino acid sequence of SEQ ID NO: 16 (QNL182);
(a5) an antibody light chain comprising the amino acid sequence of SEQ ID NO: 17 (QNL492);
(a6) an antibody light chain comprising the amino acid sequence of SEQ ID NO: 18 (QNL576);
(b1) an antibody light chain comprising the amino acid sequence of SEQ ID NO: 19 (JNK131);
(b2) an antibody light chain comprising the amino acid sequence of SEQ ID NO: 20 (JNK163);
(b3) an antibody light chain comprising the amino acid sequence of SEQ ID NO: 21 (JNK252);
(b4) an antibody light chain comprising the amino acid sequence of SEQ ID NO: 22 (JNK263);
(b5) an antibody light chain comprising the amino acid sequence of SEQ ID NO: 23 (JNK339);
(b6) an antibody light chain comprising the amino acid sequence of SEQ ID NO: 24 (JNK348);
(b7) an antibody light chain comprising the amino acid sequence of SEQ ID NO: 25 (JNK351);
(b8) an antibody light chain comprising the amino acid sequence of SEQ ID NO: 26 (JNK360);
(b9) an antibody light chain comprising the amino acid sequence of SEQ ID NO: 27 (JNK378);
(b10) an antibody light chain comprising the amino acid sequence of SEQ ID NO: 28 (JNK382);
(b11) an antibody light chain comprising the amino acid sequence of SEQ ID NO: 29 (JNL036);
(b12) an antibody light chain comprising the amino acid sequence of SEQ ID NO: 30 (JNL072);
(b13) an antibody light chain comprising the amino acid sequence of SEQ ID NO: 31 (JNL095);
(b14) an antibody light chain comprising the amino acid sequence of SEQ ID NO: 32 (JNL176);
(b15) an antibody light chain comprising the amino acid sequence of SEQ ID NO: 33 (JNL208);
(b16) an antibody light chain comprising the amino acid sequence of SEQ ID NO: 34 (JNL224);
(b17) an antibody light chain comprising the amino acid sequence of SEQ ID NO: 35 (JNL260);
(b18) an antibody light chain comprising the amino acid sequence of SEQ ID NO: 36 (JNL056);
(b19) an antibody light chain comprising the amino acid sequence of SEQ ID NO: 37 (JNL059);

(b20) an antibody light chain comprising the amino acid sequence of SEQ ID NO: 38 (JNL226);
(b21) an antibody light chain comprising the amino acid sequence of SEQ ID NO: 39 (JNL250);
(b22) an antibody light chain comprising the amino acid sequence of SEQ ID NO: 40 (JNL263);
(b23) an antibody light chain comprising the amino acid sequence of SEQ ID NO: 41 (JNL281);
(c1) an antibody light chain comprising the amino acid sequence of SEQ ID NO: 42 (QAL187);
(c2) an antibody light chain comprising the amino acid sequence of SEQ ID NO: 43 (QAL201); and
(c3) an antibody light chain comprising the amino acid sequence of SEQ ID NO: 44 (JYL280);

[11] a bispecific antibody which recognizes FIX and/or FIXa, and FX, wherein a first polypeptide (d) and a third polypeptide (f) form a pair, a second polypeptide (e) and a fourth polypeptide (g) form a pair, and wherein each of the polypeptides is the following polypeptide:

(d) the first polypeptide is (d1) or (d2):
  (d1) a polypeptide which comprises an antibody heavy chain variable domain having the heavy chain CDR 1, 2, and 3 amino acid sequences of SEQ ID NOs: 1, 2, and 3, respectively, or an antibody heavy chain variable domain having the amino acid sequence of SEQ ID NO: 45;
  (d2) a polypeptide which comprises an antibody heavy chain variable domain having the heavy chain CDR 1, 2, and 3 amino acid sequences of SEQ ID NOs: 1, 2, and 3, respectively, or an antibody heavy chain variable domain having the amino acid sequence of SEQ ID NO: 45, in which one or more amino acids selected from the group consisting of Y31, Y32, D33, I34, Q35, S50, I51, S52, P52a, S53, G54, Q55, S56, T57, Y58, Y59, R60, R61, E62, V63, K64, G65, R95, T96, G97, R98, E99, Y100, G100a, G100b, G100c, W100d, Y100e, F100f, D101, and Y102, numbered according to the Kabat numbering system, have been substituted with arbitrary amino acids other than cysteine;

(e) the second polypeptide is (e1) or (e2):
  (e1) a polypeptide which comprises an antibody heavy chain variable domain having the heavy chain CDR 1, 2, and 3 amino acid sequences of SEQ ID NOs: 4, 5, and 6, respectively, or an antibody heavy chain variable domain having the amino acid sequence of SEQ ID NO: 46;
  (e2) a polypeptide which comprises an antibody heavy chain variable domain having the heavy chain CDR 1, 2, and 3 amino acid sequences of SEQ ID NOs: 4, 5, and 6, respectively, or an antibody heavy chain variable domain having the amino acid sequence of SEQ ID NO: 46, in which one or more amino acids selected from the group consisting of D31, N32, N33, M34, D35, D50, I51, T52a, N52, R53, S54, G55, G56, S57, I58, Y59, N60, E61, E62, F63, Q64, D65, R95, K96, S97, Y98, G99, Y100, Y100a, L100b, D101, and E102, numbered according to the Kabat numbering system, have been substituted with arbitrary amino acids other than cysteine;

(f) the third polypeptide is (f1), (f2), or (f3):
  (f1) a polypeptide which comprises an antibody light chain variable domain having the light chain CDR 1, 2, and 3 amino acid sequences of SEQ ID NOs: 7, 8, and 9, respectively, or an antibody light chain variable domain having the amino acid sequence of SEQ ID NO: 47;
  (f2) a polypeptide which comprises an antibody light chain variable domain having the light chain CDR 1, 2, and 3 amino acid sequences of SEQ ID NOs: 7, 8, and 9, respectively, or an antibody light chain variable domain having the amino acid sequence of SEQ ID NO: 47, in which one or more amino acids selected from the group consisting of K24, A25, S26, R27, N28, I29, E30, R31, Q32, L33, A34, Q50, A51, S52, R53, K54, E55, S56, Q89, Q90, Y91, S92, D93, P94, P95, L96, and T97, numbered according to the Kabat numbering system, have been substituted with arbitrary amino acids other than cysteine;
  (f3) the polypeptide of any one of (a1) to (a6) and (c1) to (c2) described in [10]; and (g) the fourth polypeptide is (g1), (g2), or (g3):
  (g1) a polypeptide which comprises an antibody light chain variable domain having the light chain CDR 1, 2, and 3 amino acid sequences of SEQ ID NOs: 7, 8, and 9, respectively, or an antibody light chain variable domain having the amino acid sequence of SEQ ID NO: 47;
  (g2) a polypeptide which comprises an antibody light chain variable domain having the light chain CDR 1, 2, and 3 amino acid sequences of SEQ ID NOs: 7, 8, and 9, respectively, or an antibody light chain variable domain having the amino acid sequence of SEQ ID NO: 47, in which one or more amino acids selected from the group consisting of K24, A25, S26, R27, N28, I29, E30, R31, Q32, L33, A34, Q50, A51, S52, R53, K54, E55, S56, Q89, Q90, Y91, S92, D93, P94, P95, L96, and T97, numbered according to the Kabat numbering system, have been substituted with arbitrary amino acids other than cysteine;
  (g3) the polypeptide of any one of (b1) to (b23), and (c3) described in [10];

[12] a method of producing a variant of Emicizumab, which comprises the following step (a):
(a) performing one or more of the following substitutions (i) to (iii), wherein the numbering is according to the Kabat numbering system:
  (i) substitution of one or more amino acids selected from the group consisting of K24, A25, S26, R27, N28, I29, E30, R31, Q32, L33, A34, Q50, A51, S52, R53, K54, E55, S56, Q89, Q90, Y91, S92, D93, P94, P95, L96, and T97, in an antibody light chain variable domain comprising the light chain CDR 1, 2, and 3 amino acid sequences of SEQ ID NOs: 7, 8, and 9, respectively;
  (ii) substitution of one or more amino acids selected from the group consisting of Y31, Y32, D33, I34, Q35, S50, I51, S52, P52a, S53, G54, Q55, S56, T57, Y58, Y59, R60, R61, E62, V63, K64, G65, R95, T96, G97, R98, E99, Y100, G100a, G100b, G100c, W100d, Y100e, F100f, D101, and Y102, in an antibody heavy chain variable domain comprising the heavy chain CDR 1, 2, and 3 amino acid sequences of SEQ ID NOs: 1, 2, and 3, respectively; and
  (iii) substitution of one or more amino acids selected from the group consisting of D31, N32, N33, M34, D35, D50, I51, T52a, N52, R53, S54, G55, G56, S57, I58, Y59, N60, E61, E62, F63, Q64, D65, R95, K96, S97, Y98, G99, Y100, Y100a, L100b, D101, and E102, in an antibody heavy chain variable domain comprising the heavy chain CDR 1, 2, and 3 amino acid sequences of SEQ ID NOs: 4, 5, and 6, respectively;

[13] a method of isolating a variant of Emicizumab, which comprises the steps of (a) to (c) below:
(a) producing a variant of Emicizumab by performing one or more of the following (i) to (iii), wherein the numbering is according to the Kabat numbering system:
  (i) substitution of one or more amino acids selected from the group consisting of K24, A25, S26, R27, N28, I29, E30, R31, Q32, L33, A34, Q50, A51, S52, R53, K54, E55, S56, Q89, Q90, Y91, S92, D93, P94, P95, L96, and T97, in an antibody light chain variable domain comprising the light chain CDR 1, 2, and 3 amino acid sequences of SEQ ID NOs: 7, 8, and 9, respectively;
  (ii) substitution of one or more amino acids selected from the group consisting of Y31, Y32, D33, I34, Q35, S50, I51, S52, P52a, S53, G54, Q55, S56, T57, Y58, Y59, R60, R61, E62, V63, K64, G65, R95, T96, G97, R98, E99, Y100, G100a, G100b, G100c, W100d, Y100e, F100f, D101, and Y102, in an antibody heavy chain variable domain comprising the heavy chain CDR 1, 2, and 3 amino acid sequences of SEQ ID NOs: 1, 2, and 3, respectively; and
  (iii) substitution of one or more amino acids selected from the group consisting of D31, N32, N33, M34, D35, D50, I51, T52a, N52, R53, S54, G55, G56, S57, I58, Y59, N60, E61, E62, F63, Q64, D65, R95, K96, S97, Y98, G99, Y100, Y100a, L100b, D101, and E102, in an antibody heavy chain variable domain comprising the heavy chain CDR 1, 2, and 3 amino acid sequences of SEQ ID NOs: 4, 5, and 6, respectively;
(b) measuring FVIII cofactor function-substituting activity of the variant produced in (a); and
(c) selecting a variant of Emicizumab having improved FVIII cofactor function-substituting activity compared to that of Emicizumab.

Furthermore, the present invention provides the following to [26]:

[14] the polypeptide of any one of [1], [4], and [6], which is an antibody;

[15] the antibody of any one of [2], [3], [5], [7] to [9], [11], and [14], which is a humanized antibody or a human antibody;

[16] the antibody of any one of [2], [3], [5], [7] to [9], [11], [14], and [15], which is an antibody selected from the group consisting of Fv, Fab, Fab', Fab'-SH, F (ab') 2, diabody, linear antibody, single-chain antibody molecule, and multispecific antibody formed from antibody fragments;

[17] a nucleic acid encoding the antibody of any one of [2], [3], [5], [7] to [9], [11], and to [16];

[18] a vector into which the nucleic acid of has been inserted;

[19] a cell, which comprises the nucleic acid of or the vector of [18];

[20] a pharmaceutical formulation, which comprises the antibody of any one of [2], [3], [5], [7] to [9], [11], and to [16], and a pharmaceutically acceptable carrier;

[21] the pharmaceutical formulation of [20], which is used for prevention and/or treatment of bleeding, a disease accompanying bleeding, or a disease caused by bleeding, wherein the disease is a disease that develops and/or progresses due to a decrease or deficiency in the activity of blood coagulation factor VIII and/or activated blood coagulation factor VIII;

[22] the pharmaceutical formulation of [21], wherein the disease that develops and/or progresses due to a decrease or deficiency in the activity of blood coagulation factor VIII and/or activated blood coagulation factor VIII is hemophilia A;

[23] the pharmaceutical formulation of [22], wherein the disease that develops and/or progresses due to a decrease or deficiency in the activity of blood coagulation factor VIII and/or activated blood coagulation factor VIII is a disease showing emergence of an inhibitor against blood coagulation factor VIII and/or activated blood coagulation factor VIII;

[24] the pharmaceutical formulation of [21], wherein the disease that develops and/or progresses due to a decrease or deficiency in the activity of blood coagulation factor VIII and/or activated blood coagulation factor VIII is acquired hemophilia;

[25] the pharmaceutical formulation of [21], wherein the disease that develops and/or progresses due to a decrease or deficiency in the activity of blood coagulation factor VIII and/or activated blood coagulation factor VIII is von Willebrand disease; and

[26] a commercial package of a therapeutic product for use in the method for preventing and/or treating bleeding, a disease accompanying bleeding, or a disease caused by bleeding, which comprises at least the antibody of any one of [2], [3], [5], [7] to [9], [11], and to [16].

MODE FOR CARRYING OUT THE INVENTION

Figure 1:
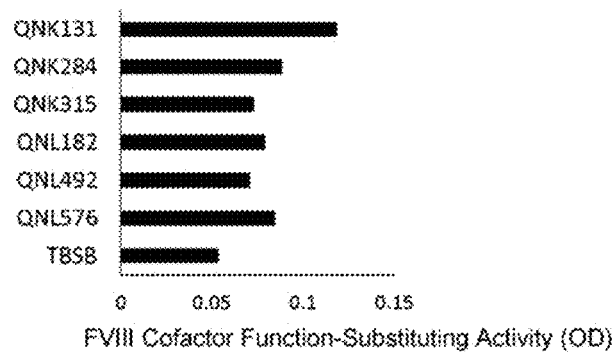
FIG. 1 shows a graph presenting the FVIII cofactor function-substituting activities of bispecific antibodies comprising novel L chains.
Figure 1:
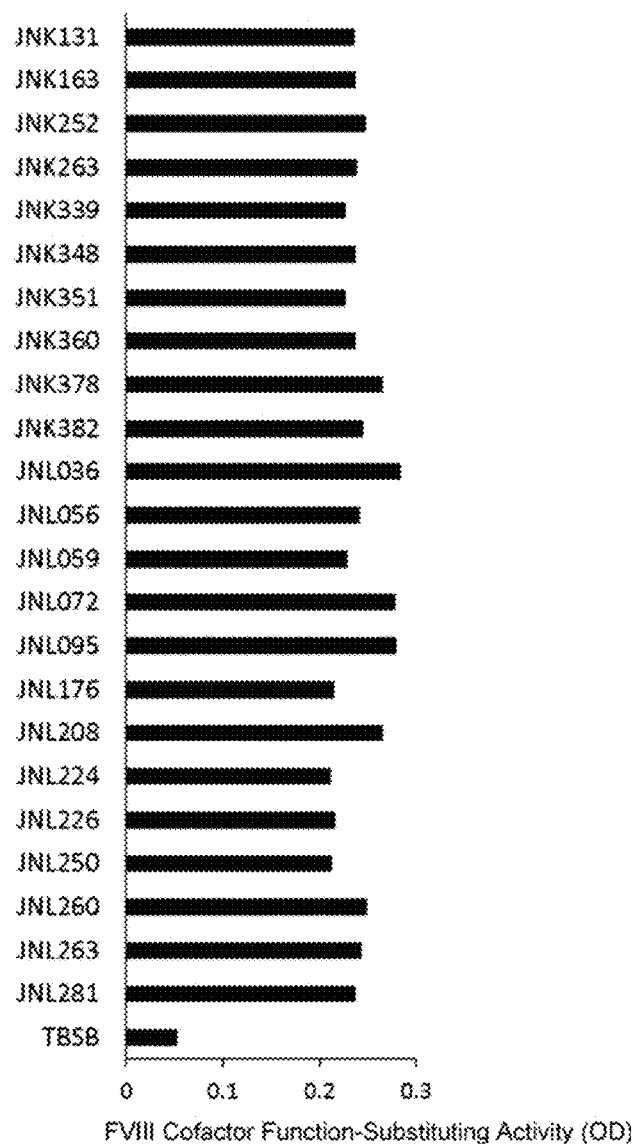

The term "antibody" herein is used in the broadest sense and encompasses various antibody structures, including but not limited to monoclonal antibodies, polyclonal antibodies, multispecific antibodies (e.g., bispecific antibodies), and antibody fragments so long as they exhibit the desired antigen-binding activity.

An "antibody fragment" refers to a molecule other than an intact antibody that comprises a portion of an intact antibody that binds the antigen to which the intact antibody binds. Examples of antibody fragments include but are not limited to Fv, Fab, Fab', Fab'-SH, F(ab')2; diabodies; linear antibodies; single-chain antibody molecules (e.g., scFv); and multispecific antibodies formed from antibody fragments.

The "class" of an antibody refers to the type of constant domain or constant region possessed by its heavy chain. There are five major classes of antibodies: IgA, IgD, IgE, IgG, and IgM, and several of these may be further divided into subclasses (isotypes), e.g., IgG1, IgG2, IgG3, IgG4, IgA1, and IgA2. The heavy chain constant domains that correspond to the different classes of immunoglobulins are called alpha, delta, epsilon, gamma, and mu, respectively.

An "effective amount" of an agent, e.g., a pharmaceutical formulation, refers to an amount effective, at dosages and for periods of time necessary, to achieve the desired therapeutic or prophylactic result.

The term "Fc region" herein is used to define a C-terminal region of an immunoglobulin heavy chain that contains at least a portion of the constant region. The term includes native sequence Fc regions and variant Fc regions. In one embodiment, a human IgG heavy chain Fc region extends from Cys226, or from Pro230, to the carboxyl-terminus of the heavy chain. However, the C-terminal lysine (Lys447) or glycine-lysine (residues 446-447) of the Fc region may or may not be present. Unless otherwise specified herein, numbering of amino acid residues in the Fc region or constant region is according to the EU numbering system, also called the EU index, as described in Kabat et al., Sequences of Proteins of Immunological Interest, 5th Ed. Public Health Service, National Institutes of Health, Bethesda, MD, 1991.

"Framework" or "FR" refers to variable domain residues other than hypervariable region (HVR) residues. The FR of a variable domain generally consists of four FR domains: FR1, FR2, FR3, and FR4. Accordingly, the HVR and FR sequences generally appear in the following sequence in VH (or VL): FR1-H1 (L1)-FR2-H2 (L2)-FR3-H3 (L3)-FR4.

The terms "full length antibody," "intact antibody," and "whole antibody" are used herein interchangeably to refer to an antibody having a structure substantially similar to a native antibody structure or having heavy chains that contain an Fc region as defined herein.

The terms "host cell," "host cell line," and "host cell culture" are used interchangeably and refer to cells into which exogenous nucleic acid has been introduced, including the progeny of such cells. Host cells include "transformants" and "transformed cells," which include the primary transformed cell and progeny derived therefrom without regard to the number of passages. Progeny may not be completely identical in nucleic acid content to a parent cell, but may contain mutations. Mutant progeny that have the same function or biological activity as screened or selected for in the originally transformed cell are included herein.

A "human antibody" is one which possesses an amino acid sequence which corresponds to that of an antibody produced by a human or a human cell or derived from a non-human source that utilizes human antibody repertoires or other human antibody-encoding sequences. This definition of a human antibody specifically excludes a humanized antibody comprising non-human antigen-binding residues.

A "humanized" antibody refers to a chimeric antibody comprising amino acid residues from non-human HVRs and amino acid residues from human FRs. In certain embodiments, a humanized antibody will comprise substantially all of at least one, and typically two, variable domains, in which all or substantially all of the HVRs (e.g., CDRs) correspond to those of a non-human antibody, and all or substantially all of the FRs correspond to those of a human antibody. A humanized antibody optionally may comprise at least a portion of an antibody constant region derived from a human antibody. A "humanized form" of an antibody, e.g., a non-human antibody, refers to an antibody that has undergone humanization.

The term "hypervariable region" or "HVR" as used herein refers to each of the regions of an antibody variable domain which are hypervariable in sequence ("complementarity determining regions" or "CDRs") and/or form structurally defined loops ("hypervariable loops") and/or contain the antigen-contacting residues ("antigen contacts"). Generally, antibodies comprise six HVRs: three in the VH (H1, H2, H3), and three in the VL (L1, L2, L3). Exemplary HVRs herein include:

(a) hypervariable loops occurring at amino acid residues 26-32 (L1), 50-52 (L2), 91-96 (L3), 26-32 (H1), 53-55 (H2), and 96-101 (H3) (Chothia and Lesk, *J. Mol. Biol.* 196:901-917 (1987));
(b) CDRs occurring at amino acid residues 24-34 (L1), 50-56 (L2), 89-97 (L3), 31-35b (H1), 50-65 (H2), and 95-102 (H3) (Kabat et al., *Sequences of Proteins of Immunological Interest,* 5th Ed. Public Health Service, National Institutes of Health, Bethesda, MD (1991));
(c) antigen contacts occurring at amino acid residues 27c-36 (L1), 46-55 (L2), 89-96 (L3), 30-35b (H1), 47-58 (H2), and 93-101 (H3) (MacCallum et al. *J. Mol. Biol.* 262: 732-745 (1996)); and
(d) combinations of (a), (b), and/or (c), including HVR amino acid residues 46-56 (L2), 47-56 (L2), 48-56 (L2), 49-56 (L2), 26-35 (H1), 26-35b (H1), 49-65 (H2), 93-102 (H3), and 94-102 (H3).

Unless otherwise indicated, HVR residues and other residues in the variable domain (e.g., FR residues) are numbered herein according to Kabat et al., supra.

An "isolated" antibody is one which has been separated from a component of its natural environment. In some embodiments, an antibody is purified to greater than 95% or 99% purity as determined by, for example, electrophoresis (e.g., SDS-PAGE, isoelectric focusing (IEF), capillary electrophoresis) or chromatography (e.g., ion exchange or reverse phase HPLC). For review of methods for assessment of antibody purity, see, e.g., Flatman et al., *J. Chromatogr. B* 848:79-87 (2007).

An "isolated" nucleic acid refers to a nucleic acid molecule that has been separated from a component of its natural environment. An isolated nucleic acid includes a nucleic acid molecule contained in cells that ordinarily contain the nucleic acid molecule, but the nucleic acid molecule is present extrachromosomally or at a chromosomal location that is different from its natural chromosomal location.

The term "monoclonal antibody" as used herein refers to an antibody obtained from a population of substantially homogeneous antibodies, i.e., the individual antibodies composing the population are identical and/or bind the same epitope, except for possible variant antibodies, e.g., containing naturally occurring mutations or arising during production of a monoclonal antibody preparation, such variants generally being present in minor amounts. In contrast to polyclonal antibody preparations, which typically include different antibodies directed against different determinants (epitopes), each monoclonal antibody of a monoclonal antibody preparation is directed against a single determinant on an antigen. Thus, the modifier "monoclonal" indicates the character of the antibody as being obtained from a substantially homogeneous population of antibodies, and is not to be construed as requiring production of the antibody by any particular method. For example, the monoclonal antibodies to be used in accordance with the present invention may be made by a variety of techniques, including but not limited to the hybridoma method, recombinant DNA methods, phage-display methods, and methods utilizing transgenic animals containing all or part of the human immunoglobulin loci, such methods and other exemplary methods for making monoclonal antibodies being described herein.

"Native antibodies" refer to naturally occurring immunoglobulin molecules with varying structures. For example, native IgG antibodies are heterotetrameric glycoproteins of about 150,000 daltons, composed of two identical light chains and two identical heavy chains that are disulfide-bonded. From N- to C-terminus, each heavy chain has a variable region (VH), also called a variable heavy domain or a heavy chain variable domain, followed by three constant domains (CH1, CH2, and CH3). Similarly, from N- to C-terminus, each light chain has a variable region (VL), also called a variable light domain or a light chain variable domain, followed by a constant light (CL) domain. The light chain of an antibody may be assigned to one of two types, called kappa (κ) and lambda (λ), based on the amino acid sequence of its constant domain.

The term "package insert" is used to refer to instructions customarily included in commercial packages of therapeutic products, that contain information about the indications, usage, dosage, administration, combination therapy, contraindications and/or warnings concerning the use of such therapeutic products.

The term "pharmaceutical formulation" refers to a preparation which is in such form as to permit the biological activity of an active ingredient contained therein to be effective, and which contains no additional components which are unacceptably toxic to a subject to which the formulation would be administered.

A "pharmaceutically acceptable carrier" refers to an ingredient in a pharmaceutical formulation, other than an active ingredient, which is nontoxic to a subject. A pharmaceutically acceptable carrier includes, but is not limited to, a buffer, excipient, stabilizer, or preservative.

The terms "FIX", "FIXa", and "FX" as used herein, refer to any native FIX, FIXa, and FX from any vertebrate source, including mammals such as primates (e.g., humans) and rodents (e.g., mice and rats), unless otherwise indicated. The term encompasses "full-length" unprocessed FIX, FIXa, and FX as well as any form of FIX, FIXa, and FX that results from processing in the cell. The term also encompasses naturally occurring variants of FIX, FIXa, and FX, e.g., splice variants or allelic variants.

As used herein, "treatment" (and grammatical variations thereof such as "treat" or "treating") refers to clinical intervention in an attempt to alter the natural course of the individual being treated, and can be performed either for prophylaxis or during the course of clinical pathology. Desirable effects of treatment include, but are not limited to, preventing occurrence or recurrence of disease, alleviation of symptoms, diminishment of any direct or indirect pathological consequences of the disease, preventing metastasis, decreasing the rate of disease progression, amelioration or palliation of the disease state, and remission or improved prognosis. In some embodiments, antibodies of the invention are used to delay development of a disease or to slow the progression of a disease.

The term "variable region" or "variable domain" refers to the domain of an antibody heavy or light chain that is involved in binding the antibody to antigen. The variable domains of the heavy chain and light chain (VH and VL, respectively) of a native antibody generally have similar structures, with each domain comprising four conserved framework regions (FRs) and three hypervariable regions (HVRs). (See, e.g., Kindt et al. *Kuby Immunology*, 6$^{th}$ ed., W.H. Freeman and Co., page 91 (2007).) A single VH or VL domain may be sufficient to confer antigen-binding specificity. Furthermore, antibodies that bind a particular antigen may be isolated using a VH or VL domain from an antibody that binds the antigen to screen a library of complementary VL or VH domains, respectively. See, e.g., Portolano et al., *J. Immunol.* 150:880-887 (1993); Clarkson et al., Nature 352:624-628 (1991).

The term "vector," as used herein, refers to a nucleic acid molecule capable of propagating another nucleic acid to which it is linked. The term includes the vector as a self-replicating nucleic acid structure as well as the vector incorporated into the genome of a host cell into which it has been introduced. Certain vectors are capable of directing the expression of nucleic acids to which they are operatively linked. Such vectors are referred to herein as "expression vectors."

Emicizumab (ACE910) which is a bispecific antibody that substitutes for the function of FVIII, and binds to both FIX and/or FIXa, and FX is described below. A bispecific antibody (Q499-z121/J327-z119/L404-k) in which a first polypeptide and a third polypeptide form a pair, and a second polypeptide and a fourth polypeptide form a pair, and in which the first polypeptide comprises an H chain comprising the H chain CDR 1, 2, and 3 amino acid sequences of SEQ ID NOs: 1, 2, and 3 (H chain CDRs of Q499), respectively, the second polypeptide comprises an H chain comprising the H chain CDR 1, 2, and 3 amino acid sequences of SEQ ID NOs: 4, 5, and 6 (H chain CDRs of J327), respectively, and the third polypeptide and the fourth polypeptide comprise a commonly shared L chain comprising the L chain CDR 1, 2, 3 amino acid sequences of SEQ ID NOs: 7, 8, and 9 (L chain CDRs of L404), respectively.

More specifically, the above-described bispecific antibody is a bispecific antibody (Q499-z121/J327-z119/L404-k) in which a first polypeptide and a third polypeptide form a pair, and a second polypeptide and a fourth polypeptide form a pair, and in which the first polypeptide comprises an H chain comprising the antibody heavy chain variable domain amino acid sequence of SEQ ID NO: 45, the second polypeptide comprises an H chain comprising the antibody heavy chain variable domain amino acid sequence of SEQ ID NO: 46, and the third polypeptide and fourth polypeptide comprise a commonly shared L chain comprising the antibody light chain variable domain amino acid sequence of SEQ ID NO: 47.

More specifically, the above-described bispecific antibody is a bispecific antibody (Q499-z121/J327-z119/L404-k) in which a first polypeptide and a third polypeptide form a pair, and a second polypeptide and a fourth polypeptide form a pair, and in which the first polypeptide comprises an H chain comprising the amino acid sequence of SEQ ID NO: 10, the second polypeptide comprises an H chain comprising the amino acid sequence of SEQ ID NO: 11, and the third polypeptide and fourth polypeptide comprise a commonly shared L chain comprising the amino acid sequence of SEQ ID NO: 12.

Such antibody can be obtained, for example, by following the methods described in WO2005/035756, WO2006/109592, WO2012/067176, and such. Herein below, Emicizumab is synonymous with ACE910 in the present specification.

In one aspect, "a variant of Emicizumab" according to the present invention refers to a polypeptide or an antibody in which at least one or more amino acid sequences of the heavy chain variable regions or light chain variable regions of Emicizumab differ from the amino acid sequences of Emicizumab, and includes any variants to the extent of being able to achieve the objective of the present invention. In one embodiment, even if all of the variable regions of the heavy chains or the light chains which are a part of a variant are different from the variable regions of Emicizumab, such variant may be included in the variants of the present invention.

For example, variants of Emicizumab are the following polypeptides and antibodies, but are not limited thereto.

In one aspect, the present invention provides a polypeptide comprising an antibody light chain variable domain, the polypeptide comprising an antibody light chain variable domain having the light chain CDR 1, 2, and 3 amino acid sequences of SEQ ID NOs: 7, 8, and 9, respectively, or an antibody light chain variable domain having the amino acid sequence of SEQ ID NO: 47, in which one or more amino acids selected from the group consisting of K24, A25, S26, R27, N28, I29, E30, R31, Q32, L33, A34, Q50, A51, S52, R53, K54, E55, S56, Q89, Q90, Y91, S92, D93, P94, P95, L96, and T97, numbered according to the Kabat numbering system, have been substituted with arbitrary amino acids other than cysteine.

In another aspect, the present invention provides a bispecific antibody which recognizes FIX and/or FIXa, and FX, the antibody comprising an antibody light chain variable domain having the light chain CDR 1, 2, and 3 amino acid sequences of SEQ ID NOs: 7, 8, and 9, respectively, or an antibody light chain variable domain having the amino acid sequence of SEQ ID NO: 47, in which one or more amino acids selected from the group consisting of K24, A25, S26, R27, N28, I29, E30, R31, Q32, L33, A34, Q50, A51, S52, R53, K54, E55, S56, Q89, Q90, Y91, S92, D93, P94, P95, L96, and T97, numbered according to the Kabat numbering system, have been substituted with arbitrary amino acids other than cysteine.

In another aspect, the present invention provides a bispecific antibody which recognizes FIX and/or FIXa, and FX, in which a first polypeptide and a third polypeptide form a pair and a second polypeptide and a fourth polypeptide form a pair, and in which the first polypeptide comprises the antibody heavy chain variable domain amino acid sequence of SEQ ID NO: 45, the second polypeptide comprises the antibody heavy chain variable domain amino acid sequence of SEQ ID NO: 46, either the third polypeptide or the fourth polypeptide comprises the antibody light chain variable domain amino acid sequence of SEQ ID NO: 47, and the other polypeptide comprises an antibody light chain variable domain having the light chain CDR 1, 2, and 3 amino acid sequences of SEQ ID NOs: 7, 8, and 9, respectively, or an antibody light chain variable domain having the amino acid sequence of SEQ ID NO: 47, and in the other polypeptide one or more amino acids selected from the group consisting of K24, A25, S26, R27, N28, I29, E30, R31, Q32, L33, A34, Q50, A51, S52, R53, K54, E55, S56, Q89, Q90, Y91, S92, D93, P94, P95, L96, and T97, numbered according to the Kabat numbering system, have been substituted with arbitrary amino acids other than cysteine.

In another aspect, the present invention provides a polypeptide comprising an antibody heavy chain variable domain, the polypeptide comprising an antibody heavy chain variable domain having the heavy chain CDR 1, 2, and 3 amino acid sequences of SEQ ID NOs: 1, 2, and 3, respectively, or an antibody heavy chain variable domain having the amino acid sequence of SEQ ID NO: 45, in which one or more amino acids selected from the group consisting of Y31, Y32, D33, I34, Q35, S50, I51, S52, P52a, S53, G54, Q55, S56, T57, Y58, Y59, R60, R61, E62, V63, K64, G65, R95, T96, G97, R98, E99, Y100, G100a, G100b, G100c, W100d, Y100e, F100f, D101, and Y102, numbered according to the Kabat numbering system, have been substituted with arbitrary amino acids other than cysteine.

In another aspect, the present invention provides a bispecific antibody which recognizes FIX and/or FIXa, and FX, the antibody comprising an antibody heavy chain variable domain having the heavy chain CDR 1, 2, and 3 amino acid sequences of SEQ ID NOs: 1, 2, and 3, respectively, or an antibody heavy chain variable domain having the amino acid sequence of SEQ ID NO: 45, in which one or more amino acids selected from the group consisting of Y31, Y32, D33, I34, Q35, S50, I51, S52, P52a, S53, G54, Q55, S56, T57, Y58, Y59, R60, R61, E62, V63, K64, G65, R95, T96, G97, R98, E99, Y100, G100a, G100b, G100c, W100d, Y100e, F100f, D101, and Y102, numbered according to the Kabat numbering system, have been substituted with arbitrary amino acids other than cysteine.

In another aspect, the present invention provides a polypeptide comprising an antibody heavy chain variable domain, the polypeptide comprising an antibody heavy chain variable domain having the heavy chain CDR 1, 2, and 3 amino acid sequences of SEQ ID NOs: 4, 5, and 6, respectively, or an antibody heavy chain variable domain having the amino acid sequence of SEQ ID NO: 46, in which one or more amino acids selected from the group consisting of D31, N32, N33, M34, D35, D50, I51, N52, T52a, R53, S54, G55, G56, S57, I58, Y59, N60, E61, E62, F63, Q64, D65, R95, K96, S97, Y98, G99, Y100, Y100a, L100b, D101, and E102, numbered according to the Kabat numbering system, have been substituted with arbitrary amino acids other than cysteine.

In another aspect, the present invention provides a bispecific antibody which recognizes FIX and/or FIXa, and FX, the antibody comprising an antibody heavy chain variable domain having the heavy chain CDR 1, 2, and 3 amino acid sequences of SEQ ID NOs: 4, 5, and 6, respectively, or an antibody heavy chain variable domain having the amino acid sequence of SEQ ID NO: 46, in which one or more amino acids selected from the group consisting of D31, N32, N33, M34, D35, D50, I51, N52, T52a, R53, S54, G55, G56, S57, I58, Y59, N60, E61, E62, F63, Q64, D65, R95, K96, S97, Y98, G99, Y100, Y100a, L100b, D101, and E102, numbered according to the Kabat numbering system, have been substituted with arbitrary amino acids other than cysteine.

In another aspect, the present invention provides a bispecific antibody which recognizes FIX and/or FIXa, and FX, in which a first polypeptide and a third polypeptide form a pair and a second polypeptide and a fourth polypeptide form a pair, and in which the second polypeptide comprises the antibody heavy chain variable domain amino acid sequence of SEQ ID NO: 46, the third polypeptide comprises the antibody light chain amino acid sequence of SEQ ID NO: 42, the fourth polypeptide comprises the antibody light chain amino acid sequence of SEQ ID NO: 44, and the first polypeptide comprises an antibody heavy chain variable domain having the heavy chain CDR 1, 2, and 3 amino acids of SEQ ID NOs: 1, 2, and 3, respectively, or an antibody heavy chain variable domain having the amino acid sequence of SEQ ID NO: 45, and in the first polypeptide one or more amino acids selected from the group consisting of Y31, Y32, D33, I34, Q35, S50, I51, S52, P52a, S53, G54, Q55, S56, T57, Y58, Y59, R60, R61, E62, V63, K64, G65, R95, T96, G97, R98, E99, Y100, G100a, G100b, G100c, W100d, Y100e, F100f, D101, and Y102, numbered according to the Kabat numbering system, have been substituted with arbitrary amino acids other than cysteine.

In another aspect, the present invention provides a bispecific antibody which recognizes FIX and/or FIXa, and FX, in which a first polypeptide and a third polypeptide form a pair and a second polypeptide and a fourth polypeptide form a pair, and in which the first polypeptide comprises the antibody heavy chain amino acid sequence of SEQ ID NO: 45, the third polypeptide comprises the antibody light chain amino acid sequence of SEQ ID NO: 43, the fourth polypeptide comprises the antibody light chain amino acid sequence of SEQ ID NO: 44, and the second polypeptide comprises an antibody heavy chain variable domain having the heavy chain CDR 1, 2, and 3 amino acid sequences of SEQ ID NOs: 4, 5, and 6, respectively, or an antibody heavy chain variable domain having the amino acid sequence of SEQ ID NO: 46, and in the second polypeptide one or more amino acids selected from the group consisting of D31, N32, N33, M34, D35, D50, I51, T52a, N52, R53, S54, G55, G56, S57, I58, Y59, N60, E61, E62, F63, Q64, D65, R95, K96, S97, Y98, G99, Y100, Y100a, L100b, D101, and E102, numbered according to the Kabat numbering system, have been substituted with arbitrary amino acids other than cysteine.

In another aspect, the present invention provides an antibody light chain which is a novel antibody light chain comprising any one of the amino acid sequences selected from the following (a1) to (a6) and (b1) to (b23). The light chains can be used as a light chain that substitutes for the commonly shared light chain included in Emicizumab. The following light chains of (a1) to (a6) are examples of light chains that bind to FIX and/or FIXa, and the following L chains of (b1) to (b23) are examples of light chains that bind to FX:

(a1) an antibody light chain comprising the amino acid sequence of SEQ ID NO: 13 (QNK131);
(a2) an antibody light chain comprising the amino acid sequence of SEQ ID NO: 14 (QNK284);
(a3) an antibody light chain comprising the amino acid sequence of SEQ ID NO: 15 (QNK315);
(a4) an antibody light chain comprising the amino acid sequence of SEQ ID NO: 16 (QNL182);
(a5) an antibody light chain comprising the amino acid sequence of SEQ ID NO: 17 (QNL492);
(a6) an antibody light chain comprising the amino acid sequence of SEQ ID NO: 18 (QNL576);
(b1) an antibody light chain comprising the amino acid sequence of SEQ ID NO: 19 (JNK131);
(b2) an antibody light chain comprising the amino acid sequence of SEQ ID NO: 20 (JNK163);
(b3) an antibody light chain comprising the amino acid sequence of SEQ ID NO: 21 (JNK252);
(b4) an antibody light chain comprising the amino acid sequence of SEQ ID NO: 22 (JNK263);
(b5) an antibody light chain comprising the amino acid sequence of SEQ ID NO: 23 (JNK339);
(b6) an antibody light chain comprising the amino acid sequence of SEQ ID NO: 24 (JNK348);
(b7) an antibody light chain comprising the amino acid sequence of SEQ ID NO: 25 (JNK351);
(b8) an antibody light chain comprising the amino acid sequence of SEQ ID NO: 26 (JNK360);
(b9) an antibody light chain comprising the amino acid sequence of SEQ ID NO: 27 (JNK378);
(b10) an antibody light chain comprising the amino acid sequence of SEQ ID NO: 28 (JNK382);
(b11) an antibody light chain comprising the amino acid sequence of SEQ ID NO: 29 (JNL036);
(b12) an antibody light chain comprising the amino acid sequence of SEQ ID NO: 30 (JNL072);
(b13) an antibody light chain comprising the amino acid sequence of SEQ ID NO: 31 (JNL095);
(b14) an antibody light chain comprising the amino acid sequence of SEQ ID NO: 32 (JNL176);
(b15) an antibody light chain comprising the amino acid sequence of SEQ ID NO: 33 (JNL208);
(b16) an antibody light chain comprising the amino acid sequence of SEQ ID NO: 34 (JNL224);
(b17) an antibody light chain comprising the amino acid sequence of SEQ ID NO: 35 (JNL260);
(b18) an antibody light chain comprising the amino acid sequence of SEQ ID NO: 36 (JNL056);
(b19) an antibody light chain comprising the amino acid sequence of SEQ ID NO: 37 (JNL059);
(b20) an antibody light chain comprising the amino acid sequence of SEQ ID NO: 38 (JNL226);
(b21) an antibody light chain comprising the amino acid sequence of SEQ ID NO: 39 (JNL250);
(b22) an antibody light chain comprising the amino acid sequence of SEQ ID NO: 40 (JNL263); and
(b23) an antibody light chain comprising the amino acid sequence of SEQ ID NO: 41 (JNL281).

In specific embodiments, the present invention provides variants of the above-mentioned antibody L chains of (a1) to (a6) and (b1) to (b23).

In one embodiment, the present invention provides the following antibody L chain variants:

(c1) an antibody light chain (QAL187) having the amino acid sequence of SEQ ID NO: 42, which is a variant of the antibody light chain of SEQ ID NO: 13;
(c2) an antibody L chain (QAL201) having the amino acid sequence of SEQ ID NO: 43, which is a variant of the antibody light chain of SEQ ID NO: 13; and
(c3) an antibody L chain (JYL280) having the amino acid sequence of SEQ ID NO: 44, which is a variant of the antibody light chain of SEQ ID NO: 31.

In another aspect, the present invention provides a bispecific antibody which recognizes FIX and/or FIXa, and FX, in which a first polypeptide (d) and a third polypeptide (f) form a pair, a second polypeptide (e) and a fourth polypeptide (g) form a pair, and the respective polypeptides are the following polypeptides:

(d) the first polypeptide is (d1) or (d2):
(d1) a polypeptide which comprises an antibody heavy chain variable domain having the heavy chain CDR 1, 2, and 3 amino acid sequences of SEQ ID NOs: 1, 2, and 3, respectively, or an antibody heavy chain variable domain having the amino acid sequence of SEQ ID NO: 45; or
(d2) a polypeptide which comprises an antibody heavy chain variable domain having the heavy chain CDR 1, 2, and 3 amino acid sequences of SEQ ID NOs: 1, 2, and 3, respectively, or an antibody heavy chain variable domain having the amino acid sequence of SEQ ID NO: 45, in which one or more amino acids selected from the group consisting of Y31, Y32, D33, I34, Q35, S50, I51, S52, P52a, S53, G54, Q55, S56, T57, Y58, Y59, R60, R61, E62, V63, K64, G65, R95, T96, G97, R98, E99, Y100, G100a, G100b, G100c, W100d, Y100e, F100f, D101, and Y102, numbered according to the Kabat numbering system, have been substituted with arbitrary amino acids other than cysteine;

(e) the second polypeptide is (e1) or (e2):
(e1) a polypeptide which comprises an antibody heavy chain variable domain having the heavy chain CDR 1, 2, and 3 amino acid sequences of SEQ ID NOs: 4, 5, and 6, respectively, or an antibody heavy chain variable domain having the amino acid sequence of SEQ ID NO: 46; or
(e2) a polypeptide which comprises an antibody heavy chain variable domain having the heavy chain CDR 1, 2, and 3 amino acid sequences of SEQ ID NOs: 4, 5, and 6, respectively, or an antibody heavy chain variable domain having the amino acid sequence of SEQ ID NO: 46, in which one or more amino acids selected from the group consisting of D31, N32, N33, M34, D35, D50, I51, T52a, N52, R53, S54, G55, G56, S57, I58, Y59, N60, E61, E62, F63, Q64, D65, R95, K96, S97, Y98, G99, Y100, Y100a, L100b, D101, and E102, numbered according to the Kabat numbering system, have been substituted with arbitrary amino acids other than cysteine;

(f) the third polypeptide is (f1), (f2), or (f3):
(f1) a polypeptide which comprises an antibody light chain variable domain having the light chain CDR 1, 2, and 3 amino acid sequences of SEQ ID NOs: 7, 8, and 9, respectively, or an antibody light chain variable domain having the amino acid sequence of SEQ ID NO: 47;
(f2) a polypeptide which comprises an antibody light chain variable domain having the light chain CDR 1, 2, and 3 amino acid sequences of SEQ ID NOs: 7, 8, and 9, respectively, or an antibody light chain variable domain having the amino acid sequence of SEQ ID NO: 47, in which one or more amino acids selected from the group consisting of K24, A25, S26, R27, N28, I29, E30, R31, Q32, L33, A34, Q50, A51, S52, R53, K54, E55, S56, Q89, Q90, Y91, S92, D93, P94, P95, L96, and T97, numbered according to the Kabat numbering system, have been substituted with arbitrary amino acids other than cysteine; or
(f3) the polypeptide of any one of (a1) to (a6) and (c1) to (c2) described herein; and (g) the fourth polypeptide is (g1), (g2), or (g3):
(g1) a polypeptide which comprises an antibody light chain variable domain having the light chain CDR 1, 2, and 3 amino acid sequences of SEQ ID NOs: 7, 8, and 9, respectively, or an antibody light chain variable domain having the amino acid sequence of SEQ ID NO: 47;
(g2) a polypeptide which comprises an antibody light chain variable domain having the light chain CDR 1, 2, and 3 amino acid sequences of SEQ ID NOs: 7, 8, and 9, respectively, or an antibody light chain variable domain having the amino acid sequence of SEQ ID NO: 47, in which one or more amino acids selected from the group consisting of K24, A25, S26, R27, N28, I29, E30, R31, Q32, L33, A34, Q50, A51, S52, R53, K54, E55, S56, Q89, Q90, Y91, S92, D93, P94, P95, L96, and T97, numbered according to the Kabat numbering system, have been substituted with arbitrary amino acids other than cysteine; or
(g3) the polypeptide of any one of (b1) to (b23), and (c3) described herein.

In one aspect, the present invention provides a polypeptide or an antibody, in which at least one or more amino acid residues at the following positions in an antibody light chain variable domain having the light chain CDR 1, 2, and 3 amino acid sequences of SEQ ID NOs: 7, 8, and 9, respectively, or at least one or more amino acid residues at the following positions in the antibody light chain variable domain of SEQ ID NO: 47 are any of the following amino acid residues.

In the above-mentioned polypeptide or antibody, the number of amino acid residues that are different from an antibody light chain variable domain having the light chain CDR 1, 2, and 3 amino acid sequences of SEQ ID NOs: 7, 8, and 9, respectively, or the number of amino acid residues that are different from the antibody light chain variable domain of SEQ ID NO: 47 is one or more, preferably 2, 3, 4, 5, 6, 7, 8, 9, 10, 11, 12, 13, 14, 15, 16, 17, 18, 19, or 20, and more preferably 21 or more. The position of substitution is indicated by the position numbered according to the Kabat numbering system.

K24: A, I, L, M, P, V, G, N, Q, S, T, D, E, H, R, F, W, Y
A25: I, L, M, P, V, G, N, Q, S, T, D, E, H, K, R, F, W, Y
S26: A, I, L, M, P, V, G, N, Q, T, D, E, H, K, R, F, W, Y
R27: A, I, L, M, P, V, G, N, Q, S, T, D, E, H, K, F, W, Y
N28: A, I, L, M, P, V, G, Q, S, T, D, E, H, K, R, F, W, Y
I29: A, L, M, P, V, G, N, Q, S, T, D, E, H, K, R, F, W, Y
E30: A, I, L, M, P, V, G, N, Q, S, T, D, H, K, R, F, W, Y
R31: A, I, L, M, P, V, G, N, Q, S, T, D, E, H, K, F, W, Y
Q32: A, I, L, M, P, V, G, N, S, T, D, E, H, K, R, F, W, Y
L33: A, I, M, P, V, G, N, Q, S, T, D, E, H, K, R, F, W, Y
A34: I, L, M, P, V, G, N, Q, S, T, D, E, H, K, R, F, W, Y
Q50: A, I, L, M, P, V, G, N, S, T, D, E, H, K, R, F, W, Y
A51: I, L, M, P, V, G, N, Q, S, T, D, E, H, K, R, F, W, Y
S52: A, I, L, M, P, V, G, N, Q, T, D, E, H, K, R, F, W, Y
R53: A, I, L, M, P, V, G, N, Q, S, T, D, E, H, K, F, W, Y
K54: A, I, L, M, P, V, G, N, Q, S, T, D, E, H, R, F, W, Y
E55: A, I, L, M, P, V, G, N, Q, S, T, D, H, K, R, F, W, Y
S56: A, I, L, M, P, V, G, N, Q, T, D, E, H, K, R, F, W, Y
Q89: A, I, L, M, P, V, G, N, S, T, D, E, H, K, R, F, W, Y
Q90: A, I, L, M, P, V, G, N, S, T, D, E, H, K, R, F, W, Y
Y91: A, I, L, M, P, V, G, N, Q, S, T, D, E, H, K, R, F, W
S92: A, I, L, M, P, V, G, N, Q, T, D, E, H, K, R, F, W, Y
D93: A, I, L, M, P, V, G, N, Q, S, T, E, H, K, R, F, W, Y
P94: A, I, L, M, V, G, N, Q, S, T, D, E, H, K, R, F, W, Y
P95: A, I, L, M, V, G, N, Q, S, T, D, E, H, K, R, F, W, Y
L96: A, I, M, P, V, G, N, Q, S, T, D, E, H, K, R, F, W, Y
T97: A, I, L, M, P, V, G, N, Q, S, D, E, H, K, R, F, W, Y

In one aspect, the present invention provides a polypeptide or an antibody, in which at least one or more amino acid residues at the following positions in an antibody heavy chain variable domain having the heavy chain CDR 1, 2, and 3 amino acid sequences of SEQ ID NOs: 1, 2, and 3, respectively, or at least one or more amino acid residues at the following positions in the antibody heavy chain variable domain of SEQ ID NO: 45 are any of the following amino acid residues.

In the above-mentioned polypeptide or antibody, the number of amino acid residues that are different from an antibody heavy chain variable domain having the heavy chain CDR 1, 2, and 3 amino acid sequences of SEQ ID NOs: 1, 2, and 3, respectively, or the number of amino acid residues that are different from an antibody heavy chain variable domain of SEQ ID NO: 45 is one or more, preferably 2, 3, 4, 5, 6, 7, 8, 9, 10, 11, 12, 13, 14, 15, 16, 17, 18, 19, or 20, and more preferably 21 or more. The position of substitution is indicated by the position numbered according to the Kabat numbering system.

Y31: A, I, L, M, P, V, G, N, Q, S, T, D, E, H, K, R, F, W
Y32: A, I, L, M, P, V, G, N, Q, S, T, D, E, H, K, R, F, W
D33: A, I, L, M, P, V, G, N, Q, S, T, E, H, K, R, F, W, Y
I34: A, L, M, P, V, G, N, Q, S, T, D, E, H, K, R, F, W, Y
Q35: A, I, L, M, P, V, G, N, S, T, D, E, H, K, R, F, W, Y
S50: A, I, L, M, P, V, G, N, Q, T, D, E, H, K, R, F, W, Y
I51: A, L, M, P, V, G, N, Q, S, T, D, E, H, K, R, F, W, Y
S52: A, I, L, M, P, V, G, N, Q, T, D, E, H, K, R, F, W, Y
P52a: A, I, L, M, V, G, N, Q, S, T, D, E, H, K, R, F, W, Y
S53: A, I, L, M, P, V, G, N, Q, T, D, E, H, K, R, F, W, Y
G54: A, I, L, M, P, V, N, Q, S, T, D, E, H, K, R, F, W, Y
Q55: A, I, L, M, P, V, G, N, S, T, D, E, H, K, R, F, W, Y
S56: A, I, L, M, P, V, G, N, Q, T, D, E, H, K, R, F, W, Y
T57: A, I, L, M, P, V, G, N, Q, S, D, E, H, K, R, F, W, Y
Y58: A, I, L, M, P, V, G, N, Q, S, T, D, E, H, K, R, F, W
Y59: A, I, L, M, P, V, G, N, Q, S, T, D, E, H, K, R, F, W

R60: A, I, L, M, P, V, G, N, Q, S, T, D, E, H, K, F, W, Y
R61: A, I, L, M, P, V, G, N, Q, S, T, D, E, H, K, F, W, Y
E62: A, I, L, M, P, V, G, N, Q, S, T, D, H, K, R, F, W, Y
V63: A, I, L, M, P, G, N, Q, S, T, D, E, H, K, R, F, W, Y
K64: A, I, L, M, P, V, G, N, Q, S, T, D, E, H, R, F, W, Y
G65: A, I, L, M, P, V, N, Q, S, T, D, E, H, K, R, F, W, Y
R95: A, I, L, M, P, V, G, N, Q, S, T, D, E, H, K, F, W, Y
T96: A, I, L, M, P, V, G, N, Q, S, D, E, H, K, R, F, W, Y
G97: A, I, L, M, P, V, N, Q, S, T, D, E, H, K, R, F, W, Y
R98: A, I, L, M, P, V, G, N, Q, S, T, D, E, H, K, F, W, Y
E99: A, I, L, M, P, V, G, N, Q, S, T, D, H, K, R, F, W, Y
Y100: A, I, L, M, P, V, G, N, Q, S, T, D, E, H, K, R, F, W
G100a: A, I, L, M, P, V, N, Q, S, T, D, E, H, K, R, F, W, Y
G100b: A, I, L, M, P, V, N, Q, S, T, D, E, H, K, R, F, W, Y
G100c: A, I, L, M, P, V, N, Q, S, T, D, E, H, K, R, F, W, Y
W100d: A, I, L, M, P, V, G, N, Q, S, T, D, E, H, K, R, F, Y
Y100e: A, I, L, M, P, V, G, N, Q, S, T, D, E, H, K, R, F, W
F100f: A, I, L, M, P, V, G, N, Q, S, T, D, E, H, K, R, W, Y
D101: A, I, L, M, P, V, G, N, Q, S, T, E, H, K, R, F, W, Y
Y102: A, I, L, M, P, V, G, N, Q, S, T, D, E, H, K, R, F, W

In one aspect, the present invention provides a polypeptide or an antibody, in which at least one or more amino acid residues at the following positions in an antibody heavy chain variable domain having the heavy chain CDR 1, 2, and 3 amino acid sequences of SEQ ID NOs: 4, 5, and 6, respectively, or at least one or more amino acid residues at the following positions in the antibody heavy chain variable domain of SEQ ID NO: 46 are any of the following amino acid residues.

In the above-mentioned polypeptide or antibody, the number of amino acid residues that are different from an antibody heavy chain variable domain having the heavy chain CDR 1, 2, and 3 amino acid sequences of SEQ ID NOs: 4, 5, and 6, respectively, or the number of amino acid residues that are different from an antibody heavy chain variable domain of SEQ ID NO: 46 is one or more, preferably 2, 3, 4, 5, 6, 7, 8, 9, 10, 11, 12, 13, 14, 15, 16, 17, 18, 19, or 20, and more preferably 21 or more. The position of substitution is indicated by the position numbered according to the Kabat numbering system.

D31: A, I, L, M, P, V, G, N, Q, S, T, E, H, K, R, F, W, Y
N32: A, I, L, M, P, V, G, Q, S, T, D, E, H, K, R, F, W, Y
N33: A, I, L, M, P, V, G, Q, S, T, D, E, H, K, R, F, W, Y
M34: A, I, L, P, V, G, N, Q, S, T, D, E, H, K, R, F, W, Y
D35: A, I, L, M, P, V, G, N, Q, S, T, E, H, K, R, F, W, Y
D50: A, I, L, M, P, V, G, N, Q, S, T, E, H, K, R, F, W, Y
I51: A, L, M, P, V, G, N, Q, S, T, D, E, H, K, R, F, W, Y
N52: A, I, L, M, P, V, G, Q, S, T, D, E, H, K, R, F, W, Y
T52a: A, I, L, M, P, V, G, N, Q, S, D, E, H, K, R, F, W, Y
R53: A, I, L, M, P, V, G, N, Q, S, T, D, E, H, K, F, W, Y
S54: A, I, L, M, P, V, G, N, Q, T, D, E, H, K, R, F, W, Y
G55: A, I, L, M, P, V, N, Q, S, T, D, E, H, K, R, F, W, Y
G56: A, I, L, M, P, V, N, Q, S, T, D, E, H, K, R, F, W, Y
S57: A, I, L, M, P, V, G, N, Q, T, D, E, H, K, R, F, W, Y
I58: A, L, M, P, V, G, N, Q, S, T, D, E, H, K, R, F, W, Y
Y59: A, I, L, M, P, V, G, N, Q, S, T, D, E, H, K, R, F, W
N60: A, I, L, M, P, V, G, Q, S, T, D, E, H, K, R, F, W, Y

E61: A, I, L, M, P, V, G, N, Q, S, T, D, H, K, R, F, W, Y
E62: A, I, L, M, P, V, G, N, Q, S, T, D, H, K, R, F, W, Y
F63: A, I, L, M, P, V, G, N, Q, S, T, D, E, H, K, R, W, Y
Q64: A, I, L, M, P, V, G, N, S, T, D, E, H, K, R, F, W, Y
D65: A, I, L, M, P, V, G, N, Q, S, T, E, H, K, R, F, W, Y
R95: A, I, L, M, P, V, G, N, Q, S, T, D, E, H, K, F, W, Y
K96: A, I, L, M, P, V, G, N, Q, S, T, D, E, H, R, F, W, Y
S97: A, I, L, M, P, V, G, N, Q, T, D, E, H, K, R, F, W, Y
Y98: A, I, L, M, P, V, G, N, Q, S, T, D, E, H, K, R, F, W
G99: A, I, L, M, P, V, N, Q, S, T, D, E, H, K, R, F, W, Y
Y100: A, I, L, M, P, V, G, N, Q, S, T, D, E, H, K, R, F, W
Y100a: A, I, L, M, P, V, G, N, Q, S, T, D, E, H, K, R, F, W
L100b: A, I, M, P, V, G, N, Q, S, T, D, E, H, K, R, F, W, Y
D101: A, I, L, M, P, V, G, N, Q, S, T, E, H, K, R, F, W, Y
E102: A, I, L, M, P, V, G, N, Q, S, T, D, H, K, R, F, W, Y

In one embodiment, the present invention provides a bispecific antibody which recognizes FIX and/or FIXa, and FX, in which a first polypeptide and a third polypeptide form a pair and a second polypeptide and a fourth polypeptide form a pair, and in which the first polypeptide comprises the antibody heavy chain variable domain amino acid sequence of SEQ ID NO: 45, the second polypeptide comprises the antibody heavy chain variable domain amino acid sequence of SEQ ID NO: 46, the fourth polypeptide comprises the antibody light chain variable domain amino acid sequence of SEQ ID NO: 47, and the third polypeptide comprises an antibody light chain comprising any one of the amino acid sequences selected from the above-mentioned (a1) to (a6).

In another embodiment, the present invention provides a bispecific antibody which recognizes FIX and/or FIXa, and FX, in which a first polypeptide and a third polypeptide form a pair and a second polypeptide and a fourth polypeptide form a pair, and in which the first polypeptide comprises the antibody heavy chain variable domain amino acid sequence of SEQ ID NO: 45, the third polypeptide comprises the antibody light chain variable domain amino acid sequence of SEQ ID NO: 47, the second polypeptide comprises the antibody heavy chain variable domain amino acid sequence of SEQ ID NO: 46, and the fourth polypeptide comprises an antibody light chain comprising any one of the amino acid sequences selected from the above-mentioned (b1) to (b23).

In a specific embodiment, the present invention provides variants of the polypeptides and antibodies provided herein.

In specific embodiments, variants provided herein include variants that have been subjected to amino acid residue deletions in an amino acid sequence, and/or amino acid residue insertions to an amino acid sequence, and/or amino acid residue substitutions in an amino acid sequence. On the premise that the final construct will have improved FVIII cofactor function-substituting activity, arbitrary combinations of deletions, insertions, and substitutions may be performed to reach the final construct.

A. Exemplary Anti-FIX(a)/FX Bispecific Antibodies

Examples of bispecific antibodies recognizing FIX and/or FIXa, and FX (herein below simply referred to as "anti-FIX (a)/FX bispecific antibodies") provided herein are described below; the followings are similarly applied to the other antibodies and polypeptides provided herein. Herein, FIX (a) means FIX and/or FIXa.

1. Antibody Fragments

In certain embodiments, an antibody provided herein is an antibody fragment. Antibody fragments include, but are not limited to, Fab, Fab', Fab'-SH, F(ab')₂, Fv, and scFv fragments, and other fragments described below. For a review of certain antibody fragments, see Hudson et al. *Nat. Med.* 9:129-134 (2003). For a review of scFv fragments, see, e.g., Pluckthün, in *The Pharmacology of Monoclonal Antibodies*, vol. 113, Rosenburg and Moore eds., (Springer-Verlag, New York), pp. 269-315 (1994); see also WO 93/16185; and U.S. Pat. Nos. 5,571,894 and 5,587,458. For discussion of Fab and F(ab')₂ fragments comprising salvage receptor binding epitope residues and having increased in vivo half-life, see U.S. Pat. No. 5,869,046.

Diabodies are antibody fragments with two antigen-binding sites that may be bivalent or bispecific. See, for example, EP 404,097; WO 1993/01161; Hudson et al., *Nat. Med.* 9:129-134 (2003); and Hollinger et al., *Proc. Natl. Acad. Sci. USA* 90:6444-6448 (1993). Triabodies and tetrabodies are also described in Hudson et al., *Nat. Med.* 9:129-134 (2003).

Single-domain antibodies are antibody fragments comprising all or a portion of the heavy chain variable domain or all or a portion of the light chain variable domain of an antibody. In certain embodiments, a single-domain antibody is a human single-domain antibody (Domantis, Inc., Waltham, MA; see, e.g., U.S. Pat. No. 6,248,516 B1).

Antibody fragments can be made by various techniques, including but not limited to proteolytic digestion of an intact antibody as well as production by recombinant host cells (e.g., *E. coli* or phage), as described herein.

2. Human Antibodies

In certain embodiments, an antibody provided herein is a human antibody. Human antibodies can be produced using various techniques known in the art. Human antibodies are described generally in van Dijk and van de Winkel, *Curr. Opin. Pharmacol.* 5:368-74 (2001) and Lonberg, *Curr. Opin. Immunol.* 20:450-459 (2008).

Human antibodies may be prepared by administering an immunogen to a transgenic animal that has been modified to produce intact human antibodies or intact antibodies with human variable regions in response to antigenic challenge. Such animals typically contain all or a portion of the human immunoglobulin loci, which replace the endogenous immunoglobulin loci, or which are present extrachromosomally or integrated randomly into the animal's chromosomes. In such transgenic mice, the endogenous immunoglobulin loci have generally been inactivated. For review of methods for obtaining human antibodies from transgenic animals, see Lonberg, *Nat. Biotech.* 23:1117-1125 (2005). See also, e.g., U.S. Pat. Nos. 6,075,181 and 6,150,584 describing XENOMOUSE™ technology; U.S. Pat. No. 5,770,429 describing HUMAB (registered trademark) technology; U.S. Pat. No. 7,041,870 describing K-M MOUSE (registered trademark) technology, and U.S. Patent Application Publication No. US 2007/0061900, describing VELOCIMOUSE (registered trademark) technology). Human variable regions from intact antibodies generated by such animals may be further modified, e.g., by combining with a different human constant region.

Human antibodies can also be made by hybridoma-based methods. Human myeloma and mouse-human heteromyeloma cell lines for the production of human monoclonal antibodies have been described. (See, e.g., Kozbor *J. Immunol.*, 133:3001 (1984); Brodeur et al., *Monoclonal Antibody Production Techniques and Applications*, pp. 51-63 (Marcel Dekker, Inc., New York, 1987); and Boerner et al., *J. Immunol.*, 147:86 (1991).) Human antibodies generated via human B-cell hybridoma technology are also described in Li et al., *Proc. Natl. Acad. Sci. USA*, 103:3557-3562 (2006). Additional methods include those described, for example, in U.S. Pat. No. 7,189,826 (describing production of monoclonal human IgM antibodies from hybridoma cell lines) and Ni, *Xiandai Mianyixue*, 26 (4): 265-268 (2006) (describing human-human hybridomas). Human hybridoma technology (Trioma technology) is also described in Vollmers and Brandlein, *Histology and Histopathology*, 20 (3): 927-937 (2005) and Vollmers and Brandlein, *Methods and Findings in Experimental and Clinical Pharmacology*, 27 (3): 185-91 (2005).

Human antibodies may also be generated by isolating Fv clone variable domain sequences selected from human-derived phage display libraries. Such variable domain sequences may then be combined with a desired human constant domain. Techniques for selecting human antibodies from antibody libraries are described below.

3. Library-Derived Antibodies

Antibodies of the invention may be isolated by screening combinatorial libraries for antibodies with the desired activity or activities. For example, a variety of methods are known in the art for generating phage display libraries and screening such libraries for antibodies possessing the desired binding characteristics. Such methods are reviewed, e.g., in Hoogenboom et al. in *Methods in Molecular Biology* 178: 1-37 (O'Brien et al., ed., Human Press, Totowa, NJ, 2001) and further described, e.g., in the McCafferty et al., *Nature* 348:552-554; Clackson et al., *Nature* 352:624-628 (1991); Marks et al., *J. Mol. Biol.* 222:581-597 (1992); Marks and Bradbury, in *Methods in Molecular Biology* 248:161-175 (Lo, ed., Human Press, Totowa, NJ, 2003); Sidhu et al., *J. Mol. Biol.* 338 (2): 299-310 (2004); Lee et al., *J. Mol. Biol.* 340(5): 1073-1093 (2004); Fellouse, *Proc. Natl. Acad. Sci. USA* 101(34): 12467-12472 (2004); and Lee et al., *J. Immunol. Methods* 284 (1-2): 119-132 (2004).

In certain phage display methods, repertoires of VH and VL genes are separately cloned by polymerase chain reaction (PCR) and recombined randomly in phage libraries, which can then be screened for antigen-binding phage as described in Winter et al., *Ann. Rev. Immunol.*, 12: 433-455 (1994). Phage typically display antibody fragments, either as single-chain Fv (scFv) fragments or as Fab fragments. Libraries from immunized sources provide high-affinity antibodies to the immunogen without the requirement of constructing hybridomas. Alternatively, the naive repertoire can be cloned (e.g., from human) to provide a single source of antibodies to a wide range of non-self and also self antigens without any immunization as described by Griffiths et al., *EMBO J*, 12:725-734 (1993). Finally, naive libraries can also be made synthetically by cloning unrearranged V-gene segments from stem cells, and using PCR primers containing random sequence to encode the highly variable CDR3 regions and to accomplish rearrangement in vitro, as described by Hoogenboom and Winter, *J. Mol. Biol.*, 227: 381-388 (1992). Patent publications describing human antibody phage libraries include, for example: U.S. Pat. No. 5,750,373, and US Patent Publication Nos. 2005/0079574, 2005/0119455, 2005/0266000, 2007/0117126, 2007/0160598, 2007/0237764, 2007/0292936, and 2009/0002360.

Antibodies or antibody fragments isolated from human antibody libraries are considered human antibodies or human antibody fragments herein.

Techniques for making multispecific antibodies include, but are not limited to, recombinant co-expression of two immunoglobulin heavy chain-light chain pairs having different specificities (see Milstein and Cuello, *Nature* 305:537 (1983), WO 93/08829, and Traunecker et al., *EMBO J.* 10:3655 (1991)), and "knob-in-hole" engineering (see, e.g., U.S. Pat. No. 5,731,168). Multi-specific antibodies may also be made by engineering electrostatic steering effects for making antibody Fc-heterodimeric molecules (WO 2009/089004A1); cross-linking two or more antibodies or fragments (see, e.g., U.S. Pat. No. 4,676,980, and Brennan et al., *Science*, 229:81 (1985)); using leucine zippers to produce bi-specific antibodies (see, e.g., Kostelny et al., *J. Immunol.*, 148 (5): 1547-1553 (1992)); using "diabody" technology for making bispecific antibody fragments (see, e.g., Hollinger et al., *Proc. Natl. Acad. Sci. USA*, 90:6444-6448 (1993)); and using single-chain Fv (scFv) dimers (see, e.g., Gruber et al., *J. Immunol.*, 152:5368 (1994)); and preparing trispecific antibodies as described, e.g., in Tutt et al. *J. Immunol.* 147:60 (1991).

a) Substitution, Insertion, and Deletion Variants

In certain embodiments, antibody variants having one or more amino acid substitutions are provided. Sites of interest for substitutional mutagenesis include the HVRs and FRs. Conservative substitutions are shown in Table 1 under the heading of "preferred substitutions." More substantial changes are provided in Table 1 under the heading of "exemplary substitutions," and as further described below in reference to amino acid side chain classes. Amino acid substitutions may be introduced into an antibody of interest and the products screened for a desired activity, e.g., retained/improved antigen binding, decreased 10 immunogenicity, or improved FVIII cofactor function-substituting activity, ADCC or CDC.

TABLE 1

| Original Residue | Exemplary Substitutions | Preferred Substitutions |
| --- | --- | --- |
| Ala (A) | Val; Leu; Ile | Val |
| Arg (R) | Lys; Gln; Asn | Lys |
| Asn (N) | Gln; His; Asp, Lys; Arg | Gln |
| Asp (D) | Glu; Asn | Glu |
| Cys (C) | Ser; Ala | Ser |
| Gln (Q) | Asn; Glu | Asn |
| Glu (E) | Asp; Gln | Asp |
| Gly (G) | Ala | Ala |
| His (H) | Asn; Gln; Lys; Arg | Arg |
| Ile (I) | Leu; Val; Met; Ala; Phe; Norleucine | Leu |
| Leu (L) | Norleucine; Ile; Val; Met; Ala; Phe | Ile |
| Lys (K) | Arg; Gln; Asn | Arg |
| Met (M) | Leu; Phe; Ile | Leu |
| Phe (F) | Trp; Leu; Val; Ile; Ala; Tyr | Tyr |
| Pro (P) | Ala | Ala |
| Ser (S) | Thr | Thr |
| Thr (T) | Val; Ser | Ser |
| Trp (W) | Tyr; Phe | Tyr |
| Tyr (Y) | Trp; Phe; Thr; Ser | Phe |
| Val (V) | Ile; Leu; Met; Phe; Ala; Norleucine | Leu |

Amino acids may be grouped according to common side-chain properties:
(1) hydrophobic: Norleucine, Met, Ala, Val, Leu, Ile;
(2) neutral hydrophilic: Cys, Ser, Thr, Asn, Gln;
(3) acidic: Asp, Glu;
(4) basic: His, Lys, Arg;
(5) residues that influence chain orientation: Gly, Pro;
(6) aromatic: Trp, Tyr, Phe.

Non-conservative substitutions will entail exchanging a member of one of these classes for another class.

One type of substitutional variant involves substituting one or more hypervariable region residues of a parent antibody (e.g., a humanized or human antibody). Generally, the resulting variant(s) selected for further study will have modifications (e.g., improvements) in certain biological properties (e.g., increased FVIII cofactor function-substituting activity or affinity, reduced immunogenicity) relative to the parent antibody and/or will have substantially retained certain biological properties of the parent antibody.

In certain embodiments, substitutions, insertions, or deletions may occur within one or more HVRs so long as such alterations do not substantially reduce the ability of the antibody to bind antigen. For example, conservative alterations (e.g., conservative substitutions as provided herein) that do not substantially reduce FVIII cofactor function-substituting activity may be made in HVRs.

A useful method for identification of residues or regions of an antibody that may be targeted for mutagenesis is called "alanine scanning mutagenesis" as described by Cunningham and Wells (1989) *Science*, 244:1081-1085. In this method, a residue or group of target residues (e.g., charged residues such as arg, asp, his, lys, and glu) are identified and replaced by a neutral or negatively charged amino acid (e.g., alanine or polyalanine) to determine whether the interaction of the antibody with antigen is affected. Further substitutions may be introduced at the amino acid locations demonstrating functional sensitivity to the initial substitutions. Alternatively, or additionally, a crystal structure of an antigen-antibody complex may be analyzed to identify contact points between the antibody and antigen. Such contact residues and neighboring residues may be targeted or eliminated as candidates for substitution. Variants may be screened to determine whether they contain the desired properties.

Amino acid sequence insertions include amino- and/or carboxyl-terminal fusions ranging in length from one residue to polypeptides containing a hundred or more residues, as well as intrasequence insertions of single or multiple amino acid residues. Examples of terminal insertions include an antibody with an N-terminal methionyl residue. Other insertional variants of the antibody molecule include the fusion of an enzyme (e.g., for ADEPT) or a polypeptide which increases the plasma half-life of the antibody to the N- or C-terminus of the antibody.

b) Glycosylation Variants

In certain embodiments, an antibody provided herein is altered to increase or decrease the extent to which the antibody is glycosylated. Addition or deletion of glycosylation sites to an antibody may be conveniently accomplished by altering the amino acid sequence such that one or more glycosylation sites are created or removed.

Where the antibody comprises an Fc region, the carbohydrate attached thereto may be altered. Native antibodies produced by mammalian cells typically comprise a branched, biantennary oligosaccharide that is generally attached by an N-linkage to Asn297 of the CH2 domain of the Fc region. See, e.g., Wright et al. *TIBTECH* 15:26-32 (1997). The oligosaccharide may include various carbohydrates, e.g., mannose, N-acetyl glucosamine (GlcNAc), galactose, and sialic acid, as well as a fucose attached to a GlcNAc in the "stem" of the biantennary oligosaccharide structure. In some embodiments, modifications of the oligosaccharide in an antibody of the invention may be made in order to create antibody variants with certain improved properties.

In one embodiment, antibody variants are provided having a carbohydrate structure that lacks fucose attached (directly or indirectly) to an Fc region. For example, the amount of fucose in such antibody may be from 1% to 80%, from 1% to 65%, from 5% to 65% or from 20% to 40%. The amount of fucose is determined by calculating the average amount of fucose within the sugar chain at Asn297, relative to the sum of all glycostructures attached to Asn 297 (e.g., complex, hybrid and high mannose structures) as measured by MALDI-TOF mass spectrometry, as described in WO 2008/077546, for example. Asn297 refers to the asparagine residue located at about position 297 in the Fc region (EU numbering of Fc region residues); however, Asn297 may also be located +/−3 amino acids upstream or downstream of position 297, i.e., between positions 294 and 300, due to minor sequence variations in antibodies. Such fucosylation variants may have improved ADCC function. See, e.g., US Patent Publication Nos. US 2003/0157108 (Presta, L.); US 2004/0093621 (Kyowa Hakko Kogyo Co., Ltd). Examples of publications related to "defucosylated" or "fucose-deficient" antibody variants include: US 2003/0157108; WO 2000/61739; WO 2001/29246; US 2003/0115614; US 2002/0164328; US 2004/0093621; US 2004/0132140; US 2004/0110704; US 2004/0110282; US 2004/0109865; WO 2003/085119; WO 2003/084570; WO 2005/035586; WO 2005/035778; WO 2005/053742; WO 2002/031140; Okazaki et al. *J. Mol. Biol.* 336:1239-1249 (2004); Yamane-Ohnuki et al. *Biotech. Bioeng.* 87:614 (2004). Examples of cell lines capable of producing defucosylated antibodies include Lec13 CHO cells deficient in protein fucosylation (Ripka et al. *Arch. Biochem. Biophys.* 249:533-545 (1986); US Pat Appl No. US 2003/0157108 A1, Presta, L; and WO 2004/056312 A1, Adams et al., especially at Example 11), and knockout cell lines, such as alpha-1,6-fucosyltransferase gene, FUT8, knockout CHO cells (see, e.g., Yamane-Ohnuki et al. *Biotech. Bioeng.* 87:614 (2004); Kanda, Y. et al., *Biotechnol. Bioeng.*, 94(4): 680-688 (2006); and WO 2003/085107).

Antibodies variants are further provided with bisected oligosaccharides, e.g., in which a biantennary oligosaccharide attached to the Fc region of the antibody is bisected by GlcNAc. Such antibody variants may have reduced fucosylation and/or improved ADCC function. Examples of such antibody variants are described, e.g., in WO 2003/011878 (Jean-Mairet et al.); U.S. Pat. No. 6,602,684 (Umana et al.); and US 2005/0123546 (Umana et al.). Antibody variants with at least one galactose residue in the oligosaccharide attached to the Fc region are also provided. Such antibody variants may have improved CDC function. Such antibody variants are described, e.g., in WO 1997/30087 (Patel et al.); WO 1998/58964 (Raju, S.); and WO 1999/22764 (Raju, S.).

c) Fc Region Variants

In certain embodiments, one or more amino acid modifications may be introduced into the Fc region of an antibody provided herein, thereby generating an Fc region variant. The Fc region variant may comprise a human Fc region sequence (e.g., a human IgG1, IgG2, IgG3 or IgG4 Fc region) comprising an amino acid modification (e.g., a substitution) at one or more amino acid positions.

In certain embodiments, the invention contemplates an antibody variant that possesses some but not all effector functions, which make it a desirable candidate for applications in which the half life of the antibody in vivo is important yet certain effector functions (such as complement and ADCC) are unnecessary or deleterious. In vitro and/or in vivo cytotoxicity assays can be conducted to confirm the reduction/depletion of CDC and/or ADCC activities. For example, Fc receptor (FcR) binding assays can be conducted to ensure that the antibody lacks Fc gamma R binding (hence likely lacking ADCC activity), but retains FcRn binding ability. The primary cells for mediating ADCC, NK cells, express Fc gamma RIII only, whereas monocytes express Fc gamma RI, Fc gamma RII and Fc gamma RIII. FcR expression on hematopoietic cells is summarized in Table 3 on page 464 of Ravetch and Kinet, *Annu. Rev. Immunol.* 9:457-492 (1991). Non-limiting examples of in vitro assays to assess ADCC activity of a molecule of interest is described in U.S. Pat. No. 5,500,362 (see, e.g., Hellstrom, I. et al. *Proc. Nat'l Acad. Sci. USA* 83:7059-7063 (1986)) and Hellstrom, I et al., *Proc. Nat'l Acad. Sci. USA* 82:1499-1502 (1985); U.S. Pat. No. 5,821,337 (see Bruggemann, M. et al., *J. Exp. Med.* 166:1351-1361 (1987)). Alternatively, non-radioactive assays methods may be employed (see, for example, ACTI™ non-radioactive cytotoxicity assay for flow cytometry (CellTechnology, Inc. Mountain View, CA); and CytoTox 96 (registered trademark) non-radioactive cytotoxicity assay (Promega, Madison, WI). Useful effector cells for such assays include peripheral blood mononuclear cells (PBMC) and Natural Killer (NK) cells. Alternatively, or additionally, ADCC activity of the molecule of interest may be assessed in vivo, e.g., in an animal model such as that disclosed in Clynes et al. *Proc. Nat'l Acad. Sci. USA* 95:652-656 (1998). C1q binding assays may also be carried out to confirm that the antibody is unable to bind C1q and hence lacks CDC activity. See, e.g., C1q and C3c binding ELISA in WO 2006/029879 and WO 2005/100402. To assess complement activation, a CDC assay may be performed (see, for example, Gazzano-Santoro et al., *J. Immunol. Methods* 202:163 (1996); Cragg, M. S. et al., *Blood* 101:1045-1052 (2003); and Cragg, M. S. and M. J. Glennie, *Blood* 103:2738-2743 (2004)). FcRn binding and in vivo clearance/half life determinations can also be performed using methods known in the art (see, e.g., Petkova, S. B. et al., *Int'l. Immunol.* 18 (12): 1759-1769 (2006)).

Antibodies with reduced effector function include those with substitution of one or more of Fc region residues 238, 265, 269, 270, 297, 327 and 329 (U.S. Pat. No. 6,737,056). Such Fc mutants include Fc mutants with substitutions at two or more of amino acid positions 265, 269, 270, 297 and 327, including the so-called "DANA" Fc mutant with substitution of residues 265 and 297 to alanine (U.S. Pat. No. 7,332,581).

Certain antibody variants with increased or decreased binding to FcRs are described. (See U.S. Pat. No. 6,737,056; WO 2004/056312, and Shields et al., *J. Biol. Chem.* 9(2): 6591-6604 (2001).)

In some embodiments, alterations that result in altered (i.e., either increased or decreased) C1q binding and/or Complement Dependent Cytotoxicity (CDC) are made in the Fc region, e.g., as described in U.S. Pat. No. 6,194,551, WO 99/51642, and Idusogie et al. *J. Immunol.* 164:4178-4184 (2000).

Antibodies with increased half lives and increased binding to the neonatal Fc receptor (FcRn), which is responsible for the transfer of maternal IgGs to the fetus (Guyer et al., *J. Immunol.* 117:587 (1976) and Kim et al., *J. Immunol.* 24:249 (1994)), are described in US2005/0014934A1 (Hinton et al.). Those antibodies comprise an Fc region with one or more substitutions therein which increase binding of the Fc region to FcRn. Such Fc variants include those with substitutions at one or more of Fc region residues: 238, 256, 265, 272, 286, 303, 305, 307, 311, 312, 317, 340, 356, 360, 362, 376, 378, 380, 382, 413, 424, 428, 434 or 436, e.g., substitution of Fc region residue 434 (U.S. Pat. No. 7,371,826).

Furthermore, Fc region variants having suppressed binding to a rheumatoid factor can be used as the antibodies of the present invention. Such variants are described in WO 2013/046704, and their examples include variants having a combination of mutations indicated by Q438R/S440E, Q438R/S440D, Q438K/S440E, or Q438K/S440D in both of their H chains.

Furthermore, Fc region variants having enhanced binding to FcRn and suppressed binding to a rheumatoid factor can be used as the antibodies of the present invention. More specifically, examples include Fc region variants having in both of their H chains, a combination of mutations shown in any one of the following a) to f).

a) N434A/Y436T/Q438R/S440E
b) N434A/Y436V/Q438R/S440E
c) M428L/N434A/Y436T/Q438R/S440E
d) M428L/N434A/Y436V/Q438R/S440E
e) M428L/N434A/Q438R/S440E
f) N434A/Q438R/S440E

See also Duncan & Winter, Nature 322:738-40 (1988); U.S. Pat. Nos. 5,648,260; 5,624,821; and WO 94/29351 concerning other examples of Fc region variants.

d) Antibody Derivatives

In certain embodiments, an antibody provided herein may be further modified to contain additional nonproteinaceous moieties that are known in the art and readily available. The moieties suitable for derivatization of the antibody include but are not limited to water soluble polymers. Non-limiting examples of water soluble polymers include, but are not limited to, polyethylene glycol (PEG), copolymers of ethylene glycol/propylene glycol, carboxymethylcellulose, dextran, polyvinyl alcohol, polyvinyl pyrrolidone, poly-1,3-dioxolane, poly-1,3,6-trioxane, ethylene/maleic anhydride copolymer, polyaminoacids (either homopolymers or random copolymers), and dextran or poly(n-vinyl pyrrolidone) polyethylene glycol, polypropylene glycol homopolymers, polypropylene oxide/ethylene oxide co-polymers, polyoxyethylated polyols (e.g., glycerol), polyvinyl alcohol, and mixtures thereof. Polyethylene glycol propionaldehyde may have advantages in manufacturing due to its stability in water. The polymer may be of any molecular weight, and may be branched or unbranched. The number of polymers attached to the antibody may vary, and if more than one polymer are attached, they can be the same or different molecules. In general, the number and/or type of polymers used for derivatization can be determined based on considerations including, but not limited to, the particular properties or functions of the antibody to be improved, whether the antibody derivative will be used in a therapy under defined conditions, etc.

B. Recombinant Methods and Compositions

Antibodies may be produced using recombinant methods and compositions, e.g., as described in U.S. Pat. No. 4,816,567. In one embodiment, isolated nucleic acid encoding an anti-FIX (a)/FX bispecific antibody described herein is provided. Such nucleic acid may encode an amino acid sequence comprising the VL and/or an amino acid sequence comprising the VH of the antibody (e.g., the light and/or heavy chains of the antibody). In a further embodiment, one or more vectors (e.g., expression vectors) comprising such nucleic acid are provided. In a further embodiment, a host cell comprising such nucleic acid is provided. In one such embodiment, a host cell comprises (e.g., has been transformed with): (1) a vector comprising a nucleic acid that encodes an amino acid sequence comprising the VL of the antibody and an amino acid sequence comprising the VH of the antibody, or (2) a first vector comprising a nucleic acid that encodes an amino acid sequence comprising the VL of the antibody and a second vector comprising a nucleic acid that encodes an amino acid sequence comprising the VH of the antibody. In one embodiment, the host cell is eukaryotic, e.g., a Chinese Hamster Ovary (CHO) cell or lymphoid cell (e.g., Y0, NS0, Sp2/0 cell). In one embodiment, a method of making an anti-FIX (a)/FX bispecific antibody is provided, wherein the method comprises culturing a host cell comprising a nucleic acid encoding the antibody, as provided above, under conditions suitable for expression of the antibody, and optionally recovering the antibody from the host cell (or host cell culture medium).

For recombinant production of an anti-FIX (a)/FX bispecific antibody, nucleic acid encoding an antibody, e.g., as described above, is isolated and inserted into one or more vectors for further cloning and/or expression in a host cell. Such nucleic acid may be readily isolated and sequenced using conventional procedures (e.g., by using oligonucleotide probes that are capable of binding specifically to genes encoding the heavy and light chains of the antibody).

Suitable host cells for cloning or expression of antibody-encoding vectors include prokaryotic or eukaryotic cells described herein. For example, antibodies may be produced in bacteria, in particular when glycosylation and Fc effector function are not needed. For expression of antibody fragments and polypeptides in bacteria, see, e.g., U.S. Pat. Nos. 5,648,237, 5,789,199, and 5,840,523. (See also Charlton, *Methods in Molecular Biology*, Vol. 248 (B. K. C. Lo, ed., Humana Press, Totowa, NJ, 2003), pp. 245-254, describing expression of antibody fragments in *E. coli*.) After expression, the antibody may be isolated from the bacterial cell paste in a soluble fraction and can be further purified.

In addition to prokaryotes, eukaryotic microbes such as filamentous fungi or yeast are suitable cloning or expression hosts for antibody-encoding vectors, including fungi and yeast strains whose glycosylation pathways have been "humanized," resulting in the production of an antibody with a partially or fully human glycosylation pattern. See Gerngross, Nat. Biotech. 22:1409-1414 (2004), and Li et al., *Nat. Biotech.* 24:210-215 (2006).

Suitable host cells for the expression of glycosylated antibody are also derived from multicellular organisms (invertebrates and vertebrates). Examples of invertebrate cells include plant and insect cells. Numerous baculoviral strains have been identified which may be used in conjunction with insect cells, particularly for transfection of *Spodoptera frugiperda* cells.

Plant cell cultures can also be utilized as hosts. See, e.g., U.S. Pat. Nos. 5,959,177, 6,040,498, 6,420,548, 7,125,978, and 6,417,429 (describing PLANTIBODIES™ technology for producing antibodies in transgenic plants).

Vertebrate cells may also be used as hosts. For example, mammalian cell lines that are adapted to grow in suspension may be useful. Other examples of useful mammalian host cell lines are monkey kidney CV1 line transformed by SV40 (COS-7); human embryonic kidney line (293 or 293 cells as described, e.g., in Graham et al., *J. Gen Virol.* 36:59 (1977)); baby hamster kidney cells (BHK); mouse sertoli cells (TM4 cells as described, e.g., in Mather, *Biol. Reprod.* 23:243-251 (1980)); monkey kidney cells (CV1); African green monkey kidney cells (VERO-76); human cervical carcinoma cells (HELA); canine kidney cells (MDCK); buffalo rat liver cells (BRL 3A); human lung cells (W138); human liver cells (Hep G2); mouse mammary tumor (MMT 060562); TRI cells, as described, e.g., in Mather et al., *Annals N.Y. Acad. Sci.* 383:44-68 (1982); MRC 5 cells; and FS4 cells. Other useful mammalian host cell lines include Chinese hamster ovary (CHO) cells, including DHFR CHO cells (Urlaub et al., *Proc. Natl. Acad. Sci. USA* 77:4216 (1980)); and myeloma cell lines such as Y0, NS0 and Sp2/0. For a review of certain mammalian host cell lines suitable for antibody production, see, e.g., Yazaki and Wu, *Methods in Molecular Biology*, Vol. 248 (B. K. C. Lo, ed., Humana Press, Totowa, NJ), pp. 255-268 (2003).

C. Assays

Anti-FIX (a)/FX bispecific antibodies provided herein may be identified, screened for, or characterized for their physical/chemical properties and/or biological activities by various assays known in the art.

1. Binding Assays and Other Assays

In one aspect, an antibody of the invention is tested for its antigen binding activity, e.g., by known methods such as ELISA, Western blot, etc.

2. Activity Assays

In one aspect, assays are provided for identifying anti-FIX (a)/FX bispecific antibodies thereof having biological activity. Biological activity may include, e.g., FVIII cofactor function-substituting activity. Antibodies having such biological activity in vivo and/or in vitro are also provided.

In certain embodiments, an antibody of the invention is tested for such biological activity.

In the present invention, "FVIII cofactor function-substituting activity", "FVIII-substituting activity" and "activity that substitutes for FVIII function" are used synonymously, and refer to the activity of recognizing FIX and/or FIXa, and FX, and promoting FX activation (promoting FXa production).

"FVIII cofactor function-substituting activity" in the present invention means, for example, the activity calculated from FIXa-mediated FX activation reaction assay using a colorimetric determination method and thrombin generation assay using hemophilia A plasma. More specifically, the activity can be confirmed by performing evaluations using an antibody of the present invention, and, for example, a measurement system containing FIXa, FX, synthetic substrate S-2222 (synthetic substrate of FXa), and phospholipids. This measurement system shows the correlation between disease severity and clinical symptoms in cases of hemophilia A (Rosen S, Andersson M, Blomba"ck M et al. Clinical applications of a chromogenic substrate method for determination of FVIII activity. Thromb Haemost 1985; 54:811-23).

D. Pharmaceutical Formulations

Pharmaceutical formulations of an anti-FIX (a)/FX bispecific antibody as described herein are prepared by mixing such antibody having the desired degree of purity with one or more optional pharmaceutically acceptable carriers (Remington's Pharmaceutical Sciences 16th edition, Osol, A. Ed. (1980)), in the form of lyophilized formulations or aqueous solutions. Pharmaceutically acceptable carriers are generally nontoxic to recipients at the dosages and concentrations employed, and include, but are not limited to: buffers such as phosphate, citrate, and other organic acids; antioxidants including ascorbic acid and methionine; preservatives (such as octadecyldimethylbenzyl ammonium chloride; hexamethonium chloride; benzalkonium chloride; benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g., Zn-protein complexes); and/or non-ionic surfactants such as polyethylene glycol (PEG). Exemplary pharmaceutically acceptable carriers herein further include interstitial drug dispersion agents such as soluble neutral-active hyaluronidase glycoproteins (sHASEGP), for example, human soluble PH-20 hyaluronidase glycoproteins, such as rHuPH20 (HYLENEX (registered trademark), Baxter International, Inc.). Certain exemplary sHASEGPs and methods of use, including rHuPH20, are described in US Patent Publication Nos. 2005/0260186 and 2006/0104968. In one aspect, a sHASEGP is combined with one or more additional glycosaminoglycanases such as chondroitinases.

Active ingredients may be entrapped in microcapsules prepared, for example, by coacervation techniques or by interfacial polymerization, for example, hydroxymethylcellulose or gelatin-microcapsules and poly-(methylmethacrylate) microcapsules, respectively, in colloidal drug delivery systems (for example, liposomes, albumin microspheres, microemulsions, nano-particles and nanocapsules) or in macroemulsions. Such techniques are disclosed in *Remington's Pharmaceutical Sciences* 16th edition, Osol, A. Ed. (1980).

Sustained-release preparations may be prepared. Suitable examples of sustained-release preparations include semipermeable matrices of solid hydrophobic polymers containing the antibody, which matrices are in the form of shaped articles, e.g., films, or microcapsules.

The formulations to be used for in vivo administration are generally sterile. Sterility may be readily accomplished, e.g., by filtration through sterile filtration membranes.

E. Therapeutic Methods and Compositions

Any of the anti-FIX (a)/FX bispecific antibodies provided herein may be used in therapeutic methods.

In one aspect, an anti-FIX (a)/FX bispecific antibody for use as a medicament is provided. In further aspects, an anti-FIX (a)/FX bispecific antibody for use in treating bleeding, diseases accompanying bleeding, or diseases caused by bleeding is provided. In certain embodiments, an anti-FIX (a)/FX bispecific antibody for use in a method of treatment is provided. In certain embodiments, the invention provides an anti-FIX (a)/FX bispecific antibody for use in a method of treating an individual having bleeding, diseases accompanying bleeding, or diseases caused by bleeding comprising administering to the individual an effective amount of the anti-FIX (a)/FX bispecific antibody. In one such embodiment, the method further comprises administering to the individual an effective amount of at least one additional therapeutic agent, e.g., as described below. In further embodiments, the invention provides an anti-FIX (a)/FX bispecific antibody for use in substituting for FVIII function. In certain embodiments, the invention provides an anti-FIX (a)/FX bispecific antibody for use in a method of substituting for FVIII function in an individual comprising administering to the individual an effective amount of the anti-FIX (a)/FX bispecific antibody to substitute for FVIII function. An "individual" according to any of the above embodiments is preferably a human.

In one embodiment of antibodies of the present invention, since the antibodies of the present invention have a function of substituting for cofactor FVIII, they are expected to become effective pharmaceutical agents against diseases resulting from decrease in activity (function) of this cofactor. Examples of the above-mentioned diseases include bleeding, diseases accompanying bleeding, or diseases caused by bleeding, and preferred examples are diseases that develop and/or progress due to decrease or deficiency in the activity of FVIII and/or activated blood coagulation factor VIII (FVIIIa). Such diseases include, for example, hemophilia A, diseases in which inhibitors against FVIII/FVIIIa appear, acquired hemophilia, von Willebrand disease, and such, but are not particularly limited thereto.

In a further aspect, the invention provides for the use of an anti-FIX (a)/FX bispecific antibody in the manufacture or preparation of a medicament. In one embodiment, the medicament is for treatment of bleeding, diseases accompanying bleeding, or diseases caused by bleeding. In a further embodiment, the medicament is for use in a method of treating bleeding, diseases accompanying bleeding, or diseases caused by bleeding comprising administering to an individual having bleeding, diseases accompanying bleeding, or diseases caused by bleeding an effective amount of the medicament. In one such embodiment, the method further comprises administering to the individual an effective amount of at least one additional therapeutic agent, e.g., as described below. In a further embodiment, the medicament is for substituting for FVIII function. In a further embodiment, the medicament is for use in a method of substituting for FVIII function in an individual comprising administering to the individual an effective amount of the medicament to substitute for FVIII function. An "individual" according to any of the above embodiments may be a human.

In a further aspect, the invention provides a method for treating a bleeding, diseases accompanying bleeding, or diseases caused by bleeding. In one embodiment, the method comprises administering to an individual having such bleeding, diseases accompanying bleeding, or diseases caused by bleeding an effective amount of an anti-FIX (a)/FX bispecific antibody. In one such embodiment, the method further comprises administering to the individual an effective amount of at least one additional therapeutic agent, as described below. An "individual" according to any of the above embodiments may be a human.

In a further aspect, the invention provides a method for substituting for FVIII function in an individual. In one embodiment, the method comprises administering to the individual an effective amount of an anti-FIX (a)/FX bispecific antibody to substitute for FVIII function. In one embodiment, an "individual" is a human.

In a further aspect, the invention provides pharmaceutical formulations comprising any of the anti-FIX (a)/FX bispecific antibodies provided herein, e.g., for use in any of the above therapeutic methods. In one embodiment, a pharmaceutical formulation comprises any of the anti-FIX (a)/FX bispecific antibodies provided herein and a pharmaceutically acceptable carrier. In another embodiment, a pharmaceutical formulation comprises any of the anti-FIX (a)/FX bispecific antibodies provided herein and at least one additional therapeutic agent, e.g., as described below.

Antibodies of the invention can be used either alone or in combination with other agents in a therapy. For instance, an antibody of the invention may be co-administered with at least one additional therapeutic agent. In certain embodiments, an additional therapeutic agent is a FVIII formulation.

Such combination therapies noted above encompass combined administration (where two or more therapeutic agents are included in the same or separate formulations), and separate administration, in which case, administration of the antibody of the invention can occur prior to, simultaneously, and/or following, administration of the additional therapeutic agent or agents. In one embodiment, administration of the anti-FIX (a)/FX bispecific antibody and administration of an additional therapeutic agent occur within about one month, or within about one, two or three weeks, or within about one, two, three, four, five, or six days, of each other.

An antibody of the invention (and any additional therapeutic agent) can be administered by any suitable means, including parenteral, intrapulmonary, and intranasal, and, if desired for local treatment, intralesional administration. Parenteral infusions include intramuscular, intravenous, intraarterial, intraperitoneal, or subcutaneous administration. Dosing can be by any suitable route, e.g., by injections, such as intravenous or subcutaneous injections, depending in part on whether the administration is brief or chronic. Various dosing schedules including but not limited to single or multiple administrations over various time-points, bolus administration, and pulse infusion are contemplated herein.

Antibodies of the invention would be formulated, dosed, and administered in a fashion consistent with good medical practice. Factors for consideration in this context include the particular disorder being treated, the particular mammal being treated, the clinical condition of the individual patient, the cause of the disorder, the site of delivery of the agent, the method of administration, the scheduling of administration, and other factors known to medical practitioners. The antibody needs not be, but is optionally formulated with one or more agents currently used to prevent or treat the disorder in question. The effective amount of such other agents depends on the amount of antibody present in the formulation, the type of disorder or treatment, and other factors discussed above. These are generally used in the same dosages and with administration routes as described herein, or about from 1 to 99% of the dosages described herein, or in any dosage and by any route that is empirically/clinically determined to be appropriate.

For the prevention or treatment of disease, the appropriate dosage of an antibody of the invention (when used alone or in combination with one or more other additional therapeutic agents) will depend on the type of disease to be treated, the type of antibody, the severity and course of the disease, whether the antibody is administered for preventive or therapeutic purposes, previous therapy, the patient's clinical history and response to the antibody, and the discretion of the attending physician. The antibody is suitably administered to the patient at one time or over a series of treatments. Depending on the type and severity of the disease, about 1 micro g/kg to 15 mg/kg (e.g., 0.1 mg/kg-10 mg/kg) of antibody can be an initial candidate dosage for administration to the patient, whether, for example, by one or more separate administrations, or by continuous infusion. One typical daily dosage might range from about 1 micro g/kg to 100 mg/kg or more, depending on the factors mentioned above. For repeated administrations over several days or longer, depending on the condition, the treatment would generally be sustained until a desired suppression of disease symptoms occurs. One exemplary dosage of the antibody would be in the range from about 0.05 mg/kg to about 10 mg/kg. Thus, one or more doses of about 0.5 mg/kg, 2.0 mg/kg, 4.0 mg/kg or 10 mg/kg (or any combination thereof) may be administered to the patient. Such doses may be administered intermittently, e.g., every week or every three weeks (e.g., such that the patient receives from about two to about twenty, or e.g., about six doses of the antibody). An initial higher loading dose, followed by one or more lower doses may be administered. The progress of this therapy is easily monitored by conventional techniques and assays.

F. Articles of Manufacture

In another aspect of the invention, an article of manufacture containing materials useful for the treatment, prevention and/or diagnosis of the disorders described above is provided. The article of manufacture comprises a container and a label on or a package insert associated with the container.

Suitable containers include, for example, bottles, vials, syringes, IV solution bags, etc. The containers may be formed from a variety of materials such as glass or plastic. The container holds a composition which is by itself or combined with another composition effective for treating, preventing and/or diagnosing the condition and may have a sterile access port (for example the container may be an intravenous solution bag or a vial having a stopper pierceable by a hypodermic injection needle). At least one active ingredient in the composition is an antibody of the invention. The label or package insert indicates that the composition is used for treating the condition of choice. Moreover, the article of manufacture may comprise (a) a first container with a composition contained therein, wherein the composition comprises an antibody of the invention; and (b) a second container with a composition contained therein, wherein the composition comprises a further cytotoxic or otherwise therapeutic agent. The article of manufacture in this embodiment of the invention may further comprise a package insert indicating that the compositions can be used to treat a particular condition. Alternatively, or additionally, the article of manufacture may further comprise a second (or third) container comprising a pharmaceutically-acceptable buffer, such as bacteriostatic water for injection (BWFI), phosphate-buffered saline, Ringer's solution and dextrose solution. It may further include other materials desirable from a commercial and user standpoint, including other buffers, diluents, filters, needles, and syringes.

In one aspect, the present invention is a method of producing a variant of Emicizumab, which comprises the following step (a):

(a) performing one or more of the following substitutions (i) to (iii), wherein the numbering is according to the Kabat numbering system:

(i) substitution of one or more amino acids selected from the group consisting of K24, A25, S26, R27, N28, I29, E30, R31, Q32, L33, A34, Q50, A51, S52, R53, K54, E55, S56, Q89, Q90, Y91, S92, D93, P94, P95, L96, and T97, in an antibody light chain variable domain comprising the light chain CDR 1, 2, and 3 amino acid sequences of SEQ ID NOs: 7, 8, and 9, respectively;

(ii) substitution of one or more amino acids selected from the group consisting of Y31, Y32, D33, I34, Q35, S50, I51, S52, P52a, S53, G54, Q55, S56, T57, Y58, Y59, R60, R61, E62, V63, K64, G65, R95, T96, G97, R98, E99, Y100, G100a, G100b, G100c, W100d, Y100e, F100f, D101, and Y102, in an antibody heavy chain variable domain comprising the heavy chain CDR 1, 2, and 3 amino acid sequences of SEQ ID NOs: 1, 2, and 3, respectively; and (iii) substitution of one or more amino acids selected from the group consisting of D31, N32, N33, M34, D35, D50, I51, T52a, N52, R53, S54, G55, G56, S57, I58, Y59, N60, E61, E62, F63, Q64, D65, R95, K96, S97, Y98, G99, Y100, Y100a, L100b, D101, and E102, in an antibody heavy chain variable domain comprising the heavy chain CDR 1, 2, and 3 amino acid sequences of SEQ ID NOs: 4, 5, and 6, respectively.

The sites of substitution described above can be one or more, or they may be a combination of (i) and (ii), a combination of (i) and (iii), a combination of (ii) and (iii), or a combination of (i), (ii), and (iii).

In one aspect, the present invention is a method of isolating a variant of Emicizumab, which comprises the following steps (a) to (c):

(a) producing a variant of Emicizumab by performing one or more of the following (i) to (iii), wherein the numbering is according to the Kabat numbering system:

(i) substitution of one or more amino acids selected from the group consisting of K24, A25, S26, R27, N28, I29, E30, R31, Q32, L33, A34, Q50, A51, S52, R53, K54, E55, S56, Q89, Q90, Y91, S92, D93, P94, P95, L96, and T97, in an antibody light chain variable domain comprising the light chain CDR 1, 2, and 3 amino acid sequences of SEQ ID NOs: 7, 8, and 9, respectively;

(ii) substitution of one or more amino acids selected from the group consisting of Y31, Y32, D33, I34, Q35, S50, I51, S52, P52a, S53, G54, Q55, S56, T57, Y58, Y59, R60, R61, E62, V63, K64, G65, R95, T96, G97, R98, E99, Y100, G100a, G100b, G100c, W100d, Y100e, F100f, D101, and Y102, in an antibody heavy chain variable domain comprising the heavy chain CDR 1, 2, and 3 amino acid sequences of SEQ ID NOs: 1, 2, and 3, respectively; and (iii) substitution of one or more amino acids selected from the group consisting of D31, N32, N33, M34, D35, D50, I51, T52a, N52, R53, S54, G55, G56, S57, I58, Y59, N60, E61, E62, F63, Q64, D65, R95, K96, S97, Y98, G99, Y100, Y100a, L100b, D101, and E102, in an antibody heavy chain variable domain comprising the heavy chain CDR 1, 2, and 3 amino acid sequences of SEQ ID NOs: 4, 5, and 6, respectively;

(b) measuring FVIII cofactor function-substituting activity of the antibody variant produced in step (a); and (c) selecting an Emicizumab antibody variant having improved FVIII cofactor function-substituting activity compared to that of Emicizumab.

The sites of substitution described above can be one or more, or they may be a combination of (i) and (ii), a combination of (i) and (iii), a combination of (ii) and (iii), or a combination of (i), (ii), and (iii).

EXAMPLES

The following are examples of methods and compositions of the invention. It is understood that various other embodiments may be practiced, given the general description provided above.

Although the foregoing invention has been described in some detail by way of illustration and example for purposes of clarity of understanding, the descriptions and examples should not be construed as limiting the scope of the invention. The disclosures of all patent and scientific literature cited herein are expressly incorporated in their entirety by reference.

[Example 1] Screening of Variant Antibodies for Improvement of FVIII Cofactor Function-Substituting Activity ACE910 is a humanized IgG4 antibody showing FVIII cofactor function-substituting activity and comprising anti-FIX (a) and anti-FX domains, the antibody being composed of two types of heavy chains (Q499 and J327) which recognize FIX (a) and FX, respectively, and commonly shared L chains (L404) (heavy chain SEQ ID NOs: 45 and 46, and light chain SEQ ID NO: 47). The present inventors comprehensively introduced amino acid modifications into L404 by methods known to those skilled in the art such as PCR for introducing mutations and performed a large-scale screening of FVIII cofactor function-substituting activity, thereby discovering L-chain amino acid substitutions that improve the FVIII cofactor function-substituting activity of ACE910.

Substitution variants were produced by modifying amino acids in all of the CDRs of L404 (SEQ ID NO: 47) in the L chain of the anti-FX antibody side (heavy chain SEQ ID NO: 46 and light chain SEQ ID NO: 47) of ACE910 to amino acids other than cysteine, with fixing the L chain of the anti-FIX (a) antibody side (heavy chain SEQ ID NO: 45 and light chain SEQ ID NO: 47) of ACE910 to L404. Furthermore, substitution variants were produced by modifying amino acids in all of the CDRs of L404 in the L chain of the anti-FIX (a) antibody side to amino acids other than cysteine, with fixing the L chain of the anti-FX antibody side (heavy chain SEQ ID NO: 46 and light chain SEQ ID NO: 47) to L404 of ACE910. Expression and purification of the bispecific antibodies were carried out by methods known to those skilled in the art.

Using the various purified bispecific antibodies, their FVIII cofactor function-substituting activities were evaluated by a method known to those skilled in the art. Specifically, measurements were performed by the following method. All reactions were carried out at room temperature. Five µL of antibody solution diluted with Tris-buffered saline containing 0.1% bovine serum albumin (hereafter referred to as TBSB) was mixed with 5 µL of 600 ng/ml Human Factor IXa beta (Enzyme Research Laboratories) and then incubated in a 384-well plate at room temperature for 30 minutes. The enzyme reaction in this mixture was initiated by adding 5 µL of 24.7 µg/mL Human Factor X (Enzyme Research Laboratories), and four minutes later, 5 µL of 0.5 M EDTA was added to stop the reaction. The coloring reaction was initiated by adding 5 µL of coloring substrate solution (S-2222, SEKISUI MEDICAL). After a 30-minute coloring reaction, the change in absorbance at 405 nm was measured using the SpectraMax 340PC384 (Molecular Devices).

As a result, several amino acid substitutions indicated in Table 2 below were found to be able to improve the FVIII cofactor function-substituting activity as compared with the parent antibody ACE910. Table 2 shows the mutated positions indicated by Kabat numbering (the number in the "position" column on the far left), the amino acids in ACE910 (amino acids (one letter code) in the second column from the left), amino acids after the mutation (amino acids (one letter code) in the uppermost row), and values (each of the numerical values in the table) obtained by calculating the specific activity relative to ACE910 (purified antibody) and applying a correction using the value of specific activity of ACE910 (culture supernatant). In Table 2, (−) indicates that the expression level of the antibody was low, and "/" indicates that the antibody was not produced since the shown amino acid is the same as that of ACE910.

TABLE 2

FVIII cofactor function-substituting activity of modified bispecific antibodies produced by introducing amino acid substitutions into Q499/L404//J327/L404 (ACE910)

| position | mutation | A | I | L | M | P | V | G | N | Q | S |
|---|---|---|---|---|---|---|---|---|---|---|---|
| L chain of anti-FIX(a) antibody was modified | | | | | | | | | | | |
| 24 | K | 1.96 | 1.51 | 2.22 | 2.05 | 0.91 | 1.47 | 1.42 | 1.18 | 2.01 | 2.17 |
| 25 | A | / | 1.91 | 2.13 | 2.26 | 1.18 | 2.25 | 1.69 | 1.16 | 0.73 | 2.36 |
| 26 | S | 2.76 | 1.02 | 1.79 | 2.18 | 2.63 | 2.93 | 2.62 | 2.51 | 3.52 | / |
| 27 | R | 1.03 | — | 1.29 | 1.64 | 0.07 | 1.02 | 2.05 | 1.02 | 2.06 | 1.07 |
| 28 | N | 1.55 | 1.75 | 0.89 | 1.77 | 2.00 | 1.77 | 1.66 | / | 3.12 | 1.73 |
| 29 | I | 2.37 | / | 1.17 | 1.87 | 1.20 | 2.35 | 1.27 | 2.10 | 1.19 | 2.20 |
| 30 | E | 2.82 | 1.84 | 0.07 | 3.32 | 1.59 | 1.81 | 2.59 | 3.75 | 2.21 | 1.55 |
| 31 | R | 0.54 | 0.74 | 0.66 | 0.51 | 0.07 | 0.61 | 0.49 | 0.41 | 1.01 | 1.08 |
| 32 | Q | 1.17 | 0.84 | 1.58 | 1.96 | 0.07 | 1.07 | 2.26 | 1.70 | / | 1.21 |
| 33 | L | 1.65 | 1.96 | / | 1.62 | 0.07 | 1.71 | 0.82 | 1.16 | 2.10 | 1.89 |
| 34 | A | / | 1.39 | 0.07 | 0.07 | — | 1.22 | 1.77 | 0.07 | 0 07 | 1.66 |
| 50 | Q | 1.42 | 1.00 | 1.18 | 1.15 | 0.15 | 1.32 | 1.08 | 0.63 | / | 1.27 |
| 51 | A | / | — | — | — | 0.31 | 0.96 | 1.16 | — | 0.36 | 1.08 |
| 52 | S | 0.92 | 0.99 | 0.94 | 0.77 | 0.07 | 1.06 | 1.06 | 0.90 | 1.00 | / |
| 53 | R | 0.79 | 1.24 | 1.15 | 1.28 | 0.91 | 0.97 | 0.95 | 0.84 | 0.86 | 0.98 |
| 54 | K | 1.26 | 1.38 | 1.22 | 1.24 | 1.14 | 1.12 | 1.28 | 0.53 | 1.27 | 1.31 |
| 55 | E | 1.24 | 1.39 | 1.18 | 1.23 | 1.10 | 1.13 | 1.14 | 1.28 | 0.07 | 0.07 |
| 56 | S | 1.15 | 1.18 | 1.07 | 1.14 | 1.11 | 1.28 | 1.22 | 1.08 | 1.12 | / |
| 89 | Q | 1.39 | — | 0.78 | 0.38 | — | 0.82 | 0.61 | — | / | 1.08 |
| 90 | Q | 0.90 | 0.37 | 0.51 | 0.85 | — | 0 71 | 0.69 | 0.73 | / | 0 99 |
| 91 | Y | 0.07 | 0.07 | 0.07 | 0.12 | 0.07 | 0.11 | 0.13 | 0.14 | 0.07 | 0.07 |
| 92 | S | 0.99 | 1.07 | 0.72 | 0.92 | 0.22 | 0.56 | 0.94 | 1.12 | 0.79 | / |
| 93 | D | 0.96 | 0.07 | 1.06 | 1.12 | 0.63 | 1.20 | 0.93 | 1.34 | 1.34 | 1.26 |
| 94 | P | 0.68 | 0.74 | 0.40 | 0.63 | / | 0.65 | 0.50 | 0.32 | 0 31 | 0 39 |
| 95 | P | 0.86 | 0.56 | 0.62 | 0.61 | / | 0.94 | 1.14 | 0.75 | 0.55 | 0.94 |
| 96 | L | 1.27 | 0.78 | / | 1.16 | 1.19 | 0.93 | 1.32 | 1.00 | 1.07 | 1.10 |
| 97 | T | — | 1.20 | 0.94 | 0.07 | 0.49 | 0.98 | 1.15 | 0.07 | 1.02 | 1.28 |
| L chain of anti-FX antibody was modified | | | | | | | | | | | |
| 24 | K | 1.06 | 1.06 | 1.11 | 1.07 | 0.06 | 1.02 | 0.96 | 0.06 | 1.11 | 1.07 |
| 25 | A | / | 0.68 | 0.67 | 0.59 | 0.87 | 0.73 | 0.06 | 0.98 | 0.53 | 1.18 |
| 26 | S | 1.05 | 0.99 | 1.10 | 0.06 | 1.25 | 0.90 | 1.07 | 1.00 | 1.05 | / |
| 27 | R | 0.80 | 0.75 | 0.97 | 1.06 | 0.70 | 1.15 | 0.99 | 1.08 | 1.09 | — |
| 28 | N | 1.20 | 1.12 | 1.16 | 1.14 | 1.04 | 1.12 | 0.97 | / | 0.06 | 1.01 |
| 29 | I | 0.45 | / | 0.90 | 0.99 | 0.79 | 0.87 | 0.06 | 0.28 | 0.12 | 0.33 |
| 30 | E | 1.09 | 1.11 | 1.06 | 1.15 | 0.73 | 1.16 | 0.98 | 1.17 | 0.88 | 0.84 |
| 31 | R | 0.81 | 0.88 | 0.89 | 0.78 | 0.84 | 0.86 | 0.73 | 0.69 | 0.77 | 0.72 |
| 32 | Q | 0.89 | 0.25 | 0.84 | 1.04 | 0.76 | 0.35 | 1.09 | 0.83 | / | 1.14 |
| 33 | L | 1.02 | 0.97 | / | 1.01 | 0.38 | 0.87 | 0.80 | 1.06 | 0.94 | 0.86 |

TABLE 2-continued

FVIII cofactor function-substituting activity of modified bispecific antibodies
produced by introducing amino acid substitutions into Q499/L404//J327/L404 (ACE910)

| 34 | A | / | 1.13 | 0.71 | 0.72 | — | 1.06 | 1.08 | 0.69 | 1.00 | 1.03 |
|---|---|---|---|---|---|---|---|---|---|---|---|
| 50 | Q | 0.96 | 0.92 | 0.91 | 0.87 | 0.82 | 0.84 | 0.91 | 0.74 | / | 0.91 |
| 51 | A | / | 1.02 | — | 1.19 | 0.74 | 1.04 | 0.06 | — | 0.84 | 4.16 |
| 52 | S | 1.17 | 1.21 | 1.27 | 0.98 | 0.70 | 1.12 | 0.97 | 1.07 | 0.97 | / |
| 53 | R | 0.76 | 0.72 | 0.86 | 0.81 | 0.77 | 0.89 | 0.91 | 0.79 | 0.78 | 0.80 |
| 54 | K | 0.91 | 0.90 | 1.15 | 1.22 | 0.99 | 0.96 | 0.57 | 0.92 | 1.01 | 0.90 |
| 55 | E | 1.37 | 1.37 | — | 1.14 | 1.17 | 1.10 | 1.29 | 1.31 | 0.06 | 1.21 |
| 56 | S | 0.99 | 0.88 | 0.86 | 0.83 | 0.87 | 0.81 | 0.91 | 0.86 | 0.91 | / |
| 89 | Q | 0.90 | — | 0.92 | 1.04 | — | 1.02 | 0.78 | — | / | 0.79 |
| 90 | Q | 0.23 | 0.21 | 0.31 | — | 0.27 | 0.17 | 0.12 | 0.58 | / | 0.36 |
| 91 | Y | 0.06 | 0.26 | 0.20 | 0.17 | 0.10 | 0.13 | 0.06 | 0.14 | — | 0.06 |
| 92 | S | 0.79 | 0.74 | 0.87 | 0.93 | 0.44 | 0.88 | 0.82 | 0.88 | 0.81 | / |
| 93 | D | 1.11 | 1.04 | 1.17 | 1.10 | 0.88 | 0.94 | 1.01 | 0.95 | 1.01 | 0.96 |
| 94 | P | 1.03 | 1.21 | 1.02 | 1.08 | / | 1.09 | 0.69 | 0.68 | — | 1.20 |
| 95 | P | 0.26 | 0.22 | 0.36 | 0.29 | / | 0.23 | 0.17 | 0.31 | 0.30 | 0.33 |
| 96 | L | 1.03 | 1.02 | / | 0.69 | — | 0.96 | — | 0.47 | 0.93 | 0.87 |
| 97 | T | — | 1.18 | 0.56 | 0.80 | 0.68 | 1.12 | 0.54 | 0.58 | 0.68 | 1.23 |

| position | T | D | E | H | K | R | F | W | Y |
|---|---|---|---|---|---|---|---|---|---|
| L chain of anti-FIX(a) antibody was modified ||||||||||
| 24 | 1.50 | 1.54 | 1.81 | 2.06 | / | 2.63 | 0.07 | 1.04 | 1.48 |
| 25 | 2.34 | 0.26 | 0.19 | 0.49 | 0.86 | 0.69 | 2.09 | 1.61 | 0.89 |
| 26 | 2.82 | 2.05 | 2.62 | 3.17 | 3.49 | 4.26 | 3.60 | 2.45 | 3.83 |
| 27 | — | 0.96 | 0.99 | 1.57 | 2.79 | / | 0.80 | 1.16 | 1.15 |
| 28 | 1.83 | 1.35 | 0.07 | 1.84 | 1.22 | 1.20 | 1.42 | 2.72 | 1.75 |
| 29 | 2.97 | 0.07 | 0.07 | 0.94 | 0 92 | 1.13 | 0 69 | 0.98 | 0.89 |
| 30 | 0.07 | 2.74 | / | 1.52 | 1.93 | 1.78 | 3.60 | 3.87 | 3.59 |
| 31 | 0.59 | 0.07 | 0.07 | 0.49 | 1.36 | / | 0.07 | 0.83 | 0.07 |
| 32 | 0.93 | 0.97 | 1.05 | 1.28 | 3.28 | 3.23 | — | 1.00 | 2.03 |
| 33 | 1.96 | 1.01 | 1.29 | 1.15 | 1.01 | 0.31 | 1.30 | 0.07 | 0.68 |
| 34 | 1.98 | 0.07 | 0.07 | 0.07 | 0.07 | 0.07 | 0.07 | 0.07 | 0.07 |
| 50 | 0.07 | 0.96 | 1.05 | 1.23 | 1.43 | 1.71 | 1.06 | 1.16 | 0.07 |
| 51 | 1.26 | 0.25 | 0.07 | 0.77 | — | — | — | — | — |
| 52 | 1.11 | 0.68 | 0.89 | 1.08 | 0.07 | 1.11 | 0.95 | 1.04 | 1.03 |
| 53 | 0.92 | 0.44 | 0.38 | 0.94 | 1.10 | / | 1.45 | 0.97 | 1.05 |
| 54 | 1.09 | 1.01 | 0.91 | 1.21 | / | 1.27 | 1.46 | 1.45 | 1.47 |
| 55 | 1.21 | 1.25 | / | 1.06 | 1.04 | 0.94 | 1.10 | 0.98 | 0.07 |
| 56 | 1.16 | 1.02 | 1.07 | 1.16 | 1.46 | 1.20 | 1.21 | 1.21 | 1.12 |
| 89 | 1.01 | 0.52 | 1.06 | 0.40 | 0 68 | 0.20 | — | 0.94 | 1.08 |
| 90 | 0.53 | — | 0.52 | 1.23 | 0.45 | 0.24 | 0.10 | 0.07 | 0.07 |
| 91 | 0.07 | 0.13 | 0.07 | 0.26 | 0.11 | 0.07 | 0.92 | 0.60 | / |
| 92 | 0.76 | 0.85 | 0.57 | 1.19 | 1.13 | 1.10 | 0.94 | 0.66 | 0.99 |
| 93 | 1.12 | / | 0.84 | 1.14 | 1.28 | 1.53 | 1.33 | 0.96 | 1.32 |
| 94 | 0.21 | 0.07 | 0.07 | 0.44 | 0.10 | 0.12 | 0.12 | 0.07 | 0.29 |
| 95 | 0.90 | 0.84 | 0.82 | 0.80 | 1.91 | 0 82 | 0 44 | 0.53 | 0.36 |
| 96 | 0.99 | 0.44 | 0.07 | 0.91 | 0.63 | 0.31 | 1.10 | 1.17 | 0.07 |
| 97 | / | 0.64 | 0.81 | 0.89 | 0.99 | 0.90 | 0.74 | 0.73 | 0.94 |
| L chain of anti-FX antibody was modified ||||||||||
| 24 | 1.08 | 1.13 | 1.06 | 1.02 | / | 1.02 | — | 1.09 | 1.05 |
| 25 | 1.05 | 0.22 | 0.49 | 0.31 | — | — | 0.34 | 0.32 | — |
| 26 | 1.02 | 1.01 | 0.06 | 1.06 | 1.13 | 1.17 | 0.98 | 1.11 | 0.92 |
| 27 | 1.09 | 0.90 | 1.03 | 1.11 | 1.12 | / | 0.77 | 0.06 | 0.06 |
| 28 | 0.98 | 1.20 | 1.02 | 0.94 | 0.93 | 0.94 | 0.06 | 0.82 | 0.99 |
| 29 | 0.62 | 0.20 | 0.15 | 0.18 | 0.11 | 0.15 | 1.05 | 0.25 | 0.35 |
| 30 | 0.71 | 0.84 | / | 1.23 | 1.29 | 1.37 | 1.13 | 1.09 | 1.00 |
| 31 | 0.81 | 0.70 | 0.80 | 0.83 | 0.92 | / | 0.82 | 0.91 | 0.85 |
| 32 | 0.69 | 0.74 | 0.59 | 0.79 | 1.29 | 1.31 | 0.67 | 0.74 | 0.83 |
| 33 | 1.10 | 0.06 | — | 0.85 | 0.21 | — | 1.16 | 0.40 | 0.30 |
| 34 | 0.82 | 0.38 | 0.98 | 0.88 | 0.06 | 0.06 | 0.53 | 0.29 | 0.42 |
| 50 | 0.82 | 0.82 | 0.85 | 0.93 | 1.29 | 1.34 | 1.01 | 0.91 | 1.04 |
| 51 | 0.94 | 0.78 | 0.86 | 0.88 | — | — | 0.99 | — | — |
| 52 | 1.03 | 1.00 | 0.79 | 1.07 | 0.73 | 1.01 | 1.10 | 0.96 | 0.93 |
| 53 | 0.82 | 0.66 | 0.72 | 0.83 | 1.02 | / | 0.75 | 0.76 | 0.74 |
| 54 | 0.85 | 0.80 | 0.91 | 0.99 | / | 0.90 | 1.02 | 0.81 | 0.98 |
| 55 | 1.13 | 1.03 | / | 1.26 | 1.23 | 1.37 | 1.18 | — | 1.30 |
| 56 | 0.90 | 0.85 | 0.90 | 0.88 | 1.15 | 0.96 | 0.88 | 0.88 | 0.86 |
| 89 | 0.96 | — | 1.00 | 0.77 | 0.93 | 0.06 | — | 0.50 | 0.68 |
| 90 | 0.17 | — | 0.64 | 0.45 | — | 0.46 | — | 0.09 | 0.19 |
| 91 | 0.11 | 0.06 | 0.06 | 0.09 | 0.23 | 0.21 | 0.15 | — | / |
| 92 | 0.80 | 0.90 | 0.86 | 0.98 | 1.20 | 1.14 | 0.90 | 0.93 | 0.82 |
| 93 | 1.13 |  | 1.04 | 1.15 | 1.13 | 1.26 | 1.06 | 1.17 | 1.12 |

TABLE 2-continued

FVIII cofactor function-substituting activity of modified bispecific antibodies
produced by introducing amino acid substitutions into Q499/L404//J327/L404 (ACE910)

| 94 | 0.97 | 0.41 | 0.28 | 1.07 | 0.63 | 0.60 | 0.51 | 0.64 | 1.23 |
| 95 | 0.45 | 0.24 | 0.23 | 0.31 | 0.37 | 0.24 | 0.29 | 0.28 | 0.21 |
| 96 | 1.09 | 0.31 | 0.43 | 0.41 | 0.15 | 0.06 | 0.76 | 0.85 | 0.84 |
| 97 | /    | 0.65 | 0.77 | 0.61 | 1.12 | —    | 0.67 | 0.52 | —    |

[Example 2] Obtaining Novel L Chains that are Compatible with Each H Chain of ACE910

As indicated in Example 1, FVIII cofactor function-substituting activity was able to be improved by comprehensively modifying amino acids in L404, which is the commonly shared L chain of ACE910. As another method of improving the FVIII cofactor function-substituting activity of ACE910, a conceivable method is that of obtaining from human antibody libraries novel L chains having sequences completely different from that of the commonly shared L chain, which are to be paired with the respective H chains of the anti-FIX (a) antibody and the anti-FX antibody (Q499 and J327).

With reference to methods known to those skilled in the art, specifically the method of *Biochemical and Biophysical Research Communications*, (2000), 275, 2:553-557 and such, the present inventors newly produced a library of antibodies in which the L chain portion of the ACE910 antibody has been substituted with that from a human L chain library, then performed panning operations on biotinylated human FIXa or biotinylated human FX, and thereby succeeded in obtaining antibodies comprising novel L chains and having FVIII cofactor function-substituting activity.

As a result, for bispecific antibodies having FVIII cofactor function-substituting activity, the followings were discovered as the anti-human FIX (a) antibody L chains: QNK131 (heavy chain SEQ ID NO: 45 and light chain SEQ ID NO: 13), QNK284 (heavy chain SEQ ID NO: 45 and light chain SEQ ID NO: 14), QNK315 (heavy chain SEQ ID NO: 45 and light chain SEQ ID NO: 15), QNL182 (heavy chain SEQ ID NO: 45 and light chain SEQ ID NO: 16), QNL492 (heavy chain SEQ ID NO: 45 and light chain SEQ ID NO: 17), and QNL576 (heavy chain SEQ ID NO: 45 and light chain SEQ ID NO: 18); and, as the anti-human FX antibody L chains: JNK131 (heavy chain SEQ ID NO: 46 and light chain SEQ ID NO: 19), JNK163 (heavy chain SEQ ID NO: 46 and light chain SEQ ID NO: 20), JNK252 (heavy chain SEQ ID NO: 46 and light chain SEQ ID NO: 21), JNK263 (heavy chain SEQ ID NO: 46 and light chain SEQ ID NO: 22), JNK339 (heavy chain SEQ ID NO: 46 and light chain SEQ ID NO: 23), JNK348 (heavy chain SEQ ID NO: 46 and light chain SEQ ID NO: 24), JNK351 (heavy chain SEQ ID NO: 46 and light chain SEQ ID NO: 25), JNK360 (heavy chain SEQ ID NO: 46 and light chain SEQ ID NO: 26), JNK378 (heavy chain SEQ ID NO: 46 and light chain SEQ ID NO: 27), JNK382 (heavy chain SEQ ID NO: 46 and light chain SEQ ID NO: 28), JNL036 (heavy chain SEQ ID NO: 46 and light chain SEQ ID NO: 29), JNL072 (heavy chain SEQ ID NO: 46 and light chain SEQ ID NO: 30), JNL095 (heavy chain SEQ ID NO: 46 and light chain SEQ ID NO: 31), JNL176 (heavy chain SEQ ID NO: 46 and light chain SEQ ID NO: 32), JNL208 (heavy chain SEQ ID NO: 46 and light chain SEQ ID NO: 33), JNL224 (heavy chain SEQ ID NO: 46 and light chain SEQ ID NO: 34), JNL260 (heavy chain SEQ ID NO: 46 and light chain SEQ ID NO: 35), JNL056 (heavy chain SEQ ID NO: 46 and light chain SEQ ID NO: 36), JNL059 (heavy chain SEQ ID NO: 46 and light chain SEQ ID NO: 37), JNL226 (heavy chain SEQ ID NO: 46 and light chain SEQ ID NO: 38), JNL250 (heavy chain SEQ ID NO: 46 and light chain SEQ ID NO: 39), JNL263 (heavy chain SEQ ID NO: 46 and light chain SEQ ID NO: 40), and JNL281 (heavy chain SEQ ID NO: 46 and light chain SEQ ID NO: 41).

Various bispecific antibodies comprising these novel L chains were expressed and purified by methods known to those skilled in the art. The prepared antibodies are shown in Table 3 (clone names, heavy chain SEQ ID NOs, and anti-FIX (a) light chain SEQ ID NOs or the anti-FX light chain SEQ ID NOs are shown). The novel L chain was used for only one arm and L404 which is the commonly shared L chain of ACE910 was used for the other arm. The results of measuring the FVIII cofactor function-substituting activities of the various purified 10 bispecific antibodies are shown in FIG. 1. All of the novel L chain-comprising bispecific antibodies were confirmed to have FVIII cofactor function-substituting activity.

TABLE 3

Prepared bispecific antibodies having novel L chains

| Clone name | Heavy chain SEQ ID NO | Light chain SEQ ID NO |
|---|---|---|
| QNK131 | 45 | 13 |
| QNK284 | 45 | 14 |
| QNK315 | 45 | 15 |
| QNL182 | 45 | 16 |
| QNL492 | 45 | 17 |
| QNL576 | 45 | 18 |
| JNK131 | 46 | 19 |
| JNK163 | 46 | 20 |
| JNK252 | 46 | 21 |
| JNK263 | 46 | 22 |
| JNK339 | 46 | 23 |
| JNK348 | 46 | 24 |
| JNK351 | 46 | 25 |
| JNK360 | 46 | 26 |
| JNK378 | 46 | 27 |
| JNK382 | 46 | 28 |
| JNL036 | 46 | 29 |
| JNL072 | 46 | 30 |
| JNL095 | 46 | 31 |
| JNL176 | 46 | 32 |
| JNL208 | 46 | 33 |
| JNL224 | 46 | 34 |
| JNL260 | 46 | 35 |
| JNL056 | 46 | 36 |
| JNL059 | 46 | 37 |
| JNL226 | 46 | 38 |
| JNL250 | 46 | 39 |
| JNL263 | 46 | 40 |
| JNL281 | 46 | 41 |

Figure 2:
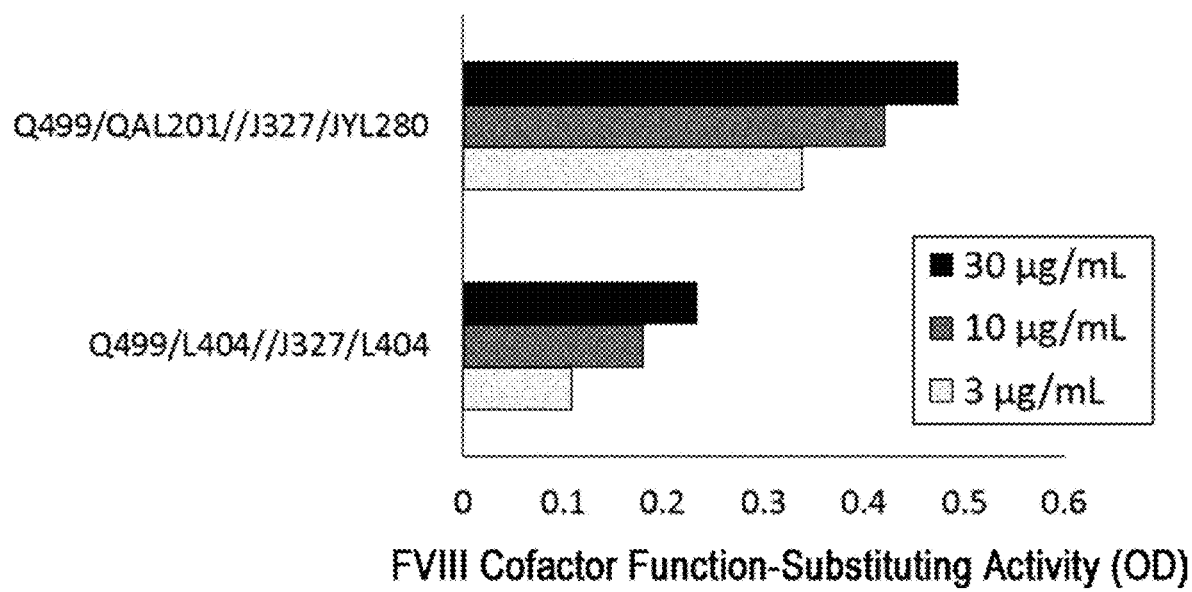
FIG. 2 shows a graph presenting the FVIII cofactor function-substituting activities of Q499/QAL201//J327/JYL280 and Q499/L404//J327/L404.

[Example 3] Production of Variants of the Novel L Chain-Comprising Bispecific Antibodies To improve the FVIII cofactor function-substituting activity of novel L chain-comprising bispecific antibodies obtained in Example 2, amino acid substitution modifications were introduced into QNK131 (light chain SEQ ID NO: 13) which is a novel L chain of an anti-FIX (a) antibody, to obtain QAL187 (light chain SEQ ID NO: 42) and QAL201 (light chain SEQ ID NO: 43). Similarly, amino acid substitution modifications were introduced into JNL095 (light chain SEQ ID NO: 31) which is a novel L chain of an anti-FX antibody, to obtain JYL280 (light chain SEQ ID NO: 44). In one example, a bispecific antibody (Q499/QAL201//J327/JYL280) composed of an anti-FIX (a) antibody comprising heavy chain Q499 and light chain QAL201 and an anti-FX antibody comprising heavy chain J327 and light chain JYL280 was expressed and purified by a method known to those skilled in the art, and the result of measuring its FVIII cofactor function-substituting activity is shown in FIG. 2.

[Example 4] Production of Variants of the H Chain of the Novel L Chain-Comprising Bispecific Antibodies Using novel L chains (QAL187 for the anti-FIX (a) antibody, and JYL280 for the anti-FX antibody) with improved FVIII cofactor function-substituting activities, the inventors comprehensively introduced amino acid mutations to Q499 and J327, and performed large-scale screening of FVIII cofactor function-substituting activity to discover amino acid substitutions that improve the FVIII cofactor function-substituting activity.

The heavy chain and light chain of the anti-FIX (a) antibody side were fixed to Q499 and QAL201, respectively, and the light chain of the anti-FX antibody side was fixed to JYL280 to produce substitution variants in which all amino acids in CDRs of J327 have been modified to amino acids other than cysteine. The heavy chain and light chain of the anti-FX antibody side were fixed to J327 and JYL280, respectively, and the light chain of the anti-FIX (a) antibody side was fixed to QAL187 to produce substitution variants in which all amino acids in CDRs of Q499 have been modified to all amino acids other than cysteine. Expression and purification of the bispecific antibodies were carried out by methods known to those skilled in the art.

FVIII cofactor function-substituting activities were evaluated by methods known to those skilled in the art by using the various purified bispecific antibodies.

As a result, several amino acid substitutions indicated in Table 4 below were found to be able to improve the FVIII cofactor function-substituting activity as compared with the parent bispecific antibody Q499/QAL187//J327/JYL280 or Q499/QAL201//J327/JYL280. Table 4 shows the mutated positions indicated by Kabat numbering (the number in the "position" column on the far left), the amino acids in the parent antibody (amino acids (one letter code) in the second column from the left), amino acids after the mutation (amino acids (one letter code) in the uppermost row), and the specific activity (each numerical value in the table) relative to ACE910 (purified antibody). In Table 4, (–) indicates that the expression level of the antibody was low, and "/" indicates that the antibody was not produced since the shown amino acid is the same as that of the parent antibody.

TABLE 4

| position | mutation | A | I | L | M | P | V | G | N | Q | S |
|---|---|---|---|---|---|---|---|---|---|---|---|
| FVIII cofactor function-substituting activity of modified bispecific antibodies produced by introducing amino acid substitutions into Q499 of Q499/QAL187//J327/JYL280 | | | | | | | | | | | |
| 31 | Y | 0.4 | 0.0 | — | — | 0.0 | 0.0 | 0.0 | 0.0 | — | 1.0 |
| 32 | Y | 0.6 | 1.3 | 0.0 | 0.0 | 0.0 | 1.5 | — | 1.4 | 2.0 | 0.0 |
| 33 | D | — | — | — | 0.0 | — | 0.1 | — | 0.0 | — | — |
| 34 | I | 1.2 | / | 10.7 | 8.9 | 0.0 | 0.0 | 2.4 | — | 8.0 | 0.2 |
| 35 | Q | 0.4 | 4.6 | 76.2 | — | 39.0 | 45.7 | 73.9 | 0.0 | / | 22.8 |
| 50 | S | 5.4 | 1.0 | 0.9 | 4.1 | 0.0 | — | 2.8 | 6.0 | 0.0 | / |
| 51 | I | 0.0 | / | — | 0.0 | 0.0 | 2.3 | 0.0 | 0.0 | — | 0.3 |
| 52 | S | 1.1 | 4.8 | 0.0 | 0.0 | 0.0 | 3.8 | 1.0 | 9.9 | 8.1 | / |
| 52a | P | 0.4 | — | 0.7 | — | / | 0.1 | 4.9 | 0.0 | 1.6 | 0.0 |
| 53 | S | 0.9 | 0.1 | 0.3 | 0.0 | 0.0 | 0.0 | 1.3 | 0.0 | 0.0 | / |
| 54 | G | 1.3 | 0.0 | 0.0 | — | 0.0 | 0.0 | / | 0.0 | 0.1 | 1.2 |
| 55 | Q | 0.0 | 0.0 | — | 0.0 | 0.0 | 0.2 | 3.9 | 0.0 | / | — |
| 56 | S | — | 0.0 | 1.9 | 13.1 | 0.2 | 0.0 | 3.2 | 0.0 | — | / |
| 57 | T | 2.7 | 2.1 | 3.0 | 3.1 | 0.2 | 1.7 | — | 0.9 | 3.8 | 2.6 |
| 58 | Y | — | 1.7 | 1.9 | 0.4 | — | 1.1 | 0.2 | 5.0 | 0.6 | 0.6 |
| 59 | Y | 0.0 | 0.5 | — | 1.0 | 0.0 | 1.0 | 0.0 | 0.1 | — | — |
| 60 | R | 3.7 | 4.1 | 3.4 | 3.9 | 1.2 | 3.4 | 2.8 | — | 4.1 | 3.5 |
| 61 | R | 1.8 | 1.5 | 1.5 | 1.6 | 1.7 | 1.6 | 2.0 | 2.1 | 2.2 | 0.0 |
| 62 | E | 3.3 | 1.1 | 1.8 | 1.3 | 3.4 | 1.4 | 4.2 | 4.8 | 4.4 | 5.2 |
| 63 | V | 2.9 | 2.5 | 3.1 | 1.3 | 1.0 | / | 0.1 | 0.5 | 0.1 | 0.4 |
| 64 | K | 1.2 | 1.5 | 1.3 | 1.2 | 0.0 | 1.1 | 1.1 | 1.0 | 1.2 | 1.3 |
| 65 | G | 2.1 | 4.4 | 3.0 | 2.9 | 0.2 | 1.2 | / | 3.5 | 20.4 | 2.3 |
| 95 | R | 0.0 | 0.4 | 0.0 | — | 0.1 | 0.2 | 0.0 | 0.0 | 1.1 | 0.0 |
| 96 | T | 5.5 | 0.5 | 0.4 | 1.6 | 0.1 | 1.3 | — | 3.3 | 15.0 | 15.0 |
| 97 | G | — | 0.1 | 0.0 | 0.3 | 3.1 | 0.4 | / | 1.4 | 0.7 | 2.1 |
| 98 | R | 4.5 | 9.0 | 9.5 | 5.8 | 2.2 | 4.1 | 5.7 | 7.7 | 7.6 | 5.7 |
| 99 | E | 3.4 | 10.4 | 7.0 | 5.5 | 5.8 | 7.0 | 1.7 | 3.0 | 4.3 | 4.0 |
| 100 | Y | 1.6 | 5.0 | 1.6 | 3.3 | 2.7 | 3.4 | 1.2 | 3.2 | 1.5 | 1.3 |
| 100a | G | 3.4 | 1.1 | 5.1 | 5.8 | 0.4 | 0.6 | / | 2.7 | — | 1.7 |
| 100b | G | 5.3 | 1.0 | 0.4 | 0.4 | 0.8 | 0.9 | / | 1.1 | 1.0 | 2.3 |
| 100c | G | 0.2 | 0.0 | 0.0 | 0.0 | 0.1 | 0.0 | / | 1.1 | 0.0 | 0.4 |
| 100d | W | 0.0 | 0.5 | 0.3 | 0.3 | 0.3 | 0.6 | 0.0 | 0.0 | 0.0 | 0.1 |

TABLE 4-continued

| position | mutation | A | I | L | M | P | V | G | N | Q | S |
|---|---|---|---|---|---|---|---|---|---|---|---|
| 100e | Y | 3.1 | 4.5 | 3.7 | 3.0 | 0.4 | 4.9 | 1.0 | 5.1 | 3.2 | 3.8 |
| 100f | F | 11.7 | 24.9 | 7.6 | 8.6 | 7.8 | 23.2 | — | 18.6 | 6.3 | 8.0 |
| 101 | D | 3.2 | 4.1 | 2.1 | 1.8 | 8.6 | 3.9 | 2.3 | 3.2 | 2.6 | 3.1 |
| 102 | Y | 4.4 | 4.1 | 4.6 | 4.1 | 4.6 | 5.8 | 6.3 | 4.3 | 4.3 | 2.6 |
| FVIII cofactor function-substituting activity of modified bispecific antibodies produced by introducing amino acid substitutions into J327 of Q499/QAL201//J327/JYL280 | | | | | | | | | | | |
| 31 | D | — | 8.9 | 13.0 | 14.2 | — | 11.0 | 15.5 | 14.7 | 14.6 | 15.3 |
| 32 | N | 10.7 | 0.4 | 0.8 | 5.6 | 0.3 | 1.9 | 3.3 | / | 4.1 | 12.5 |
| 33 | N | 0.4 | 1.8 | 2.8 | 1.7 | 0.0 | 1.2 | 1.2 | / | 1.8 | 3.4 |
| 34 | M | 2.6 | 11.0 | 12.1 | / | — | 12.4 | — | — | — | — |
| 35 | D | 3.4 | 4.2 | 3.1 | 6.6 | — | 5.0 | 3.5 | 13.1 | 11.4 | 5.0 |
| 50 | D | 3.1 | 0.3 | 0.2 | 0.5 | — | 2.4 | 1.2 | 4.1 | 1.8 | 3.9 |
| 51 | I | 10.2 | / | 10.3 | 10.2 | — | 12.8 | 1.6 | — | 9.5 | 11.5 |
| 52 | N | 1.8 | 0.1 | 0.1 | 0.1 | 0.1 | 0.1 | 0.6 | / | 0.7 | 2.9 |
| 52a | T | 6.0 | 7.7 | 4.2 | 3.9 | 7.2 | 9.0 | 3.2 | — | 0.9 | 11.9 |
| 53 | R | 3.7 | 7.4 | 5.0 | 5.3 | 3.0 | 6.9 | 3.9 | 12.4 | 6.0 | 3.8 |
| 54 | S | 12.8 | 4.3 | 3.6 | 6.2 | 0.1 | 8.0 | 10.8 | 5.3 | 5.4 | / |
| 55 | G | 11.0 | 6.2 | 8.3 | 8.7 | 3.1 | 8.0 | / | 2.7 | 11.0 | 12.1 |
| 56 | G | 8.3 | 11.2 | 11.4 | 11.6 | — | 8.8 | / | 11.3 | 13.3 | 13.3 |
| 57 | S | 11.9 | 10.9 | 6.5 | 12.2 | 12.1 | 12.9 | 13.7 | 10.6 | 12.9 | / |
| 58 | I | 5.8 | / | 7.7 | 3.9 | — | 3.7 | 1.3 | 6.3 | 7.2 | 2.7 |
| 59 | Y | 3.2 | 11.8 | 5.9 | 3.7 | 0.4 | 1.3 | 1.7 | 5.9 | 7.8 | 7.2 |
| 60 | N | 11.0 | 9.0 | 10.4 | 10.2 | 5.0 | 9.6 | 5.2 | / | 6.1 | 2.2 |
| 61 | E | 17.6 | 12.5 | 10.8 | 6.4 | 6.8 | 2.3 | 7.5 | 2.6 | 11.1 | 12.0 |
| 62 | E | 9.5 | 9.9 | 10.6 | 11.1 | 9.3 | 11.6 | 13.6 | 13.0 | 15.2 | 4.2 |
| 63 | F | 12.5 | 11.3 | 6.3 | 12.1 | — | 12,2 | 13.1 | 12.6 | 10.2 | 12.3 |
| 64 | Q | 16.2 | 14.7 | 11.8 | 16.0 | 9.7 | 14.8 | 15.0 | 15.0 | / | 15.8 |
| 65 | D | 14.3 | — | 12.6 | 15.5 | 16.1 | — | 11.5 | 15.0 | 15.4 | 15.6 |
| 95 | R | 0.2 | 0.6 | 1.6 | 1.0 | 0.7 | 1.0 | 0.1 | 0.0 | 0.8 | 0.1 |
| 96 | K | 3.0 | 2.0 | 1.8 | 4.3 | 0.0 | 3.6 | 1.1 | 1.0 | 2.3 | 1.2 |
| 97 | S | 14.8 | 2.2 | 1.6 | 5.2 | 1.4 | 3.7 | 10.2 | 5.4 | 6.5 | / |
| 98 | Y | 2.2 | 1.1 | 1.9 | 7.3 | 0.1 | 1.4 | 1.4 | 1.3 | 1.9 | 1.9 |
| 99 | G | 4.6 | — | — | 5.2 | 0.0 | 0.5 | / | 7.6 | 7.6 | 6.8 |
| 100 | Y | 12.6 | 8.3 | 14.5 | 10.8 | 6.2 | 10.9 | 9.3 | 12.6 | 12.9 | 12.0 |
| 100a | Y | 5.9 | 2.7 | 5.7 | 3.5 | 1.3 | 7.0 | 2.8 | 8.9 | 3.9 | 7.1 |
| 100b | L | 4.1 | 10.6 | / | 12.9 | 0.6 | 7.2 | 0.0 | 4.8 | 3.9 | 1.9 |
| 101 | D | 6.5 | 5.2 | 5.4 | 5.3 | 6.7 | 6.8 | 6.7 | 6.7 | 7.0 | 6.8 |
| 102 | E | 12.1 | 11.7 | 10.8 | 11.7 | 6.9 | 13.3 | 12.6 | 11.2 | 11.3 | 9.4 |

| position | T | D | E | H | K | R | F | W | Y |
|---|---|---|---|---|---|---|---|---|---|
| FVIII cofactor function-substituting activity of modified bispecific antibodies produced by introducing amino acid substitutions into Q499 of Q499/QAL187//J327/JYL280 | | | | | | | | | |
| 31 | 0.0 | 0.0 | 0.0 | 3.5 | 0.0 | 0.0 | 0.0 | 10.0 | / |
| 32 | 6.2 | 2.2 | 0.1 | 0.9 | 1.2 | 0.0 | 6.1 | 0.6 | / |
| 33 | 0.2 | / | 0.1 | — | — | — | — | — | — |
| 34 | 2.9 | 0.2 | 1.5 | 0.0 | 1.1 | 0.0 | 41.8 | 13.2 | 0.0 |
| 35 | 56.0 | 0.0 | 0.1 | 0.1 | 1.4 | 0.0 | 0.5 | 0.0 | 0.1 |
| 50 | 0.0 | 3.3 | 0.0 | — | 0.2 | 0.0 | 1.2 | 3.3 | 1.3 |
| 51 | 0.0 | 0.0 | — | — | 0.0 | 0.0 | — | 0.0 | 0.0 |
| 52 | — | 13.1 | 0.0 | 34.0 | 0.1 | — | 26.0 | 8.2 | 2.0 |
| 52a | 0.0 | 0.0 | 0.3 | 0.0 | — | 0.0 | 0.0 | 0.1 | 1.3 |
| 53 | 1.4 | 0.1 | 0.0 | 1.3 | 0.0 | 0.2 | 0.3 | 0.0 | 0.2 |
| 54 | — | 0.0 | 0.0 | — | 0.0 | — | — | 0.0 | 0.1 |
| 55 | 0.0 | — | 0.0 | 4.1 | — | 7.4 | 0.0 | 0.0 | 0.0 |
| 56 | 0.2 | 1.1 | 0.6 | 6.2 | 0.8 | 1.9 | 0.0 | — | 25.8 |
| 57 | / | 0.2 | 1.6 | 1.9 | 4.2 | 0.7 | 2.3 | 1.5 | 2.0 |
| 58 | 14.7 | 3.8 | — | 3.8 | 3.6 | 0.2 | 4.5 | 1.5 | / |
| 59 | — | 0.0 | 1.5 | — | 0.0 | 0.0 | 1.0 | 0.4 | / |
| 60 | 2.3 | — | — | 4.1 | 3.7 | / | 4.0 | 0.0 | — |
| 61 | 1.9 | 1.1 | 0.7 | 3.7 | — | / | 1.7 | 1.1 | — |
| 62 | 4.5 | 6.0 | / | 3.0 | 3.0 | 0.0 | — | 1.6 | 0.0 |
| 63 | 1.1 | 0.5 | 0.1 | 3.5 | 0.1 | 0.0 | 4.0 | 0.5 | 6.6 |
| 64 | 1.1 | 0.4 | 0.4 | 1.2 | / | 4.8 | 0.0 | 0.8 | 1.1 |
| 65 | 3.1 | 3.8 | 2.5 | 4.1 | 1.4 | 2.7 | 2.5 | 3.5 | 3.3 |
| 95 | 0.1 | — | — | — | 1.2 | / | 0.0 | 0.0 | 0.0 |
| 96 | / | 4.2 | 1.5 | 1.6 | 0.5 | 0.3 | 1.3 | 2.1 | 2.6 |
| 97 | 0.4 | 11.6 | 1.8 | 1.2 | 0.2 | 0.1 | 1.0 | 1.9 | 1.1 |
| 98 | 8.1 | 3.7 | 4.1 | 5.8 | 4.0 | / | 5.8 | 3.9 | 8.2 |
| 99 | 4.8 | 3.4 | / | 4.2 | 2.2 | 2.0 | 3.3 | 1.8 | 3.6 |
| 100 | 1.6 | 3.0 | 1.5 | 3.2 | 1.9 | 2.2 | 2.1 | 3.6 | / |
| 100a | 1.0 | 2.6 | 0.9 | 2.5 | 6.5 | 7.1 | 2.1 | 2.0 | 2.7 |
| 100b | 1.1 | 1.4 | 1.2 | 0.6 | — | 0.2 | 0.0 | 0.0 | 0.2 |
| 100c | 0.0 | 0.0 | 0.0 | 0.0 | — | 0.0 | 0.0 | 0.0 | 0.0 |
| 100d | 0.1 | 0.0 | 0.0 | 1.4 | 0.0 | 0.0 | 10.3 | / | 3.6 |

TABLE 4-continued

| position | mutation | A | I | L | M | P | V | G | N | Q | S |
|---|---|---|---|---|---|---|---|---|---|---|---|
| | 100e | | 5.2 | 1.7 | 1.5 | 9.4 | 1.1 | — | 3.1 | 1.5 | / |
| | 100f | | 11.3 | 1.3 | 2.0 | 0.7 | 0.0 | 0.6 | / | 0.1 | 0.7 |
| | 101 | | 2.9 | / | 2.7 | 2.4 | 2.3 | 2.5 | 2.1 | 3.0 | 2.5 |
| | 102 | | 5.9 | 8.6 | 6.5 | 4.6 | 3.6 | 3.2 | 3.9 | 3.5 | / |
| | FVIII cofactor function-substituting activity of modified bispecific antibodies produced by introducing amino acid substitutions into J327 of Q499/QAL201//J327/JYL280 | | | | | | | | | | |
| | 31 | 12.5 | / | 14.0 | 17.4 | 12.6 | 11.2 | 13.7 | 13.3 | 13.6 | |
| | 32 | 4.2 | 0.2 | 0.8 | 5.2 | 3.1 | 3.5 | 4.4 | 1.5 | 4.3 | |
| | 33 | 0.1 | 0.2 | 0.0 | 0.0 | 1.5 | 0.1 | 0.0 | 0.2 | 0.0 | |
| | 34 | 1.6 | — | — | 7.8 | — | — | 7.4 | 1.3 | 3.4 | |
| | 35 | 0.3 | / | 11.4 | 6.0 | — | — | 3.5 | 4.8 | 2.3 | |
| | 50 | 1.7 | / | 1.3 | 0.1 | 0.1 | 0.0 | 0.6 | 0.0 | 0.1 | |
| | 51 | 12.7 | 0.6 | 0.7 | — | 3.1 | 0.1 | 4.8 | 0.7 | 4.7 | |
| | 52 | 0.0 | 0.1 | 0.5 | 3.5 | 0.0 | 0.1 | 0.1 | 0.0 | 0.0 | |
| | 52a | / | 0.1 | 0.0 | 1.0 | 0.3 | 0.1 | 1.5 | 4.0 | 0.7 | |
| | 53 | 0.3 | 1.4 | 1.9 | 7.2 | 9.8 | / | 7.4 | 8.9 | 5.8 | |
| | 54 | 6.3 | 2.7 | 1.1 | 5.8 | 3.1 | 4.7 | 10.1 | 16.0 | 12.2 | |
| | 55 | 9.2 | 4.1 | 6.6 | 10.4 | 7.0 | 7.9 | 7.6 | 7.3 | 6.7 | |
| | 56 | 13.8 | 4.6 | 3.2 | 8.4 | 10.2 | 12.3 | 10.4 | 13.7 | 10.3 | |
| | 57 | 10.9 | 6.9 | 0.7 | 2.5 | 0.1 | 0.3 | 0.8 | 3.0 | 0.1 | |
| | 58 | 11.3 | 0.1 | 4.8 | 2.7 | 3.3 | 7.5 | 4.2 | 4.8 | 2.6 | 5.5 |
| | 59 | 9.4 | 6.7 | 6.0 | 12.7 | 4.0 | 3.2 | 4.9 | 6.6 | / | |
| | 60 | 1.1 | 10.7 | 4.4 | 2.2 | 4.6 | 10.1 | 9.8 | 10.0 | 11.7 | |
| | 61 | 7.9 | 3.6 | / | 5.3 | 9.6 | 6.9 | 8.1 | 7.7 | 6.9 | |
| | 62 | 2.9 | — | / | 9.3 | 9.8 | 12.6 | 10.0 | 13.7 | 10.9 | |
| | 63 | — | 11.3 | 6.3 | 15.9 | 7.8 | 6.2 | / | 16.7 | 16.3 | |
| | 64 | 15.3 | 14.4 | 16.2 | 13.7 | 14.2 | 12.4 | 15.7 | 13.9 | 15.5 | |
| | 65 | 14.9 | / | 14.2 | 14.8 | 12.9 | 14.5 | 14.9 | 12.4 | 14.8 | |
| | 95 | 0.2 | 0.0 | — | 1.2 | 5.7 | / | 0.0 | 0.4 | 0.3 | |
| | 96 | 1.7 | 0.0 | 1.0 | 1.7 | / | 15.7 | 1.9 | 1.9 | 1.4 | |
| | 97 | 7.6 | 2.9 | 3.9 | 7.2 | 3.5 | — | 3.2 | 1.5 | 3.2 | |
| | 98 | 1.0 | 0.2 | 0.2 | 8.8 | 1.5 | 7.9 | 6.9 | 4.2 | / | |
| | 99 | 1.7 | 8.8 | 3.7 | 6.1 | 5.7 | 7.2 | 6.3 | 3.7 | 4.0 | |
| | 100 | 11.5 | 10.9 | 7.8 | 12.0 | 12.8 | 12.2 | 13.9 | 6.5 | / | |
| | 100a | 7.7 | 3.3 | 3.9 | 14.7 | 2.4 | 6.7 | 13.4 | 11.6 | / | |
| | 100b | 3.1 | 1.5 | 0.3 | 8.0 | 0.8 | 0.2 | 14.8 | 6.2 | 11.2 | |
| | 101 | 6.2 | / | 7.0 | 3.4 | 4.4 | 4.1 | — | — | — | |
| | 102 | 10.2 | 12.5 | / | 10.3 | 10.9 | 10.5 | 10.5 | 12.7 | 12.9 | |

INDUSTRIAL APPLICABILITY

Light chain amino acid substitutions that improve the FVIII cofactor function-substituting activity of ACE910 (Emicizumab), novel light chains showing FVIII cofactor function-substituting activity, and heavy chain amino acid substitutions that improve the FVIII cofactor function-substituting activity of novel light chain-comprising bispecific antibodies were found by the present invention. These amino acid substitutions and novel light chains are useful for producing bispecific antibodies having FVIII cofactor function-substituting activities that are superior to that of ACE910 (Emicizumab).

The invention claimed is:

1. A bispecific antibody that recognizes (i) FIX and/or FIXa; and (ii) FX, the bispecific antibody comprising:
   a first polypeptide comprising an antibody heavy chain variable domain comprising the amino acid sequence of SEQ ID NO: 45,
   a second polypeptide comprising an antibody heavy chain variable domain comprising the amino acid sequence of SEQ ID NO: 46,
   a third polypeptide comprising an antibody light chain variable domain comprising the amino acid sequence of SEQ ID NO:47, and
   a fourth polypeptide comprising an antibody light chain variable domain comprising either (a) or (b):
      (a) the light chain CDR 1, 2, and 3 amino acid sequences of SEQ ID NOs: 7, 8, and 9, respectively, comprising one amino acid substitution in one of SEQ ID NOs: 7, 8 and 9; or
      (b) the amino acid sequence of SEQ ID NO:47 comprising one amino acid substitution;
   wherein either:
      (1) the first polypeptide and the third polypeptide form a pair, and the second polypeptide and the fourth polypeptide form a pair, and the amino acid substitution of (a) or (b) is at a position selected from the following group of Kabat numbering positions, and is a substitution with one of the amino acids listed for that position:
   K24: A, I, L, M, V, Q, S, T, D, E, H, R, W, or Y;
   A25: S, or T;
   S26: A, L, P, G, N, Q, T, D, H, K, R, or W;
   R27: M, V, N, Q, T, E, H, or K;
   N28: A, I, L, M, P, V, S, D, or E;
   I29: F;
   E30: A, I, L, M, V, N, H, K, R, F, W, or Y;
   Q32: M, G, S, K, or R;
   L33: A, M, N, T, or F;
   A34: I, V, G, Q, or S;
   Q50: K, R, F, or Y;
   A51: I, M, V, or S;
   S52: A, I, L, V, N, T, D, H, R, or F;
   R53: K;
   K54: L, M, Q, or F;
   E55: A, I, M, P, V, G, N, S, T, D, H, K, R, F, or Y;
   S56: K;
   Q89: M, V, or E;
   S92: K or R;
   D93: A, I, L, M, G, Q, T, E, H, K, R, F, W, or Y;
   P94: A, I, L, M, V, S, H, or Y;
   L96: A, I, or; and
   T97: I, V, S, or K; or
      (2) the first polypeptide and fourth polypeptide form a pair, and the second polypeptide and third polypeptide form a pair, and the amino acid substitution of (a) or (b) is at a position selected from the following group of Kabat numbering positions, and is a substitution with one of the amino acids listed for that position:
   K24: A, I, L, M, V, G, N, Q, S, T, D, E, H, R, W, or Y;
   A25: I, L, M, P, V, G, N, S, T, F, or W;
   S26: A, I, L, M, P, V, G, N, Q, T, D, E, H, K, R, F, W, or Y;
   R27: A, L, M, V, G, N, Q, S, H, K, W, or Y;
   N28: A, I, M, P, V, G, Q, S, T, D, H, K, R, F, W, or Y;
   I29: A, L, M, P, V, G, N, Q, S, T, or R;
   E30: A, I, M, P, V, G, N, Q, S, D, H, K, R, F, W, or Y;
   R31: Q, S, or K;
   Q32: A, L, M, V, G, N, S, E, H, K, R, W, or Y;
   L33: A, I, M, V, N, Q, S, T, D, E, H, K, or F;
   A34: I, V, G, S, or T;
   Q50: A, I, L, M, V, G, S, E, H, K, R, F, or W;
   A51: G, S, or T;
   S52: V, G, Q, T, H, R, W, or Y;
   R53: I, L, M, K, F, or Y;
   K54: A, I, L, M, P, V, G, Q, S, T, D, H, R, F, W, or Y;
   E55: A, I, L, M, P, V, G, N, T, D, H, K, or F;
   S56: A, I, L, M, P, V, G, N, Q, T, D, E, H, K, R, F, W, or Y;
   Q89: A, S, T, E, or Y;
   Q90: H;
   S92: I, N, H, K, or R;
   D93: L, M, V, N, Q, S, T, H, K, R, F, or Y;
   P95: G or K;
   L96: A, M, P, G, N, Q, S, F, or W; and
   T97: I, G, Q, or S.

2. A bispecific antibody that recognizes (i) FIX and/or FIXa, and (ii) FX, the bispecific antibody comprising:
   a first polypeptide comprising an antibody heavy chain variable domain comprising the amino acid sequence of SEQ ID NO: 45,
   a second polypeptide comprising an antibody heavy chain variable domain comprising either (a) or (b):
      (a) the heavy chain CDR 1, 2, and 3 amino acid sequences of SEQ ID NOs: 4, 5, and 6, respectively, comprising one amino acid substitution in one of SEQ ID NOs 4, 5, and 6; or
      (b) the amino acid sequence of SEQ ID NO:46 comprising one amino acid substitution;
   wherein the amino acid substitution of (a) or (b) is at a position selected from the following group of Kabat numbering positions, and is a substitution with one of the amino acids listed for that position below:
   D31: I, L, M, V, G, N, Q, S, T, E, H, K, R, F, W, or Y;
   N32: A, M, V, G, Q, S, T, H, K, R, F, W, or Y;
   N33: I, L, M, V, G, Q, S, or K;
   M34: A, I, L, V, T, H, F, W, or Y;
   D35: A, I, L, M, V, G, N, Q, S, E, H, F, W, or Y;
   D50: A, V, G, N, Q, S, T, or E;
   I51: A, L, M, V, G, Q, S, T, K, F, or Y;
   N52: A, S, or H;

T52a: A, I, L, M, P, V, G, S, F, or W;
R53: A, I, L, M, P, V, G, N, Q, S, D, E, H, K, F, W, or Y;
S54: A, I, L, M, V, G, N, Q, T, D, E, H, K, R, F, W, or Y;
G55: A, I, L, M, P, V, N, Q, S, T, D, E, H, K, R, F, W, or Y;
G56: A, I, L, M, V, N, Q, S, T, D, E, H, K, R, F, W, or Y;
S57: A, I, L, M, P, V, G, N, Q, T, D, H, or W;
I58: A, L, M, V, G, N, Q, S, T, E, H, K, R, F, W, or Y;
Y59: A, I, L, M, V, G, N, Q, S, T, D, E, H, K, R, F, or W N60: A, I, L, M, P, V, G, Q, S, T, D, E, H, K, R, F, W, or Y;
E61: A, I, L, M, P, V, G, N, Q, S, T, D, H, K, R, F, W, or Y;
E62: A, I, L, M, P, V, G, N, Q, S, T, H, K, R, F, W, or Y;
F63: A, I, L, M, V, G, N, Q, S, D, E, H, K, R, W, or Y;
Q64: A, I, L, M, P, V, G, N, S, T, D, E, H, K, R, F, W, or Y;
D65: A, L, M, P, G, N, Q, S, T, E, H, K, R, F, W, or Y;
R95: L, M, V, H, or K;
K96: A, I, L, M, V, G, N, Q, S, T, H, R, F, W, or Y;
S97: A, I, L, M, P, V, G, N, Q, T, D, E, H, K, F, W, or Y;
Y98: A, I, L, M, V, G, N, Q, S, T, H, K, R, F, or W;
G99: A, M, N, Q, S, T, D, E, H, K, R, F, W, or Y;
Y100: A, I, L, M, P, V, G, N, Q, S, T, D, E, H, K, R, F, or W;
Y100a: A, I, L, M, P, V, G, N, Q, S, T, D, E, H, K, R, F, or W;
L100b: A, I, M, V, N, Q, S, T, D, H, F, W, or Y;
D101: A, I, L, M, P, V, G, N, Q, S, T, E, H, K, or R; and
E102: A, I, L, M, P, V, G, N, Q, S, T, D, H, K, R, F, W, or Y,
a third polypeptide comprising an antibody light chain variable domain comprising the amino acid sequence of SEQ ID NO:43, and
a fourth polypeptide comprising an antibody light chain variable domain comprising the amino acid sequence of SEQ ID NO:44;
wherein the first polypeptide and the third polypeptide form a pair, and the second polypeptide and the fourth polypeptide form a pair.

3. A bispecific antibody that recognizes (i) FIX and/or FIXa, and (ii) FX, the antibody comprising:
a first polypeptide comprising an antibody heavy chain variable domain comprising the amino acid sequence of SEQ ID NO:45,
a second polypeptide comprising an antibody heavy chain variable domain comprising the amino acid sequence of SEQ ID NO:46,
a third polypeptide comprising an antibody light chain variable domain comprising the amino acid sequence of SEQ ID NO:47, and
a fourth polypeptide comprising an antibody light chain comprising the amino acid sequence of one of the following: SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, or SEQ ID NO: 44;
wherein the first polypeptide and the third polypeptide form a pair, and the second polypeptide and the fourth polypeptide form a pair.

4. A bispecific antibody that recognizes (i) FIX and/or FIXa, and (ii) FX, the antibody comprising:
a first polypeptide comprising an antibody heavy chain variable domain comprising the amino acid sequence of SEQ ID NO:45;
a second polypeptide comprising an antibody heavy chain variable domain comprising the amino acid sequence of SEQ ID NO:46;
a third polypeptide comprising an antibody light chain variable domain comprising the amino acid sequence of one of the following: SEQ ID NO: 13, SEQ ID NO: 14, SEQ ID NO: 15, SEQ ID NO: 16, SEQ ID NO: 17, SEQ ID NO: 18, SEQ ID NO: 42, or SEQ ID NO: 43; and
a fourth polypeptide comprising an antibody light chain variable domain comprising the amino acid sequence of SEQ ID NO: 47,
wherein the first polypeptide and the third polypeptide form a pair, and the second polypeptide and the fourth polypeptide form a pair.

5. A bispecific antibody that recognizes (i) FIX and/or FIXa, and (ii) FX, the antibody comprising:
a first polypeptide comprising an antibody heavy chain variable domain comprising the amino acid sequence of SEQ ID NO: 45;
a second polypeptide comprising an antibody heavy chain variable domain comprising the amino acid sequence of SEQ ID NO: 46;
a third polypeptide comprising an antibody light chain comprising the amino acid sequence of SEQ ID NO: 42 or SEQ ID NO: 43; and
a fourth polypeptide comprising an antibody light chain comprising the amino acid sequence of SEQ ID NO: 44,
wherein the first polypeptide and the third polypeptide form a pair and the second polypeptide and the fourth polypeptide form a pair.

6. A bispecific antibody that recognizes (i) FIX and/or FIXa, and (ii) FX, the antibody comprising:
(1) a first polypeptide comprising an antibody heavy chain variable domain comprising the amino acid sequence of SEQ ID NO:45;
(2) a second polypeptide comprising an antibody heavy chain variable domain comprising the amino acid sequence of SEQ ID NO:46;
(3) a third polypeptide comprising an antibody light chain variable domain amino acid sequence selected from the following: SEQ ID NO: 47, SEQ ID NO: 13, SEQ ID NO: 14, SEQ ID NO: 15, SEQ ID NO: 16, SEQ ID NO: 17, SEQ ID NO: 18, SEQ ID NO: 42, and SEQ ID NO: 43; and
(4) a fourth polypeptide comprising an antibody light chain variable domain amino acid sequence selected from the following: SEQ ID NO: 47, SEQ ID NO: 19, SEQ ID NO: 20, SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, SEQ ID NO: 40, SEQ ID NO: 41, and SEQ ID NO: 44;

wherein the first polypeptide and third polypeptide form a pair, and wherein the second polypeptide and fourth polypeptide form a pair, provided that if the third polypeptide comprises SEQ ID NO: 47, the fourth polypeptide does not comprise SEQ ID NO: 47.

7. A bispecific antibody that recognizes (i) FIX and/or FIXa, and (ii) FX, the bispecific antibody comprising:
a first polypeptide comprising an antibody heavy chain variable domain comprising either (a) or (b):
  (a) the heavy chain CDR 1, 2, and 3 amino acid sequences of SEQ ID NOs: 1, 2, and 3, respectively, comprising one amino acid substitution in one of SEQ ID NOs: 1, 2, and 3, or
  (b) the amino acid sequence of SEQ ID NO: 45 comprising one amino acid substitution;
wherein the amino acid substitution of (a) or (b) is at a position selected from the following group of Kabat numbering positions and is a substitution with one of the amino acids listed for that position below:
  Y31: S, H, or W;
  Y32: I, V, N, Q, T, D, K, or F;
  I34: A, L, M, G, Q, T, E, K, F, or W;
  Q35: I, L, P, V, G, S, T, or K;
  S50: A, I, M, G, N, D, F, W, or Y;
  I51: V;
  S52: A, I, V, G, N, Q, D, H, F, W, or Y;
  P52a: G, Q, or Y;
  S53: G, T, or H;
  G54: A or S;
  Q55: G, H, or R;
  S56: L, M, G, D, H, R, or Y;
  T57: A, I, L, M, V, Q, S, E, H, K, F, W, or Y;
  Y58: I, L, V, N, T, D, H, K, F, or W;
  Y59: M, V, E, or F;
  R60: A, I, L, M, P, V, G, Q, S, T, H, K, or F;
  R61: A, I, L, M, P, V, G, N, Q, T, D, H, F, or W;
  E62: A, I, L, M, P, V, G, N, Q, S, T, D, H, K, or W;
  V63: A, I, L, M, P, T, H, F, or Y;
  K64: A, I, L, M, V, G, Q, S, T, H, R, or Y;
  G65: A, I, L, M, V, N, Q, S, T, D, E, H, K, R, F, W, or Y;
  R95: Q or K;
  T96: A, M, V, N, Q, S, D, E, H, F, W, or Y;
  G97: P, N, S, D, E, H, W, or Y;
  R98: A, I, L, M, P, V, G, N, Q, S, T, D, H, K, F, W, or Y;
  E99: A, I, L, M, P, V, G, N, Q, S, T, D, H, K, R, F, W, or Y;
  Y100: A, I, L, M, P, V, G, N, Q, S, T, D, E, H, K, R, F, or W;
  G100a: A, I, L, M, N, S, T, D, H, K, R, F, W, or Y;
  G100b: A, I, N, S, T, D, or E;
  G100c: N;
  W100d: H, F, or Y;
  Y100e: A, I, L, M, V, G, N, Q, S, T, D, E, H, K, F, or W;
  F100f: A, I, L, M, P, V, N, Q, S, T, D, or E;
  D101: A, I, L, M, P, V, G, N, Q, S, T, E, H, K, R, F, W, or Y; and
  Y102: A, I, L, M, P, V, G, N, Q, S, T, D, E, H, K, R, F, or W;
a second polypeptide comprising an antibody heavy chain variable domain comprising the amino acid sequence of SEQ ID NO:46;
a third polypeptide comprising an antibody light chain variable domain comprising the amino acid sequence of SEQ ID NO:42; and
a fourth polypeptide comprising an antibody light chain variable domain comprising the amino acid sequence of SEQ ID NO:44,
wherein the first polypeptide and the third polypeptide form a pair, and the second polypeptide and the fourth polypeptide form a pair.

* * * * *

SEQUENCE LISTING

```
<160> NUMBER OF SEQ ID NOS: 47

<210> SEQ ID NO 1
<211> LENGTH: 5
<212> TYPE: PRT
<213> ORGANISM: Artificial Sequence
<220> FEATURE:
<223> OTHER INFORMATION: An artificially synthesized peptide sequence

<400> SEQUENCE: 1

Tyr Tyr Asp Ile Gln
1               5

<210> SEQ ID NO 2
<211> LENGTH: 17
<212> TYPE: PRT
<213> ORGANISM: Artificial Sequence
<220> FEATURE:
<223> OTHER INFORMATION: An artificially synthesized peptide sequence
```

```
<400> SEQUENCE: 2

Ser Ile Ser Pro Ser Gly Gln Ser Thr Tyr Tyr Arg Arg Glu Val Lys
1               5                   10                  15

Gly

<210> SEQ ID NO 3
<211> LENGTH: 14
<212> TYPE: PRT
<213> ORGANISM: Artificial Sequence
<220> FEATURE:
<223> OTHER INFORMATION: An artificially synthesized peptide sequence

<400> SEQUENCE: 3

Arg Thr Gly Arg Glu Tyr Gly Gly Gly Trp Tyr Phe Asp Tyr
1               5                   10

<210> SEQ ID NO 4
<211> LENGTH: 5
<212> TYPE: PRT
<213> ORGANISM: Artificial Sequence
<220> FEATURE:
<223> OTHER INFORMATION: An artificially synthesized peptide sequence

<400> SEQUENCE: 4

Asp Asn Asn Met Asp
1               5

<210> SEQ ID NO 5
<211> LENGTH: 17
<212> TYPE: PRT
<213> ORGANISM: Artificial Sequence
<220> FEATURE:
<223> OTHER INFORMATION: An artificially synthesized peptide sequence

<400> SEQUENCE: 5

Asp Ile Asn Thr Arg Ser Gly Gly Ser Ile Tyr Asn Glu Glu Phe Gln
1               5                   10                  15

Asp

<210> SEQ ID NO 6
<211> LENGTH: 10
<212> TYPE: PRT
<213> ORGANISM: Artificial Sequence
<220> FEATURE:
<223> OTHER INFORMATION: An artificially synthesized peptide sequence

<400> SEQUENCE: 6

Arg Lys Ser Tyr Gly Tyr Tyr Leu Asp Glu
1               5                   10

<210> SEQ ID NO 7
<211> LENGTH: 11
<212> TYPE: PRT
<213> ORGANISM: Artificial Sequence
<220> FEATURE:
<223> OTHER INFORMATION: An artificially synthesized peptide sequence

<400> SEQUENCE: 7

Lys Ala Ser Arg Asn Ile Glu Arg Gln Leu Ala
1               5                   10

<210> SEQ ID NO 8
<211> LENGTH: 7
<212> TYPE: PRT
```

```
<213> ORGANISM: Artificial Sequence
<220> FEATURE:
<223> OTHER INFORMATION: An artificially synthesized peptide sequence

<400> SEQUENCE: 8

Gln Ala Ser Arg Lys Glu Ser
1               5

<210> SEQ ID NO 9
<211> LENGTH: 9
<212> TYPE: PRT
<213> ORGANISM: Artificial Sequence
<220> FEATURE:
<223> OTHER INFORMATION: An artificially synthesized peptide sequence

<400> SEQUENCE: 9

Gln Gln Tyr Ser Asp Pro Pro Leu Thr
1               5

<210> SEQ ID NO 10
<211> LENGTH: 448
<212> TYPE: PRT
<213> ORGANISM: Artificial Sequence
<220> FEATURE:
<223> OTHER INFORMATION: An artificially synthesized peptide sequence

<400> SEQUENCE: 10

Gln Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Tyr Tyr
            20                  25                  30

Asp Ile Gln Trp Val Arg Gln Ala Pro Gly Lys Gly Leu Glu Trp Val
        35                  40                  45

Ser Ser Ile Ser Pro Ser Gly Gln Ser Thr Tyr Tyr Arg Arg Glu Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Arg Thr Gly Arg Glu Tyr Gly Gly Trp Tyr Phe Asp Tyr
            100                 105                 110

Trp Gly Gln Gly Thr Leu Val Thr Val Ser Ser Ala Ser Thr Lys Gly
        115                 120                 125

Pro Ser Val Phe Pro Leu Ala Pro Cys Ser Arg Ser Thr Ser Glu Ser
    130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
            180                 185                 190

Thr Val Pro Ser Ser Ser Leu Gly Thr Gln Thr Tyr Thr Cys Asn Val
        195                 200                 205

Asp His Lys Pro Ser Asn Thr Lys Val Asp Lys Arg Val Glu Ser Lys
    210                 215                 220

Tyr Gly Pro Pro Cys Pro Pro Cys Pro Ala Pro Glu Phe Leu Gly Gly
225                 230                 235                 240

Pro Ser Val Phe Leu Phe Pro Pro Lys Pro Lys Asp Thr Leu Met Ile
                245                 250                 255
```

Ser Arg Thr Pro Glu Val Thr Cys Val Val Asp Val Ser Gln Glu
            260                 265                 270

Asp Pro Glu Val Gln Phe Asn Trp Tyr Val Asp Gly Val Glu Val His
        275                 280                 285

Asn Ala Lys Thr Lys Pro Arg Glu Glu Gln Tyr Asn Ser Thr Tyr Arg
    290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Gly Leu Pro Ser Ser Ile Glu
                325                 330                 335

Lys Thr Ile Ser Lys Ala Lys Gly Gln Pro Arg Glu Pro Gln Val Tyr
            340                 345                 350

Thr Leu Pro Pro Ser Gln Lys Glu Met Thr Lys Asn Gln Val Ser Leu
        355                 360                 365

Thr Cys Leu Val Lys Gly Phe Tyr Pro Ser Asp Ile Ala Val Glu Trp
    370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Glu Gly Asn Val Phe Ser Cys Ser Val Met His
            420                 425                 430

Glu Ala Leu His Asn Arg Tyr Thr Gln Lys Ser Leu Ser Leu Ser Pro
        435                 440                 445

<210> SEQ ID NO 11
<211> LENGTH: 444
<212> TYPE: PRT
<213> ORGANISM: Artificial Sequence
<220> FEATURE:
<223> OTHER INFORMATION: An artificially synthesized peptide sequence

<400> SEQUENCE: 11

Gln Val Gln Leu Val Gln Ser Gly Ser Glu Leu Lys Lys Pro Gly Ala
1               5                   10                  15

Ser Val Lys Val Ser Cys Lys Ala Ser Gly Tyr Thr Phe Thr Asp Asn
            20                  25                  30

Asn Met Asp Trp Val Arg Gln Ala Pro Gly Gln Gly Leu Glu Trp Met
        35                  40                  45

Gly Asp Ile Asn Thr Arg Ser Gly Gly Ser Ile Tyr Asn Glu Glu Phe
    50                  55                  60

Gln Asp Arg Val Ile Met Thr Val Asp Lys Ser Thr Asp Thr Ala Tyr
65                  70                  75                  80

Met Glu Leu Ser Ser Leu Arg Ser Glu Asp Thr Ala Thr Tyr His Cys
                85                  90                  95

Ala Arg Arg Lys Ser Tyr Gly Tyr Tyr Leu Asp Glu Trp Gly Glu Gly
            100                 105                 110

Thr Leu Val Thr Val Ser Ser Ala Ser Thr Lys Gly Pro Ser Val Phe
        115                 120                 125

Pro Leu Ala Pro Cys Ser Arg Ser Thr Ser Glu Ser Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
                180                 185                 190

Ser Ser Leu Gly Thr Gln Thr Tyr Thr Cys Asn Val Asp His Lys Pro
            195                 200                 205

Ser Asn Thr Lys Val Asp Lys Arg Val Glu Ser Lys Tyr Gly Pro Pro
        210                 215                 220

Cys Pro Pro Cys Pro Ala Pro Glu Phe Leu Gly Gly Pro Ser Val Phe
225                 230                 235                 240

Leu Phe Pro Pro Lys Pro Lys Asp Thr Leu Met Ile Ser Arg Thr Pro
                245                 250                 255

Glu Val Thr Cys Val Val Val Asp Val Ser Gln Glu Asp Pro Glu Val
            260                 265                 270

Gln Phe Asn Trp Tyr Val Asp Gly Val Glu Val His Asn Ala Lys Thr
        275                 280                 285

Lys Pro Arg Glu Glu Gln Tyr Asn Ser Thr Tyr Arg Val Val Ser Val
    290                 295                 300

Leu Thr Val Leu His Gln Asp Trp Leu Asn Gly Lys Glu Tyr Lys Cys
305                 310                 315                 320

Lys Val Ser Asn Lys Gly Leu Pro Ser Ser Ile Glu Lys Thr Ile Ser
                325                 330                 335

Lys Ala Lys Gly Gln Pro Arg Glu Pro Gln Val Tyr Thr Leu Pro Pro
            340                 345                 350

Ser Gln Glu Glu Met Thr Lys Asn Gln Val Ser Leu Thr Cys Leu Val
        355                 360                 365

Lys Gly Phe Tyr Pro Ser Asp Ile Ala Val Glu Trp Glu Ser Asn Gly
    370                 375                 380

Gln Pro Glu Asn Asn Tyr Lys Thr Thr Pro Pro Val Leu Asp Ser Asp
385                 390                 395                 400

Gly Ser Phe Phe Leu Tyr Ser Lys Leu Thr Val Asp Lys Ser Arg Trp
                405                 410                 415

Gln Glu Gly Asn Val Phe Ser Cys Ser Val Met His Glu Ala Leu His
            420                 425                 430

Asn His Tyr Thr Gln Glu Ser Leu Ser Leu Ser Pro
        435                 440

<210> SEQ ID NO 12
<211> LENGTH: 214
<212> TYPE: PRT
<213> ORGANISM: Artificial Sequence
<220> FEATURE:
<223> OTHER INFORMATION: An artificially synthesized peptide sequence

<400> SEQUENCE: 12

Asp Ile Gln Met Thr Gln Ser Pro Ser Ser Leu Ser Ala Ser Val Gly
1               5                   10                  15

Asp Arg Val Thr Ile Thr Cys Lys Ala Ser Arg Asn Ile Glu Arg Gln
            20                  25                  30

Leu Ala Trp Tyr Gln Gln Lys Pro Gly Gln Ala Pro Glu Leu Leu Ile
        35                  40                  45

Tyr Gln Ala Ser Arg Lys Glu Ser Gly Val Pro Asp Arg Phe Ser Gly
    50                  55                  60

Ser Arg Tyr Gly Thr Asp Phe Thr Leu Thr Ile Ser Ser Leu Gln Pro
65                  70                  75                  80

Glu Asp Ile Ala Thr Tyr Tyr Cys Gln Gln Tyr Ser Asp Pro Pro Leu
                85                  90                  95

-continued

Thr Phe Gly Gly Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
            115                 120                 125

Thr Ala Ser Val Val Cys Leu Leu Asn Asn Phe Tyr Pro Arg Glu Ala
130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
            165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
            195                 200                 205

Phe Asn Arg Gly Glu Cys
            210

<210> SEQ ID NO 13
<211> LENGTH: 106
<212> TYPE: PRT
<213> ORGANISM: Artificial Sequence
<220> FEATURE:
<223> OTHER INFORMATION: An artificially synthesized peptide sequence

<400> SEQUENCE: 13

Glu Ile Val Leu Thr Gln Ser Pro Ala Thr Leu Ser Val Ser Pro Gly
1               5                   10                  15

Glu Arg Ala Thr Leu Ser Cys Arg Ala Ser Gln Ser Val Ser Ser Asn
            20                  25                  30

Leu Ala Trp Tyr Gln Gln Lys Pro Gly Gln Ala Pro Arg Leu Leu Ile
        35                  40                  45

Tyr Gly Ala Ser Thr Arg Ala Thr Gly Ile Pro Ala Arg Phe Ser Gly
    50                  55                  60

Ser Gly Ser Gly Thr Glu Phe Thr Leu Thr Ile Ser Ser Leu Gln Ser
65                  70                  75                  80

Glu Asp Phe Ala Val Tyr Tyr Cys Gln Gln Tyr Lys Arg Pro Leu Thr
                85                  90                  95

Phe Gly Gly Gly Thr Lys Val Glu Ile Lys
            100                 105

<210> SEQ ID NO 14
<211> LENGTH: 108
<212> TYPE: PRT
<213> ORGANISM: Artificial Sequence
<220> FEATURE:
<223> OTHER INFORMATION: An artificially synthesized peptide sequence

<400> SEQUENCE: 14

Asp Ile Gln Leu Thr Gln Ser Pro Ser Ser Leu Ser Ala Ser Val Gly
1               5                   10                  15

Asp Arg Val Thr Ile Thr Cys Arg Ala Ser Gln Gly Ile Ser Ser Tyr
            20                  25                  30

Leu Ala Trp Tyr Gln Gln Lys Pro Gly Lys Ala Pro Lys Leu Leu Ile
        35                  40                  45

Tyr Ala Ala Ser Thr Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro

```
                 65                  70                  75                  80
Glu Asp Phe Ala Thr Tyr Tyr Cys Gln Gln Leu Asn Ser Tyr Leu Gly
                         85                  90                  95

Ile Thr Phe Gly Pro Gly Thr Lys Val Asp Ile Lys
                    100                 105
```

<210> SEQ ID NO 15
<211> LENGTH: 111
<212> TYPE: PRT
<213> ORGANISM: Artificial Sequence
<220> FEATURE:
<223> OTHER INFORMATION: An artificially synthesized peptide sequence

<400> SEQUENCE: 15

```
Asp Ile Val Met Thr Gln Thr Pro Leu Ser Leu Ser Val Thr Pro Gly
1               5                   10                  15

Gln Pro Ala Ser Val Ser Cys Lys Ser Ser Gln Ser Leu Leu Arg Thr
            20                  25                  30

Asp Gly Lys Ala Tyr Leu Asp Trp Tyr Leu Gln Lys Pro Gly Gln Ser
        35                  40                  45

Pro Gln Leu Leu Ile Tyr Glu Val Ser Lys Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Met Gln Arg
                85                  90                  95

Ile Gln Ala Leu Ser Phe Gly Gly Gly Thr Lys Val Asp Ile Lys
                    100                 105                 110
```

<210> SEQ ID NO 16
<211> LENGTH: 107
<212> TYPE: PRT
<213> ORGANISM: Artificial Sequence
<220> FEATURE:
<223> OTHER INFORMATION: An artificially synthesized peptide sequence

<400> SEQUENCE: 16

```
Ser Ser Gly Leu Thr Gln Pro Pro Ser Leu Ser Val Ser Pro Gly Gln
1               5                   10                  15

Thr Ala Ser Ile Thr Cys Ser Gly His Lys Val Gly Asp Lys Tyr Ala
            20                  25                  30

Ser Trp Tyr Gln Gln Lys Pro Gly Gln Ser Pro Val Leu Val Ile Tyr
        35                  40                  45

Gln Asp Ser Lys Arg Pro Ser Gly Ile Pro Glu Arg Phe Ser Ala Ser
    50                  55                  60

Asn Ser Gly Asn Thr Ala Thr Leu Thr Ile Ser Gly Thr Gln Ala Val
65                  70                  75                  80

Asp Glu Ala Asp Tyr Tyr Cys Leu Ala Trp Val Pro Asn Ser Gly Tyr
                85                  90                  95

Val Phe Gly Thr Gly Thr Gln Val Thr Val Val
                    100                 105
```

<210> SEQ ID NO 17
<211> LENGTH: 110
<212> TYPE: PRT
<213> ORGANISM: Artificial Sequence
<220> FEATURE:
<223> OTHER INFORMATION: An artificially synthesized peptide sequence

<400> SEQUENCE: 17

Gln Ser Val Leu Thr Gln Pro Ala Ser Val Ser Gly Ser Pro Gly Gln
1               5                   10                  15

Ser Ile Thr Ile Ser Cys Thr Gly Thr Ser Ser Asp Val Gly Ser Tyr
            20                  25                  30

Asn Leu Val Ser Trp Tyr Gln Gln His Pro Gly Lys Ala Pro Lys Leu
        35                  40                  45

Met Ile Tyr Glu Val Ser Lys Arg Pro Ser Gly Val Ser Asn Arg Phe
    50                  55                  60

Ser Gly Ser Lys Ser Gly Asn Thr Ala Ser Leu Thr Ile Ser Gly Leu
65              70                  75                  80

Gln Ala Glu Asp Glu Ala Asp Tyr Tyr Cys Cys Ser Tyr Ala Gly Ser
            85                  90                  95

Ser Thr Leu Val Phe Gly Gly Gly Thr Lys Leu Thr Val Leu
            100                 105                 110

<210> SEQ ID NO 18
<211> LENGTH: 107
<212> TYPE: PRT
<213> ORGANISM: Artificial Sequence
<220> FEATURE:
<223> OTHER INFORMATION: An artificially synthesized peptide sequence

<400> SEQUENCE: 18

Gln Ser Ala Leu Thr Gln Pro Pro Ser Leu Ser Val Ser Pro Gly Gln
1               5                   10                  15

Thr Ala Ser Ile Thr Cys Ser Gly His Lys Val Gly Asp Lys Tyr Ala
            20                  25                  30

Ser Trp Tyr Gln Gln Lys Pro Gly Gln Ser Pro Val Leu Val Ile Tyr
        35                  40                  45

Gln Asp Ser Lys Arg Pro Ser Gly Ile Pro Glu Arg Phe Ser Ala Ser
    50                  55                  60

Asn Ser Gly Asn Thr Ala Thr Leu Thr Ile Ser Gly Thr Gln Ala Val
65              70                  75                  80

Asp Glu Ala Asp Tyr Tyr Cys Leu Ala Trp Val Pro Asn Ser Gly Tyr
            85                  90                  95

Val Phe Gly Thr Gly Thr Gln Val Thr Val Val
            100                 105

<210> SEQ ID NO 19
<211> LENGTH: 107
<212> TYPE: PRT
<213> ORGANISM: Artificial Sequence
<220> FEATURE:
<223> OTHER INFORMATION: An artificially synthesized peptide sequence

<400> SEQUENCE: 19

Asn Ile Gln Met Thr Gln Ser Pro Ser Ser Val Ser Ala Ser Val Gly
1               5                   10                  15

Asp Thr Val Thr Ile Thr Cys Arg Ala Ser Gln Tyr Ile Ser Asp Arg
            20                  25                  30

Leu Ala Trp Tyr Gln Gln Lys Pro Gly Arg Pro Pro Lys Val Leu Ile
        35                  40                  45

Tyr Arg Ala Ser Asn Leu Gln Ser Gly Val Pro Ser Arg Phe Arg Gly
    50                  55                  60

Ser Gly Ser Gly Thr Asp Phe Thr Leu Thr Ile Asn Ser Leu Gln Pro
65              70                  75                  80

Glu Asp Phe Ala Ile Tyr Tyr Cys Gln Gln Ala Lys Asn Phe Pro Trp

```
                        85                  90                  95

Ala Phe Gly Gln Gly Thr Lys Val Glu Phe Lys
                100                 105

<210> SEQ ID NO 20
<211> LENGTH: 107
<212> TYPE: PRT
<213> ORGANISM: Artificial Sequence
<220> FEATURE:
<223> OTHER INFORMATION: An artificially synthesized peptide sequence

<400> SEQUENCE: 20

Asn Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Arg Ser Tyr
            20                  25                  30

Leu Asn Trp Tyr Gln Gln Lys Pro Gly Lys Ala Pro Lys Leu Leu Ile
        35                  40                  45

Tyr Gly Ala Phe Thr Leu Gln Thr Gly Val Pro Ser Arg Phe Ser Gly
    50                  55                  60

Ser Ala Ser Gly Thr Asp Phe Thr Leu Thr Ile Asn Asn Leu Gln Pro
65                  70                  75                  80

Glu Asp Phe Ala Val Tyr His Cys Gln Gln Ser Tyr Arg Ile Pro Trp
                85                  90                  95

Thr Phe Gly Gln Gly Thr Lys Val Glu Ile Lys
                100                 105

<210> SEQ ID NO 21
<211> LENGTH: 107
<212> TYPE: PRT
<213> ORGANISM: Artificial Sequence
<220> FEATURE:
<223> OTHER INFORMATION: An artificially synthesized peptide sequence

<400> SEQUENCE: 21

Asn Ile Gln Met Thr Gln Ser Pro Ala Ser Leu Ser Ala Ser Val Gly
1               5                   10                  15

Asp Lys Val Thr Ile Thr Cys Gln Ala Ser Gln Asp Ile Gly Thr Ser
            20                  25                  30

Leu Asn Trp Tyr Gln Gln Arg Pro Gly Thr Ala Pro Lys Leu Leu Ile
        35                  40                  45

Phe Asp Thr Ser Asn Leu Glu Lys Gly Val Pro Ser Arg Phe Ser Gly
    50                  55                  60

Ser Lys Ser Glu Thr Tyr Phe Thr Phe Ala Ile Ser Ser Leu Gln Pro
65                  70                  75                  80

Glu Asp Ile Ala Thr Tyr Tyr Cys Gln Gln Ser Tyr Asn Ile Pro Trp
                85                  90                  95

Thr Phe Gly Arg Gly Thr Lys Val Glu Ile Thr
                100                 105

<210> SEQ ID NO 22
<211> LENGTH: 107
<212> TYPE: PRT
<213> ORGANISM: Artificial Sequence
<220> FEATURE:
<223> OTHER INFORMATION: An artificially synthesized peptide sequence

<400> SEQUENCE: 22

Asp Ile Gln Leu Thr Gln Ser Pro Ser Ser Leu Ser Ala Ser Val Gly
1               5                   10                  15
```

```
Asp Ser Val Thr Ile Thr Cys Arg Ala Ser Gln Ser Phe Thr Asn Tyr
            20                  25                  30

Leu Asn Trp Tyr Gln Gln Lys Pro Gly Lys Ala Pro Lys Val Leu Ile
        35                  40                  45

Tyr Gly Ala Ser Thr Leu Gln Thr Gly Val Pro Ser Arg Phe Ser Gly
 50                  55                  60

Gly Gly Ser Gly Ala Glu Tyr Thr Leu Thr Ile Ser Asn Leu Gln Pro
 65                  70                  75                  80

Asp Asp Ser Ala Thr Tyr Tyr Cys Gln Gln Ser Tyr Ser Thr Pro Trp
                85                  90                  95

Thr Phe Gly Gln Gly Thr Lys Val Glu Ile Lys
                100                 105
```

<210> SEQ ID NO 23
<211> LENGTH: 107
<212> TYPE: PRT
<213> ORGANISM: Artificial Sequence
<220> FEATURE:
<223> OTHER INFORMATION: An artificially synthesized peptide sequence

<400> SEQUENCE: 23

```
Asp Ile Val Met Thr Gln Ser Pro Ser Ser Leu Ser Ala Ser Val Gly
 1               5                   10                  15

Asp Arg Val Thr Ile Thr Cys Arg Thr Ser Gln Tyr Ile Gly Thr Tyr
            20                  25                  30

Leu Asn Trp Tyr Gln Gln Lys Pro Gly Lys Ala Pro Lys Leu Leu Ile
        35                  40                  45

Asn Ser Val Ser Arg Leu Gln Thr Gly Val Pro Ser Arg Phe Thr Gly
 50                  55                  60

Gly Gly Ser Gly Thr Asp Phe Thr Leu Thr Ile Ser Ser Leu Gln Pro
 65                  70                  75                  80

Glu Asp Phe Ala Thr Tyr Tyr Cys Gln Gln Gly Tyr Ser Thr Pro Trp
                85                  90                  95

Thr Phe Gly Gln Gly Thr Arg Val Glu Ile Lys
                100                 105
```

<210> SEQ ID NO 24
<211> LENGTH: 112
<212> TYPE: PRT
<213> ORGANISM: Artificial Sequence
<220> FEATURE:
<223> OTHER INFORMATION: An artificially synthesized peptide sequence

<400> SEQUENCE: 24

```
Asp Ile Val Met Thr Gln Thr Pro Leu Ser Leu Ser Val Thr Pro Gly
 1               5                   10                  15

Gln Pro Ala Ser Ile Ser Cys Lys Ser Ser Gln Ser Leu Leu Arg Ser
            20                  25                  30

Asp Gly Lys Thr Tyr Leu Gln Trp Tyr Leu Gln Lys Pro Gly Gln Ser
        35                  40                  45

Pro Gln Leu Leu Ile Tyr Glu Val Ser Arg Phe Ser Gly Val Pro
 50                  55                  60

Glu Arg Phe Ser Gly Ser Gly Ser Gly Thr Asp Phe Thr Leu Glu Ile
 65                  70                  75                  80

Ser Arg Val Glu Ala Asp Asp Val Gly Val Tyr Tyr Cys Met Gln Gly
                85                  90                  95

Leu His Leu Pro Trp Thr Phe Gly Gln Gly Thr Lys Val Glu Val Lys
```

```
<210> SEQ ID NO 25
<211> LENGTH: 108
<212> TYPE: PRT
<213> ORGANISM: Artificial Sequence
<220> FEATURE:
<223> OTHER INFORMATION: An artificially synthesized peptide sequence

<400> SEQUENCE: 25

Glu Ile Val Leu Thr Gln Ser Pro Gly Thr Leu Ser Leu Ser Pro Gly
1               5                   10                  15

Glu Ser Gly Thr Leu Ser Cys Arg Ala Ser Gln Ser Val Asn Thr Arg
            20                  25                  30

Tyr Leu Ala Trp Tyr Tyr Gln Arg Pro Gly Gln Val Pro Arg Leu Leu
        35                  40                  45

Ile Tyr Gly Thr Ser Asn Arg Ala Thr Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Gly Asp Ser Gly Val Tyr Tyr Cys Gln Gln Ser Arg Ser Ser Gln
                85                  90                  95

Trp Thr Phe Gly Gln Gly Thr Lys Val Glu Ile Lys
            100                 105

<210> SEQ ID NO 26
<211> LENGTH: 107
<212> TYPE: PRT
<213> ORGANISM: Artificial Sequence
<220> FEATURE:
<223> OTHER INFORMATION: An artificially synthesized peptide sequence

<400> SEQUENCE: 26

Val Ile Trp Met Thr Gln Ser Pro Ser Ser Val Ser Ala Ser Val Gly
1               5                   10                  15

Asp Arg Val Thr Ile Thr Cys Arg Ala Ser Gln Gly Ile Asn Ser Arg
            20                  25                  30

Leu Val Trp Tyr Gln Gln Lys Pro Gly Thr Ala Pro Lys Val Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Asn Ser Leu Gln Pro
65                  70                  75                  80

Glu Asp Phe Ala Thr Tyr Tyr Cys Gln Gln Gly Asn Thr Phe Pro Trp
                85                  90                  95

Thr Phe Gly Gln Gly Thr Lys Val Glu Val Lys
            100                 105

<210> SEQ ID NO 27
<211> LENGTH: 107
<212> TYPE: PRT
<213> ORGANISM: Artificial Sequence
<220> FEATURE:
<223> OTHER INFORMATION: An artificially synthesized peptide sequence

<400> SEQUENCE: 27

Asn Ile Gln Met Thr Gln Ser Pro Ser Ser Leu Ser Ala Ser Val Gly
1               5                   10                  15

Asp Thr Val Thr Ile Thr Cys Arg Ala Ser Gln Asp Ile Ser Ser Trp
            20                  25                  30
```

```
Leu Ala Trp Tyr Gln His Lys Pro Gly Arg Ala Pro Arg Ser Leu Ile
            35                  40                  45

Tyr Thr Ala Ser Ser Leu Gln Ser Gly Val Pro Ser Arg Phe Ser Gly
        50                  55                  60

Ser Gly Ser Gly Thr Asp Phe Thr Leu Thr Ile Thr Asn Leu Gln Pro
65                  70                  75                  80

Glu Asp Phe Ala Thr Tyr Tyr Cys Gln Gln Ala His Ser Phe Pro Trp
                85                  90                  95

Ser Phe Gly Pro Gly Thr Asn Val Glu Ile Lys
                100                 105
```

<210> SEQ ID NO 28
<211> LENGTH: 107
<212> TYPE: PRT
<213> ORGANISM: Artificial Sequence
<220> FEATURE:
<223> OTHER INFORMATION: An artificially synthesized peptide sequence

<400> SEQUENCE: 28

```
Asp Ile Val Met Thr Gln Ser Pro Ser Ser Val Ser Ala Ser Val Gly
1               5                   10                  15

Asp Arg Val Thr Ile Thr Cys Arg Ala Ser Gln Gly Ile Ser Lys Trp
            20                  25                  30

Leu Ala Trp Tyr Gln Gln Lys Pro Gly Lys Ala Pro Lys Leu Leu Ile
            35                  40                  45

Asp Ser Ala Thr Asn Leu Arg Ser Gly Val Pro Ser Arg Phe Ser Gly
        50                  55                  60

Ser Gly Ser Gly Thr Asp Phe Thr Leu Thr Ile Ser Ser Leu Gln Pro
65                  70                  75                  80

Glu Asp Leu Ala Phe Tyr Tyr Cys Gln Gln Gly Lys Ser Phe Pro Trp
                85                  90                  95

Thr Phe Gly Gln Gly Thr Lys Val Glu Ile Lys
                100                 105
```

<210> SEQ ID NO 29
<211> LENGTH: 110
<212> TYPE: PRT
<213> ORGANISM: Artificial Sequence
<220> FEATURE:
<223> OTHER INFORMATION: An artificially synthesized peptide sequence

<400> SEQUENCE: 29

```
Gln Ser Val Val Thr Gln Pro Pro Ser Val Ser Ala Ala Pro Gly Gln
1               5                   10                  15

Lys Val Thr Ile Ser Cys Ser Gly Ser Ser Ser Asn Ile Gly Asn Asn
            20                  25                  30

Tyr Val Ser Trp Tyr Gln Gln Leu Pro Gly Thr Ala Pro Lys Leu Leu
            35                  40                  45

Ile Tyr Asp Asn Asn Lys Arg Pro Ser Gly Ile Pro Asp Arg Phe Ser
        50                  55                  60

Gly Ser Lys Ser Gly Thr Ser Ala Thr Leu Gly Ile Thr Gly Leu Gln
65                  70                  75                  80

Thr Gly Asp Glu Ala Asp Tyr Tyr Cys Gly Thr Trp Asp Ser Ser Leu
                85                  90                  95

Ser Ala Tyr Val Phe Gly Thr Gly Thr Lys Val Thr Val Leu
                100                 105                 110
```

-continued

```
<210> SEQ ID NO 30
<211> LENGTH: 106
<212> TYPE: PRT
<213> ORGANISM: Artificial Sequence
<220> FEATURE:
<223> OTHER INFORMATION: An artificially synthesized peptide sequence

<400> SEQUENCE: 30

Ser Tyr Glu Leu Thr Gln Pro Leu Ser Val Ser Val Ala Pro Gly Gln
1               5                   10                  15

Thr Ala Arg Ile Pro Cys Gly Gly Asn Asn Ile Gly Asn Lys Asn Val
            20                  25                  30

His Trp Tyr Gln Gln Lys Pro Gly Gln Ala Pro Val Leu Val Ile Tyr
        35                  40                  45

Arg Asp Thr Asn Arg Pro Ser Gly Ile Pro Glu Arg Phe Ser Gly Ser
    50                  55                  60

Asn Ser Gly His Thr Ala Thr Leu Thr Ile Ser Ala Gln Ala Gly
65                  70                  75                  80

Asp Glu Ala Asp Tyr Ser Cys Gln Val Trp Asp Ser Gly Thr Val Val
                85                  90                  95

Phe Gly Gly Gly Thr Lys Leu Thr Val Leu
            100                 105

<210> SEQ ID NO 31
<211> LENGTH: 107
<212> TYPE: PRT
<213> ORGANISM: Artificial Sequence
<220> FEATURE:
<223> OTHER INFORMATION: An artificially synthesized peptide sequence

<400> SEQUENCE: 31

Ser Tyr Val Leu Thr Gln Pro Val Ser Val Ala Arg Gly Gln
1               5                   10                  15

Thr Ala Thr Ile Thr Cys Glu Gly Asn His Ile Gly Asp Lys His Val
            20                  25                  30

His Trp Tyr His Gln Arg Pro Gly Gln Ala Pro Ile Leu Val Met Phe
        35                  40                  45

Arg Asp Ala Arg Arg Pro Ser Gly Ile Pro Glu Arg Leu Ser Gly Ser
    50                  55                  60

Asn Ser Gly Asn Thr Ala Ser Leu Thr Ile Ser Gly Ala Gln Ala Gly
65                  70                  75                  80

Asp Glu Gly Asp Tyr Tyr Cys Gln Val Trp Asp Ser Ser Ala Val
                85                  90                  95

Val Phe Gly Gly Gly Thr Lys Val Thr Val Val
            100                 105

<210> SEQ ID NO 32
<211> LENGTH: 109
<212> TYPE: PRT
<213> ORGANISM: Artificial Sequence
<220> FEATURE:
<223> OTHER INFORMATION: An artificially synthesized peptide sequence

<400> SEQUENCE: 32

Ser Val Leu Thr Gln Pro Pro Ser Leu Ser Ala Pro Gly Gln Arg
1               5                   10                  15

Val Thr Ile Ser Cys Ser Gly Ser Ser Ser Asn Ile Gly Asn His Leu
            20                  25                  30

Val Ser Trp His Gln Gln Phe Pro Gly Thr Ala Pro Lys Ala Leu Ile
        35                  40                  45
```

```
Tyr Asp Asn Asp Arg Arg Pro Ser Gly Ile Pro Asp Arg Phe Ser Gly
        50                  55                  60

Ser Lys Ser Gly Thr Ser Ala Thr Leu Asp Ile Thr Gly Leu Gln Thr
 65                  70                  75                  80

Gly Asp Glu Ala Asp Tyr Tyr Cys Ala Thr Trp Asp Ala Ser Leu Arg
                 85                  90                  95

Ala Val Val Phe Gly Gly Gly Thr Lys Leu Thr Val Leu
            100                 105

<210> SEQ ID NO 33
<211> LENGTH: 111
<212> TYPE: PRT
<213> ORGANISM: Artificial Sequence
<220> FEATURE:
<223> OTHER INFORMATION: An artificially synthesized peptide sequence

<400> SEQUENCE: 33

Gln Ser Val Leu Thr Gln Pro Pro Ser Val Ser Gly Ala Pro Gly Gln
 1               5                  10                  15

Arg Val Thr Val Ser Cys Asn Gly Gly Ser Ser Asn Ile Gly Thr Gly
             20                  25                  30

Tyr Asp Val His Trp Tyr Gln Gln Leu Pro Gly Thr Ala Pro Lys Ile
         35                  40                  45

Val Ile Phe Gly Asn Ser Asn Arg Pro Ser Gly Val Pro Gly Arg Phe
     50                  55                  60

Ser Gly Ser Lys Ser Gly Thr Ser Ala Ser Leu Val Ile Ala Gly Leu
 65                  70                  75                  80

Gln Ala Glu Asp Glu Ala Asp Tyr Tyr Cys Gln Ser Tyr Asp Arg Ser
                 85                  90                  95

Leu Ser Gly Tyr Val Phe Gly Thr Gly Thr Lys Val Thr Val Leu
            100                 105                 110

<210> SEQ ID NO 34
<211> LENGTH: 110
<212> TYPE: PRT
<213> ORGANISM: Artificial Sequence
<220> FEATURE:
<223> OTHER INFORMATION: An artificially synthesized peptide sequence

<400> SEQUENCE: 34

Ser Tyr Val Leu Thr Gln Pro Arg Ser Val Ser Gly Ser Pro Gly Gln
 1               5                  10                  15

Ser Val Thr Ile Ser Cys Thr Gly Thr Ser Ser Asp Val Gly Arg Tyr
             20                  25                  30

Asn Tyr Val Ser Trp Tyr Gln Gln Arg Pro Gly Lys Ala Pro Lys Val
         35                  40                  45

Met Ile Tyr Asp Val Ile Lys Arg Pro Ser Gly Val Pro Ala Arg Phe
     50                  55                  60

Ser Gly Ser Lys Ser Gly Asn Thr Ala Ser Leu Thr Ile Ser Gly Leu
 65                  70                  75                  80

Gln Pro Glu Asp Glu Ala Asp Tyr Tyr Cys Ser Ser Tyr Ala Gly Ala
                 85                  90                  95

Ser Ser Phe Val Phe Gly Thr Gly Thr Lys Val Thr Val Leu
            100                 105                 110

<210> SEQ ID NO 35
<211> LENGTH: 110
<212> TYPE: PRT
```

<213> ORGANISM: Artificial Sequence
<220> FEATURE:
<223> OTHER INFORMATION: An artificially synthesized peptide sequence

<400> SEQUENCE: 35

Gln Ser Val Leu Thr Gln Pro Pro Ser Ala Ser Gly Thr Pro Gly Gln
1               5                   10                  15

Arg Val Asn Ile Ser Cys Ser Gly Ser Arg Ser Asn Ile Ala Asn Asn
            20                  25                  30

Tyr Val Ser Trp Tyr Gln His Leu Pro Gly Thr Val Pro Lys Val Leu
        35                  40                  45

Ile Ser Asp Asn Asp Gln Arg Ser Ser Gly Val Pro Asp Arg Phe Ser
50                  55                  60

Gly Ser Lys Ser Gly Thr Ser Ala Ser Leu Ala Ile Ser Gly Leu Arg
65                  70                  75                  80

Ser Glu Asp Glu Ala Asp Tyr Tyr Cys Ala Ala Trp Asp Asp Arg Met
                85                  90                  95

Arg Gly Phe Val Phe Gly Ser Gly Thr Lys Val Thr Val Leu
            100                 105                 110

<210> SEQ ID NO 36
<211> LENGTH: 110
<212> TYPE: PRT
<213> ORGANISM: Artificial Sequence
<220> FEATURE:
<223> OTHER INFORMATION: An artificially synthesized peptide sequence

<400> SEQUENCE: 36

Gln Ser Val Leu Thr Gln Pro Pro Ser Val Ser Ala Ala Pro Gly Gln
1               5                   10                  15

Lys Val Thr Ile Ser Cys Ser Gly Ser Ser Ser Asn Ile Gly Asn Asn
            20                  25                  30

Tyr Val Ser Trp Tyr Gln Gln Leu Pro Gly Thr Ala Pro Lys Leu Leu
        35                  40                  45

Ile Tyr Asp Asn Asn Lys Arg Pro Ser Gly Ile Pro Asp Arg Phe Ser
50                  55                  60

Gly Ser Lys Ser Gly Thr Ser Ala Thr Leu Gly Ile Thr Gly Leu Gln
65                  70                  75                  80

Thr Gly Asp Glu Ala Asp Tyr Tyr Cys Gly Thr Trp Asp Ser Ser Leu
                85                  90                  95

Ser Ala Tyr Val Phe Gly Thr Gly Thr Lys Val Thr Val Leu
            100                 105                 110

<210> SEQ ID NO 37
<211> LENGTH: 110
<212> TYPE: PRT
<213> ORGANISM: Artificial Sequence
<220> FEATURE:
<223> OTHER INFORMATION: An artificially synthesized peptide sequence

<400> SEQUENCE: 37

Asn Phe Met Leu Thr Gln Pro Pro Ser Val Ser Gly Ala Pro Arg Gln
1               5                   10                  15

Arg Val Thr Ile Ser Cys Ser Gly Ser Ser Ser Asn Ile Gly Asn Arg
            20                  25                  30

Ala Val Ser Trp Tyr Gln His Val Pro Gly Lys Pro Pro Arg Leu Ile
        35                  40                  45

Val Tyr His Asp Asp Val Leu Ser Ser Gly Val Ser Gly Arg Phe Ser
50                  55                  60

Ala Ser Lys Ser Gly Thr Ser Ala Ser Leu Ala Ile Ser Gly Leu Gln
65                  70                  75                  80

Ser Glu Asp Glu Ala Asp Tyr Phe Cys Ala Ala Trp Asp Ala Arg Leu
                85                  90                  95

Asn Gly Trp Val Phe Gly Gly Gly Thr Lys Leu Thr Val Leu
            100                 105                 110

<210> SEQ ID NO 38
<211> LENGTH: 109
<212> TYPE: PRT
<213> ORGANISM: Artificial Sequence
<220> FEATURE:
<223> OTHER INFORMATION: An artificially synthesized peptide sequence

<400> SEQUENCE: 38

Gln Ser Ala Leu Thr Gln Pro Ala Ser Val Ser Gly Ser Pro Gly Gln
1               5                   10                  15

Ser Ile Thr Ile Ser Cys Thr Gly Thr Ser Ser Asp Val Gly Gly Tyr
                20                  25                  30

Asn Tyr Val Ser Trp Tyr Gln Gln His Pro Gly Lys Ala Pro Lys Leu
            35                  40                  45

Met Ile Tyr Asp Val Ser Asn Arg Pro Ser Gly Val Ser Asn Arg Phe
    50                  55                  60

Ser Gly Ser Lys Ser Gly Asn Thr Ala Ser Leu Thr Ile Ser Gly Leu
65                  70                  75                  80

Gln Ala Glu Asp Glu Ala Asp Tyr Tyr Cys Ser Ser Tyr Thr Ser Ser
                85                  90                  95

Ser Thr Leu Phe Gly Thr Gly Thr Lys Val Thr Val Leu
            100                 105

<210> SEQ ID NO 39
<211> LENGTH: 110
<212> TYPE: PRT
<213> ORGANISM: Artificial Sequence
<220> FEATURE:
<223> OTHER INFORMATION: An artificially synthesized peptide sequence

<400> SEQUENCE: 39

Gln Ser Val Leu Thr Gln Pro Ala Ser Val Ser Gly Ser Pro Gly Gln
1               5                   10                  15

Ser Ile Thr Ile Ser Cys Thr Gly Thr Ser Ser Asp Val Gly Gly Tyr
                20                  25                  30

Asn Tyr Val Ser Trp Tyr Gln Gln His Pro Gly Lys Ala Pro Lys Leu
            35                  40                  45

Thr Ile Tyr Asp Val Ser Asn Arg Pro Ser Gly Val Ser Asn Arg Phe
    50                  55                  60

Ser Gly Ser Lys Ser Gly Ser Ser Ala Ser Leu Thr Ile Ser Gly Leu
65                  70                  75                  80

Gln Ala Glu Asp Glu Ala Asp Tyr Tyr Cys Ser Ser Tyr Thr Thr Ser
                85                  90                  95

Gly Thr Tyr Val Phe Gly Thr Gly Thr Thr Val Thr Val Leu
            100                 105                 110

<210> SEQ ID NO 40
<211> LENGTH: 110
<212> TYPE: PRT
<213> ORGANISM: Artificial Sequence
<220> FEATURE:
<223> OTHER INFORMATION: An artificially synthesized peptide sequence

<400> SEQUENCE: 40

Gln Ser Ala Leu Thr Gln Pro Arg Ser Val Ser Gly Ser Pro Gly Gln
1               5                   10                  15

Ser Val Thr Ile Ser Cys Thr Gly Thr Ser Ser Asp Val Gly Gly Tyr
            20                  25                  30

Asn Tyr Val Ser Trp Tyr Gln Gln His Pro Gly Lys Ala Pro Lys Leu
        35                  40                  45

Met Ile Tyr Asp Val Ser Lys Arg Pro Ser Gly Val Pro Asp Arg Phe
    50                  55                  60

Ser Gly Ser Lys Ser Gly Asn Thr Ala Ser Leu Thr Ile Ser Gly Leu
65                  70                  75                  80

Gln Ala Glu Asp Glu Ala Asp Tyr Tyr Cys Cys Ser Tyr Ala Gly Arg
                85                  90                  95

Arg Gly Tyr Val Phe Gly Thr Gly Thr Lys Val Thr Val Leu
            100                 105                 110

<210> SEQ ID NO 41
<211> LENGTH: 109
<212> TYPE: PRT
<213> ORGANISM: Artificial Sequence
<220> FEATURE:
<223> OTHER INFORMATION: An artificially synthesized peptide sequence

<400> SEQUENCE: 41

Gln Ser Ala Leu Thr Gln Pro Arg Ser Val Ser Ala Ser Pro Gly Gln
1               5                   10                  15

Ser Val Thr Ile Ser Cys Thr Gly Thr Ser Ser Asp Val Gly Phe Tyr
            20                  25                  30

Lys Tyr Val Ser Trp Tyr Gln Gln Tyr Pro Gly Lys Ala Pro Lys Leu
        35                  40                  45

Met Ile Tyr Asp Val Ser Lys Arg Pro Ser Gly Val Pro Asp Arg Phe
    50                  55                  60

Ser Gly Ser Lys Ser Gly Asn Thr Ala Ser Leu Thr Ile Ser Gly Leu
65                  70                  75                  80

Gln Ala Glu Asp Glu Ala Asp Tyr Tyr Cys Cys Ser Tyr Ala Gly Ser
                85                  90                  95

Asn Thr Val Phe Gly Thr Gly Thr Lys Val Thr Val Leu
            100                 105

<210> SEQ ID NO 42
<211> LENGTH: 106
<212> TYPE: PRT
<213> ORGANISM: Artificial Sequence
<220> FEATURE:
<223> OTHER INFORMATION: An artificially synthesized peptide sequence

<400> SEQUENCE: 42

Glu Ile Val Leu Thr Gln Ser Pro Ala Thr Leu Ser Val Ser Pro Gly
1               5                   10                  15

Glu Arg Ala Thr Leu Ser Cys Arg Ala Ser Gln Ser Val Arg Ser Asn
            20                  25                  30

Leu Ala Trp Tyr Gln Gln Lys Pro Gly Gln Ala Pro Arg Leu Leu Ile
        35                  40                  45

Tyr Gly Ala Ser Thr Arg Ala Thr Gly Ile Pro Ala Arg Phe Ser Gly
    50                  55                  60

Ser Gly Ser Gly Thr Glu Phe Thr Leu Thr Ile Ser Ser Leu Gln Ser
65                  70                  75                  80

Glu Asp Phe Ala Val Tyr Tyr Cys Gln Gln Tyr Lys Ser Pro Leu Thr
                85                  90                  95

Phe Gly Gly Gly Thr Lys Val Glu Ile Lys
            100                 105

<210> SEQ ID NO 43
<211> LENGTH: 106
<212> TYPE: PRT
<213> ORGANISM: Artificial Sequence
<220> FEATURE:
<223> OTHER INFORMATION: An artificially synthesized peptide sequence

<400> SEQUENCE: 43

Glu Ile Val Leu Thr Gln Ser Pro Ala Thr Leu Ser Val Ser Pro Gly
1               5                   10                  15

Glu Arg Ala Thr Leu Ser Cys Arg Ala Ser Gln Ser Val Arg Arg Asn
            20                  25                  30

Leu Ala Trp Tyr Gln Gln Lys Pro Gly Gln Ala Pro Arg Leu Leu Ile
        35                  40                  45

Tyr Gly Ala Ser Thr Arg Ala Thr Gly Ile Pro Ala Arg Phe Ser Gly
50                  55                  60

Ser Gly Ser Gly Thr Glu Phe Thr Leu Thr Ile Ser Ser Leu Gln Ser
65                  70                  75                  80

Glu Asp Phe Ala Val Tyr Tyr Cys Gln Gln Tyr Lys Ser Pro Leu Thr
                85                  90                  95

Phe Gly Gly Gly Thr Lys Val Glu Ile Lys
            100                 105

<210> SEQ ID NO 44
<211> LENGTH: 107
<212> TYPE: PRT
<213> ORGANISM: Artificial Sequence
<220> FEATURE:
<223> OTHER INFORMATION: An artificially synthesized peptide sequence

<400> SEQUENCE: 44

Ser Tyr Val Leu Thr Gln Pro Val Ser Val Ala Arg Gly Gln
1               5                   10                  15

Thr Ala Thr Ile Thr Cys Glu Gly Asn His Ile Gly Asp Lys His Val
            20                  25                  30

His Trp Tyr His Gln Arg Pro Gly Gln Ala Pro Ile Leu Val Met Phe
        35                  40                  45

Arg Asp Ala Arg Arg Pro Ser Gly Ile Pro Glu Arg Leu Ser Gly Ser
50                  55                  60

Asn Ser Gly Asn Thr Ala Ser Leu Thr Ile Ser Gly Ala Gln Ala Gly
65                  70                  75                  80

Asp Glu Gly Asp Tyr Tyr Cys Gln Val Trp Asp Ser Ser Tyr Thr
                85                  90                  95

Val Phe Gly Gly Gly Thr Lys Val Thr Val Val
            100                 105

<210> SEQ ID NO 45
<211> LENGTH: 123
<212> TYPE: PRT
<213> ORGANISM: Artificial Sequence
<220> FEATURE:
<223> OTHER INFORMATION: An artificially synthesized peptide sequence

<400> SEQUENCE: 45

```
Gln Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Tyr Tyr
            20                  25                  30

Asp Ile Gln Trp Val Arg Gln Ala Pro Gly Lys Gly Leu Glu Trp Val
        35                  40                  45

Ser Ser Ile Ser Pro Ser Gly Gln Ser Thr Tyr Tyr Arg Arg Glu Val
50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Arg Thr Gly Arg Glu Tyr Gly Gly Gly Trp Tyr Phe Asp Tyr
            100                 105                 110

Trp Gly Gln Gly Thr Leu Val Thr Val Ser Ser
        115                 120
```

<210> SEQ ID NO 46
<211> LENGTH: 119
<212> TYPE: PRT
<213> ORGANISM: Artificial Sequence
<220> FEATURE:
<223> OTHER INFORMATION: An artificially synthesized peptide sequence

<400> SEQUENCE: 46

```
Gln Val Gln Leu Val Gln Ser Gly Ser Glu Leu Lys Lys Pro Gly Ala
1               5                   10                  15

Ser Val Lys Val Ser Cys Lys Ala Ser Gly Tyr Thr Phe Thr Asp Asn
            20                  25                  30

Asn Met Asp Trp Val Arg Gln Ala Pro Gly Gln Gly Leu Glu Trp Met
        35                  40                  45

Gly Asp Ile Asn Thr Arg Ser Gly Gly Ser Ile Tyr Asn Glu Glu Phe
50                  55                  60

Gln Asp Arg Val Ile Met Thr Val Asp Lys Ser Thr Asp Thr Ala Tyr
65                  70                  75                  80

Met Glu Leu Ser Ser Leu Arg Ser Glu Asp Thr Ala Thr Tyr His Cys
                85                  90                  95

Ala Arg Arg Lys Ser Tyr Gly Tyr Tyr Leu Asp Glu Trp Gly Glu Gly
            100                 105                 110

Thr Leu Val Thr Val Ser Ser
        115
```

<210> SEQ ID NO 47
<211> LENGTH: 107
<212> TYPE: PRT
<213> ORGANISM: Artificial Sequence
<220> FEATURE:
<223> OTHER INFORMATION: An artificially synthesized peptide sequence

<400> SEQUENCE: 47

```
Asp Ile Gln Met Thr Gln Ser Pro Ser Ser Leu Ser Ala Ser Val Gly
1               5                   10                  15

Asp Arg Val Thr Ile Thr Cys Lys Ala Ser Arg Asn Ile Glu Arg Gln
            20                  25                  30

Leu Ala Trp Tyr Gln Gln Lys Pro Gly Gln Ala Pro Glu Leu Leu Ile
        35                  40                  45

Tyr Gln Ala Ser Arg Lys Glu Ser Gly Val Pro Asp Arg Phe Ser Gly
50                  55                  60
```

```
Ser Arg Tyr Gly Thr Asp Phe Thr Leu Thr Ile Ser Ser Leu Gln Pro
 65              70                  75                  80

Glu Asp Ile Ala Thr Tyr Tyr Cys Gln Gln Tyr Ser Asp Pro Pro Leu
                 85                  90                  95

Thr Phe Gly Gly Gly Thr Lys Val Glu Ile Lys
                100             105
```